United States Patent
Takeuchi et al.

(10) Patent No.: US 6,323,833 B1
(45) Date of Patent: *Nov. 27, 2001

(54) OPTICAL WAVEGUIDE DISPLAY WITH MOVABLE ACTUATORS WHICH CAUSE LIGHT LEAKAGE IN WAVEGUIDE AT EACH DISPLAY ELEMENTS TO PROVIDE GRADATION IN A DISPLAY IMAGE BY TEMPORAL SUBFIELD MODULATION

(75) Inventors: Yukihisa Takeuchi, Aichi-Pref; Tsutomu Nanataki, Toyoake; Iwao Ohwada, Nagoya; Takayoshi Akao, Kasugai, all of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,387

(22) Filed: Mar. 23, 1998

(30) Foreign Application Priority Data

Mar. 24, 1997 (JP) ................................................. 9-088729
Jul. 22, 1997 (JP) ................................................. 9-195984

(51) Int. Cl.[7] ............................. G09G 3/34; H01L 41/04; G02B 26/00; G02B 6/26
(52) U.S. Cl. ........................... 345/84; 345/108; 345/147; 310/331; 359/292; 385/32
(58) Field of Search ................................. 345/84, 85, 102, 345/108, 147, 148, 204; 385/1–10, 25, 30, 40, 41, 42, 129–133, 19, 147; 310/311, 328, 330, 331, 332, 324; 359/290–297

(56) References Cited

U.S. PATENT DOCUMENTS

| | | | |
|---|---|---|---|
| 2,565,514 | 8/1951 | Pajes | 359/291 |
| 2,997,922 | 8/1961 | Kaprelian | 359/833 |
| 3,376,092 | 4/1968 | Kushner et al. | 345/85 |
| 3,698,793 | 10/1972 | Tellerman | 359/290 |
| 3,812,490 | 5/1974 | Goodrich | 359/291 |
| 4,113,360 | 9/1978 | Baur et al. | 345/84 |
| 4,234,245 | * 11/1980 | Toda et al. | 310/331 |
| 5,045,847 | * 9/1991 | Tarui et al. | 345/84 |
| 5,106,181 | * 4/1992 | Rockwell, III | 385/1 |

(List continued on next page.)

FOREIGN PATENT DOCUMENTS

| | | |
|---|---|---|
| 0675477 | 4/1995 | (EP) . |
| 0 667 647 A1 | 8/1995 | (EP) . |
| 0 714 085 A1 | 5/1996 | (EP) . |
| 0 851 260 A2 | 7/1998 | (EP) . |

*Primary Examiner*—Chanh Nguyen
*Assistant Examiner*—Paul A. Bell
(74) *Attorney, Agent, or Firm*—Burr & Brown

(57) ABSTRACT

Disclosed is a display-driving device for driving a display comprising an optical waveguide plate for introducing light thereinto, and a driving section provided opposingly to one plate surface of the optical waveguide plate and including a number of actuator elements arranged corresponding to a large number of picture elements, for displaying, on the optical waveguide plate, a picture image corresponding to an image signal by controlling leakage light at a predetermined portion of the optical waveguide plate by controlling displacement action of each of the actuator elements in a direction to make contact or separation with respect to the optical waveguide plate in accordance with an attribute of the image signal to be inputted; the display-driving device comprising a row electrode-driving circuit for selecting the actuator elements at least in one row unit, a column electrode-driving circuit for outputting a data signal-to the selected row, and a signal control circuit for performing gradation control for the respective driving circuits in accordance with the temporal modulation system. Accordingly, it is possible to realize a simplified arrangement of a peripheral circuit system (including the driving circuits).

60 Claims, 42 Drawing Sheets

U.S. PATENT DOCUMENTS

| | | | |
|---|---|---|---|
| 5,210,455 | 5/1993 | Takeuchi et al. | 310/328 |
| 5,319,491 | 6/1994 | Selbrede | 345/206 |
| 5,452,024 * | 9/1995 | Sampsell | 345/84 |
| 5,521,746 * | 5/1996 | Engle | 359/292 |
| 5,563,977 * | 10/1996 | Cassarly et al. | 385/115 |
| 5,600,197 | 2/1997 | Takeuchi et al. | 310/328 |
| 5,636,072 | 6/1997 | Shibata et al. | 310/328 |
| 5,731,802 * | 3/1998 | Aras et al. | 345/148 |
| 5,771,321 | 6/1998 | Stern | 385/31 |
| 5,861,863 | 1/1999 | Kudo et al. | 345/100 |
| 5,862,275 | 1/1999 | Takeuchi et al. | 385/19 |
| 5,903,323 * | 5/1999 | Ernstoff et al. | 345/148 |
| 5,912,758 * | 6/1999 | Knipe et al. | 359/290 |
| 5,953,469 | 9/1999 | Zhou | 385/22 |
| 6,014,128 * | 1/2000 | Doherty et al. | 345/148 |
| 6,028,578 | 2/2000 | Ota et al. | 345/94 |
| 6,028,978 | 2/2000 | Takeuchi et al. | 310/331 |
| 6,091,182 | 7/2000 | Takeuchi et al. | 310/330 |

* cited by examiner

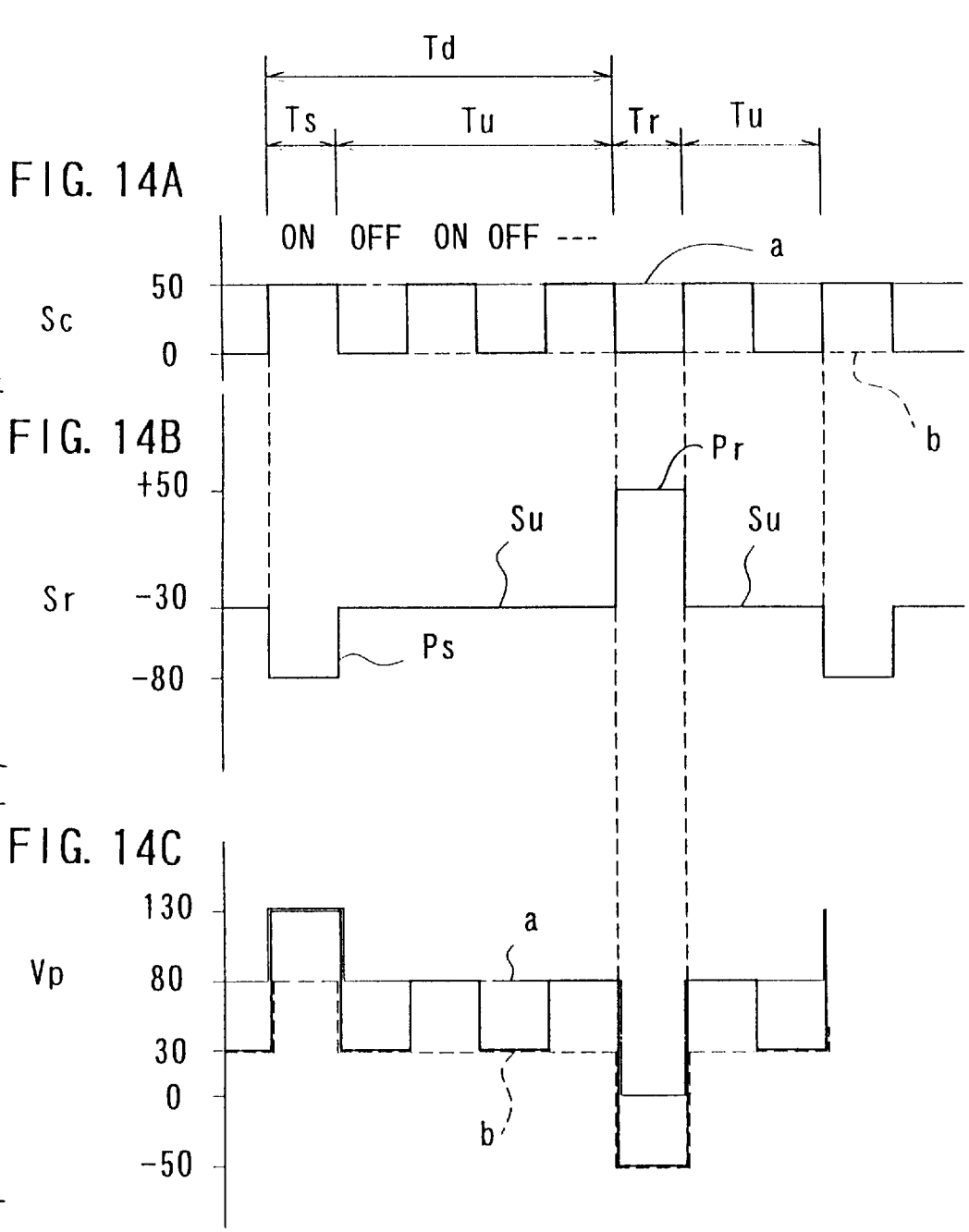

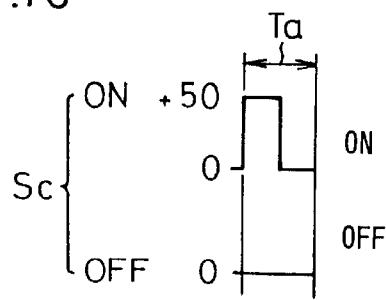
FIG.16
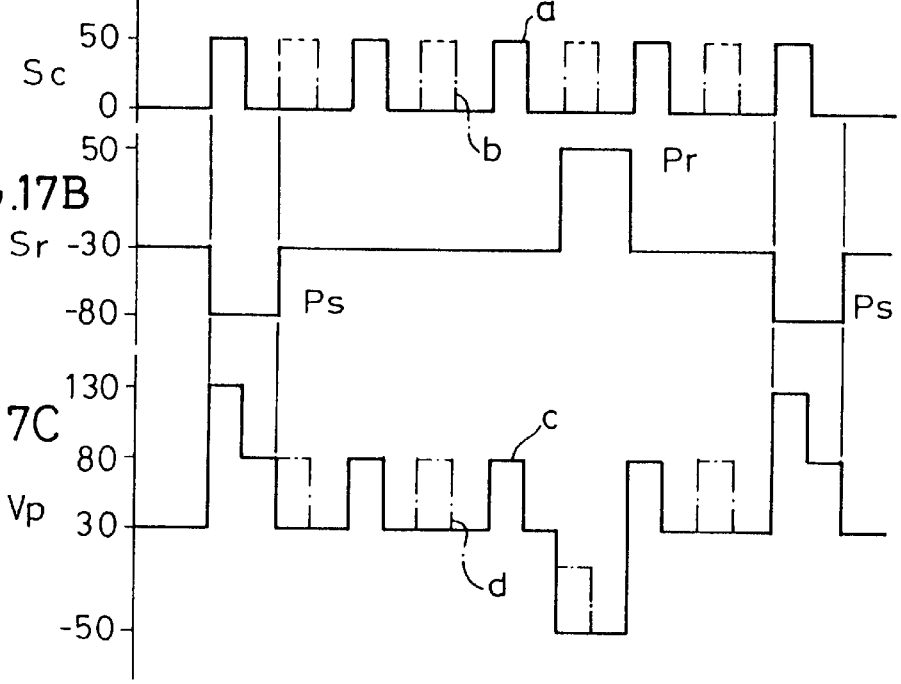
FIG.17A
FIG.17B
FIG.17C

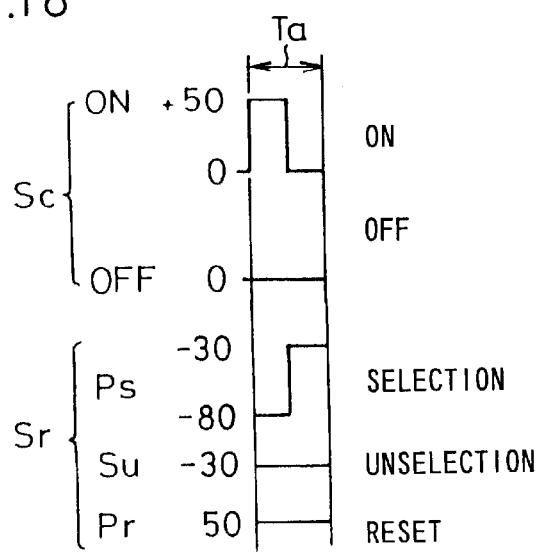
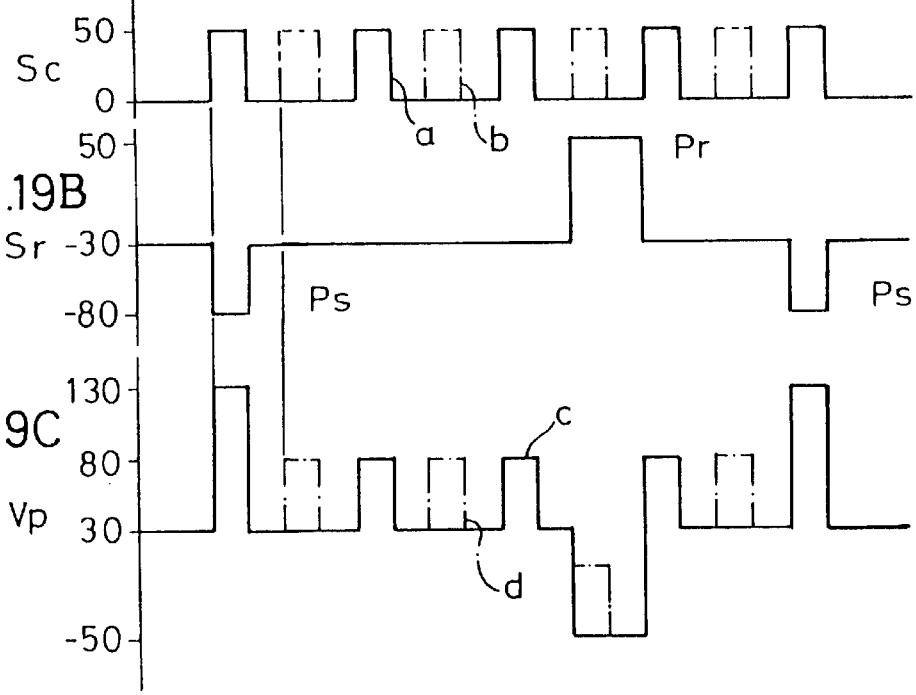

FIG.22
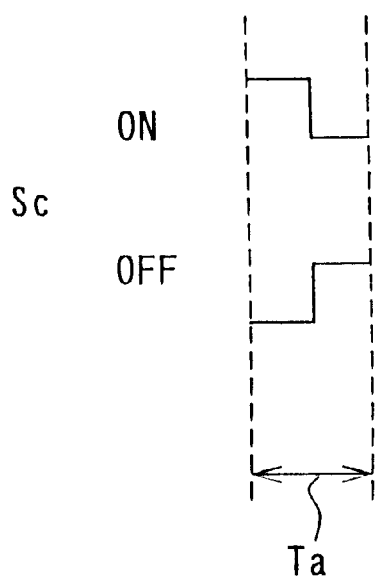
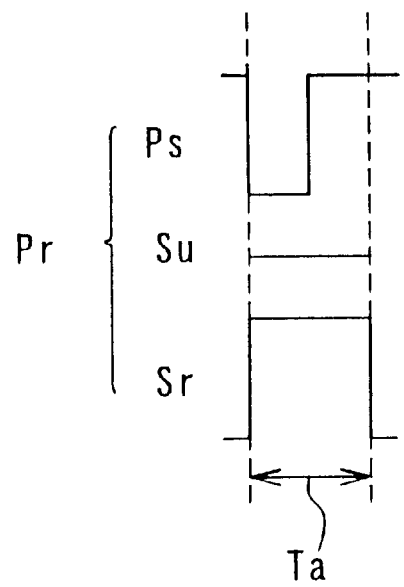

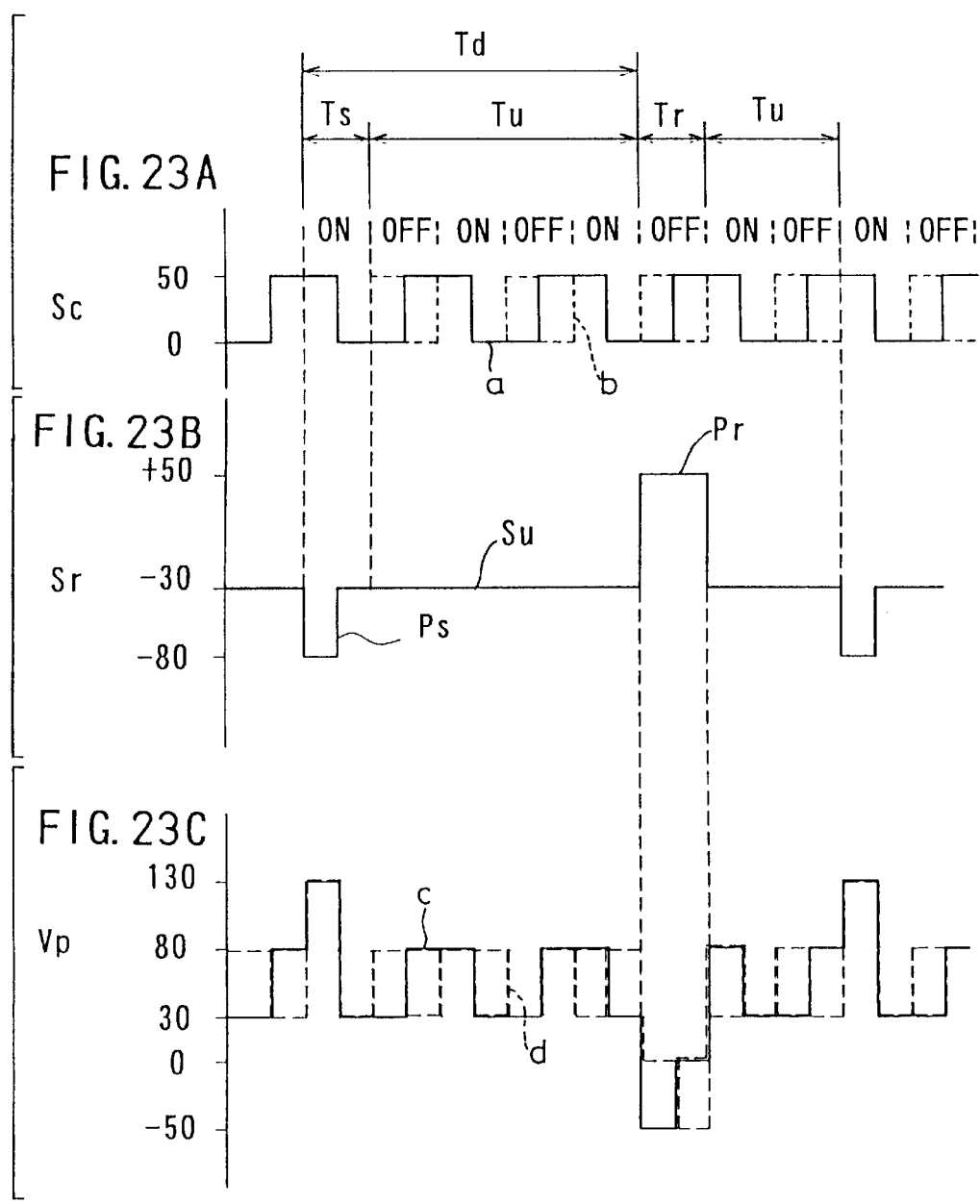

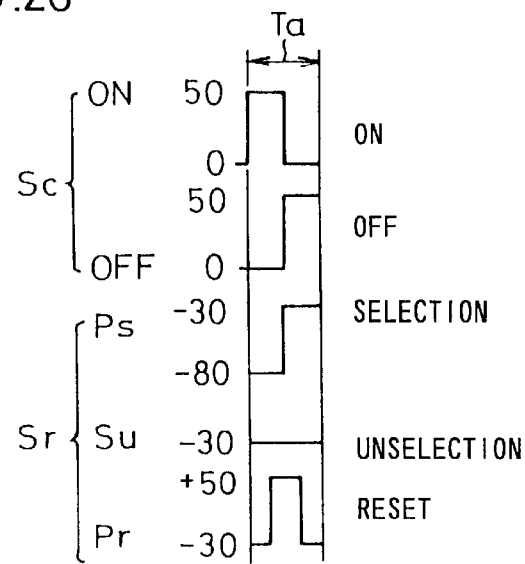
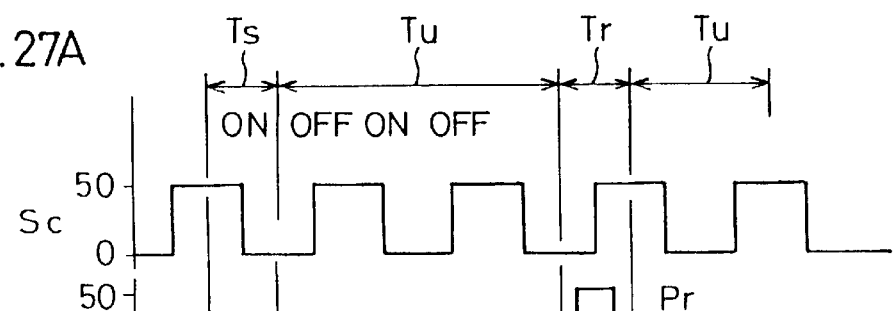
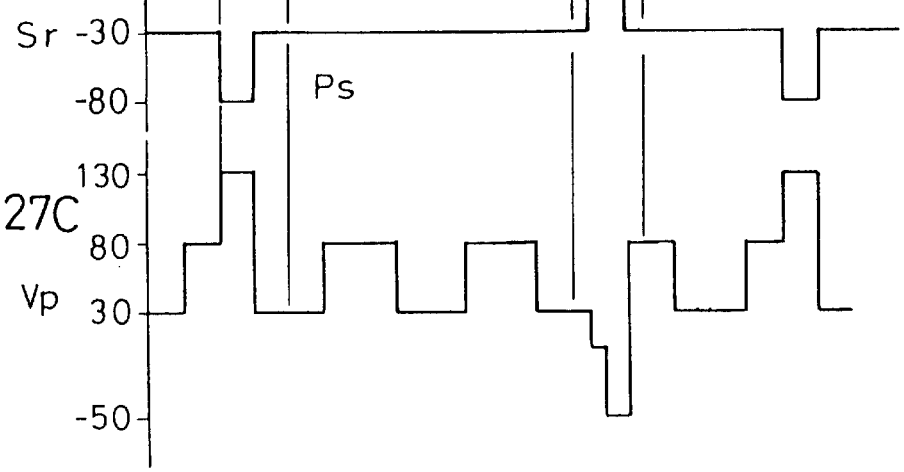

FIG. 42

| | Brightness relative to standard picture element | Conversion variable |
|---|---|---|
| Picture element A (with highest brightness) | 2 | 1 |
| Picture element B | 1.5 | 1.3 |
| Picture element C | 1 | 2 |
| Picture element D | 1/1.5 | 3 |
| Picture element E (with lowest brightness) | 1/2 | 4 |

FIG. 44

| Gradation levels to be expressed | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Number of subfields to be used | 1 | 1 | 2 | 1 | 2 | 2 | 3 | 1 | 2 | 2 | 3 | 2 | 3 | 3 | 4 |

FIG. 46

| Gradation levels to be expressed | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Subfields to be used (contents) LEVEL | (0) | (0) | 1 | 0 | 1 | 2 | 1 | 0 | 0 | 0 | 1 | 0 | 1 | 2 | 1 |
| | 1 | 2 | 2 | 4 | 4 | 4 | 2 | 8 | 1 | 2 | 2 | 4 | 4 | 4 | 2 |
| | | | | | | | 4 | | 8 | 8 | 8 | 8 | 8 | 8 | 4 |
| | | | | | | | | | | | | | | | 8 |
| Number of subfields to be used | (2) | (2) | 2 | 2 | 2 | 2 | 3 | 2 | 3 | 3 | 3 | 3 | 3 | 3 | 4 |

OPTICAL WAVEGUIDE DISPLAY WITH MOVABLE ACTUATORS WHICH CAUSE LIGHT LEAKAGE IN WAVEGUIDE AT EACH DISPLAY ELEMENTS TO PROVIDE GRADATION IN A DISPLAY IMAGE BY TEMPORAL SUBFIELD MODULATION

BACKGROUND OF THE INVENTION

1. Field of the Invention

The present invention relates to a display-driving device and a display-driving method for driving a display which consumes less electric power and which provides large screen brightness, in particular, a display for displaying a picture image corresponding to an image signal on an optical waveguide plate by controlling leakage light at a predetermined position of the optical waveguide plate by controlling the displacement action of an actuator element in a direction to make contact or separation with respect to the optical waveguide plate in accordance with an attribute of the image signal to be inputted.

2. Description of the Related Art

Those hitherto known as the display device include, for example, cathode ray tubes (CRT), liquid crystal display devices, and plasma displays.

Those known as the cathode ray tube include, for example, ordinary television receivers and monitor units for computers. Although the cathode ray tube has a bright screen, it consumes a large amount of electric power. Further, the cathode ray tube involves a problem that the depth of the entire display device is large as compared with the size of the screen. Further, for example, the cathode ray tube involves drawbacks in that the resolution is decreased in the circumferential areas of a display images, the image or the graphic is distorted, there is no memory function, and it is impossible to present display in a large scale.

The reason for the foregoing phenomenon is as follows. That is, in the case of the cathode ray tube, the electron beam emitted from the electron gun is greatly deflected. Therefore, the light emission point (beam spot) is expanded at portions at which the electron beam reaches the fluorescent screen of the Braun tube in an inclined manner, and thus the image is displayed in an inclined manner. For this reason, strain occurs on the display image. Moreover, there is a limit for the maintenance to keep a large space at the inside of a Braun tube to be in a vacuum.

On the other hand, the liquid crystal display device is advantageous in that the entire device can be miniaturized, and the display device consumes a small amount of electric power. However, the liquid crystal display device involves problems in that it is inferior in screen brightness, and the field angle of the screen is narrow. Further, since gradational expression is made in accordance with the voltage level, there is a drawback that the arrangement of the driving circuit becomes extremely complicated.

For example, when a digital data line is used, its driving circuit comprises a latch circuit for retaining component RGB data (each 8 bit) for a predetermined period, a voltage selector, a multiplexer for making change to provide voltage levels of the type corresponding to the number of gradations, and an output circuit for adding output data from the multiplexer to the digital data line. In this case, when the number of gradations becomes large, it is necessary for the multiplexer to perform the switching operation at an extremely large number of levels, in accordance with which the circuit arrangement becomes complicated.

When an analog data line is used, its driving circuit comprises a shift register for aligning, in the horizontal direction, component RGB data (each 8 bit) inputted successively, a latch circuit for holding parallel data from the shift register for a predetermined period, a level shifter for adjusting the voltage level, a D/A converter for converting output data from the level shifter into an analog signal, and an output circuit for adding the output signal from the D/A converter to the analog data line. In this case, an operational amplifier is used in the D/A converter. Thus, a predetermined voltage corresponding to the gradation is obtained. However, when the range of gradation becomes wide, it is necessary to use an operational amplifier which outputs a highly accurate voltage. Therefore, such a system involves a drawback that the structure becomes complicated, and the price also becomes high.

Since the plasma display has a small volume of its display section in the same manner as the liquid crystal display device. Therefore, the plasma display is advantageous in that it can be miniaturized, and it is easy to recognize the image because it has a flat display screen. Especially, the alternating current type plasma display additionally has an advantage that no refresh memory is required owing to the memory function of the cell.

By the way, in the case of the plasma display described above, in order to allow the cell to possess the memory function, it is necessary that the polarity of applied voltage is changed in an alternating manner so that the discharge is continued. For this reason, it is necessary for the driving circuit to comprise a first pulse generator for generating a sustain pulse in the X direction and a second pulse generator for generating a sustain pulse in the Y direction. For this reason, a problem arises in that the arrangement of the driving circuit is inevitably complicated.

SUMMARY OF THE INVENTION

The present invention has been made in consideration of such problems, an object of which is to provide a display-driving device and a display-driving method in which it is unnecessary to perform, for example, complicated voltage switch and voltage selection even when the range of display gradation is widened, it is possible to suppress the setting number of working voltages to the minimum, and it is possible to realize a simplified arrangement of a peripheral circuit system (including driving circuits).

Another object of the present invention is to provide a display-driving device and a display-driving method in which it is possible to exhibit the function as the display by maximally utilizing the memory function of a shape-retaining layer (piezoelectric/electrostrictive layer and anti-ferroelectric layer) of an actuator element for constructing a picture element (image pixel).

Still another object of the present invention is to provide a display-driving device and a display-driving method in which the selection period for a picture element is minimized so that the electric power consumption is effectively reduced.

Still another object of the present invention is to provide a display-driving device and a display-driving method in which the cross talk between picture elements during the unselection period is suppressed so that the stabilization of light emission and the stabilization of display brightness (gradation) are realized.

According to the present invention, there is provided a display-driving device for driving a display comprising an optical waveguide plate for introducing light thereinto, and a driving section provided opposingly to one plate surface of the optical waveguide plate and including a number of actuator elements arranged corresponding to a large number of picture elements, for displaying, on the optical waveguide plate, a picture image corresponding to an image signal by controlling leakage light at a predetermined portion of the optical waveguide plate by controlling displacement action of each of the actuator elements in a direction to make contact or separation with respect to the optical waveguide plate in accordance with an attribute of the image signal to be inputted; the display-driving device comprising a first driving circuit for selecting the actuator elements at least in one row unit, a second driving circuit for outputting displaying information to the selected row, and a signal control circuit for controlling the first and second driving circuits; wherein the first and second driving circuits are controlled to perform gradation control at least in accordance with a temporal modulation system by using the signal control circuit.

According to the present invention, the signal control circuit performs control such that the first driving circuit selects the actuator elements (picture elements) at least in one row unit, and the second driving circuit outputs the display information to the respective picture elements included in the selected row. At this time, the first and second driving circuits are controlled by the aid of the signal control circuit so that the display effected by the respective picture elements makes gradational expression at least in accordance with the temporal modulation system.

For example, when the gradation control is performed in accordance with the temporal modulation system, it is unnecessary to perform complicated voltage switch and voltage selection even when the range of display gradation of the picture elements is widened. Thus, the setting number of working voltages can be suppressed to the minimum. Specified operations will be described later on.

The gradation control can be performed not only by the temporal modulation system but also by the voltage control system. Further, the gradation control can be performed in accordance with a system based on the combination of the temporal modulation system and the voltage control system.

In the present invention, it is desirable that the first and second driving circuits have the following features.

(1) The actuator element undergoes the capacitive load. Therefore, considering the fact that the capacitive load is subjected to the driving, it is desirable that the partial voltage ratio, which is applied to the capacitive load, is not less than 50%, for example, at the time of completion of voltage (ON voltage) application for allowing the actuator element to make the bending displacement.
(2) In order to obtain an displacement amount of the actuator element which makes it possible to express the ON state and the OFF state of the picture element, it is desirable that an voltage output of not less than 20 V can be provided.
(3) It is desirable to consider the fact that the direction of the output current is recognized to be bidirectional.
(4) It is desirable that the load concerning the two-electrode structure in the row direction and the column direction can be subjected to the driving.

It is desirable for the display-driving device constructed as described above that the actuator element of the display comprises a shape-retaining layer, an operating section having at least a pair of electrodes formed on the shape-retaining layer, a vibrating section for supporting the operating section, and a fixed section for supporting the vibrating section in a vibrating manner; wherein the display comprises a displacement-transmitting section for transmitting the displacement action of the actuator element to the optical waveguide plate, the displacement action being generated by voltage application to the pair of electrodes. In the present invention, the term "actuator element having the shape-retaining layer" indicates an actuator element which has at least two or more displacement states at an identical voltage level.

Accordingly, all of the light, which is introduced, for example, from the end of the optical waveguide plate, is totally reflected at the inside of the optical waveguide plate without being transmitted through the front and back surfaces of the optical waveguide plate (OFF state), by regulating the magnitude of the refractive index of the optical waveguide plate. In this state, when the displacement-transmitting section contacts with the back surface of the optical waveguide plate at a distance of not more than the wavelength of the light, then the light, which has been totally reflected, is transmitted to the surface of the displacement-transmitting section contacting with the back surface of the optical waveguide plate. The light, which has once reached the surface of the displacement-transmitting section, is reflected by the surface of the displacement-transmitting section, and the light behaves as scattered light. A part of the scattered light is reflected again at the inside of the optical waveguide plate. However, almost all of the scattered light is not reflected by the optical waveguide plate, and the light is transmitted through the front surface of the optical waveguide plate (ON state).

As described above, it is possible to control the presence or absence of light emission (leakage light) at the front surface of the optical waveguide plate, depending on the presence or absence of the contact of the displacement-transmitting section disposed at the back of the optical waveguide plate. In this case, one unit for allowing the displacement-transmitting section to make the displacement action in the direction to give contact or separation with respect to the optical waveguide plate may be regarded as one picture element. Thus, a picture image (for example, characters and graphics) corresponding to an image signal can be displayed on the front surface of the optical waveguide plate in the same manner as the cathode ray tube and the liquid crystal display device, by arranging a large number of such picture elements in a matrix form, and controlling the displacement action of each of the picture elements in accordance with an attribute of the inputted image signal.

The actuator element having the shape-retaining layer has the following features.

(1) The threshold characteristic concerning the change from the OFF state to the ON state is steep as compared with the case in which no shape-retaining layer exists. Accordingly, it is possible to narrow the deflection width of the voltage, and it is possible to mitigate the load on the circuit.
(2) The difference between the ON state and the OFF state is distinct, resulting in improvement in contrast.
(3) The dispersion of threshold value is decreased, and an enough margin is provided for the voltage setting range.

It is desirable to use, as the actuator element, an actuator element which makes, for example, upward displacement (giving the separated state upon no voltage load and giving the contact state upon voltage application) because of easiness of control. Especially, it is desirable to use an actuator element having a structure including a pair of electrodes on its surface. It is preferable to use, for example, a piezoelectric/electrostrictive layer and an anti-ferroelectric layer as the shape-retaining layer.

It is preferable for the display-driving device constructed as described above that a display period for one image is assumed to be one field, and an effective display period comprising a selection period and an unselection period is set within the period of one field. In this case, it is also possible to perform gradation control in accordance with the voltage control system.

When gradation control is performed in accordance with the temporal modulation system, for example, a display period for one image is assumed to be one field, and one divided period obtained by dividing the one field into a plurality of divided ones is assumed to be a subfield; and an effective display period comprising a selection period and an unselection period is set for each subfield; wherein the effective display period is set to have a temporal length corresponding to a unit gradation level allotted to the subfield. In this embodiment, there is no special limitation for the order of lengths of the respective subfields.

When one field is divided into a plurality of subfields, for example, the field is divided substantially equally in some cases, or the field is divided while increasing the ratio of the effective display period in other cases. The former has the following features as compared with the latter. At first, since the length of the selection period can be made long, (1) the peak value of the current can be suppressed, and the load on the circuit is mitigated; (2) it is possible to suppress the instantaneously generated force, the load on the structure (actuator element) is mitigated, and the long term stability is improved; and (3) the dispersion of response time of the picture element is absorbed, and the nonuniformity of brightness is decreased. Assuming that the length of the selection period is identical, the number of rows capable of being selected in one subfield is increased, and the number of rows capable of being subjected to signal input by the aid of the second driving circuit is increased. Therefore, it is possible to decrease the number of IC's to be used for the second driving circuit, resulting in reduction of cost.

On the other hand, in the case of the latter, the effective display period is long as compared with the former. Therefore, it is possible to obtain a high brightness.

In consideration of the various features described above, the ratio of division can be determined in the present invention. For example, a former half of one field may be divided into a plurality of subfields in accordance with a dividing method in which the ratio of the effective display period is increased, and a latter half may be divided into a plurality of subfields substantially equally. In this case, both advantages of the two dividing methods are simultaneously obtained. Therefore, it is possible to perform the gradation control highly accurately, and it is possible to improve the quality of the reproduced image.

The response time of the picture element is finite. Therefore, the brightness is occasionally increased when the selection period is made long, rather than when the selection period is made short to give a long effective display period.

In a preferred embodiment, at least a reset period, in which display brightness is substantially zero, is provided between the effective display period of a certain subfield and the effective display period of the next subfield.

Accordingly, the display brightness is once made to be zero in the reset period. Therefore, the device is easily applicable to the display of animation images.

It is preferable for the display-driving device constructed as described above that at least one dummy subfield is provided in the one field in addition to the plurality of subfields; and the dummy subfield has an effective display period which is constructed by only a selection period.

As for a subfield which effects light emission during both of the selection period and the unselection period, it, when the ratio of the amount of light emission in the selection period is large, the gradation level depends on the number of subfields (number of selection periods) to be used. According to this fact, ideally, it is desirable that the number of subfields to be used is increased in a stepwise manner as the gradation level to be expressed is successively increased.

However, when the ratio of the amount of light emission is large during the selection period, it is feared that the relative magnitude of the display brightness may be inverted with respect to the change in gradation level.

Thus, in the present invention, the inconvenience as described above can be dissolved by using the dummy subfield in which there is given "unit gradation level=0".

Especially, the signal control circuit is allowed to perform control to selectively use the dummy subfield so that a number of the subfields to be used is increased substantially in a stepwise manner in accordance with increase in the gradation level. By doing so, the number of the subfield to be used can be increased in the stepwise manner in conformity with the increase in the gradation level to be expressed. Thus, it is possible to linearize the display brightness.

In a preferred embodiment, a reset period and an unselection period, in which the display brightness is substantially zero, are provided between the effective display period of a certain subfield and the effective display period of the next subfield.

Accordingly, the display brightness is once made to be zero during the reset period. Therefore, when the actuator element is subjected to bending displacement in the effective display period in the next subfield, it is feared that the response speed of the actuator element is delayed depending on the position of restoration during the reset period.

However, in the present invention, the unselection period is set after the reset period. Therefore, the level of the voltage applied to the actuator element can be set, for example, in the vicinity of the threshold value for ON and OFF, within a range in which the picture element is turned OFF, during the unselection period. Accordingly, it is possible to improve the response speed with respect to the bending displacement effected in the next effective display period. That is, the unselection period, which is provided after the reset period, can be used as a preliminary period for bootstrap for the bending displacement of the actuator element. Desirably, the circuit can be constructed such that the voltage during the unselection period can be inputted from at least one of the first driving circuit and the second driving circuit. In this context, the unselection period can be defined as a period except for the selection period and the reset period.

It is desirable for the display-driving device constructed as described above that a preparatory period is provided immediately before the selection period or during the selection period, in order to stabilize operation of the actuator element. The preparatory period is a period for giving a constant value of the voltage level immediately before application of the selection pulse. In this case, the preparatory period may be also used as the preliminary period for the unselection period. Alternatively, the preparatory period may be provided after passage of the preliminary period.

In the display-driving device constructed as described above, the first driving circuit is subjected to timing control by the aid of the signal control circuit so that all row selection is completed in each subfield; and the second driving circuit is subjected to timing control by the aid of the signal control circuit so that a data signal, which is prepared by allotting a display time corresponding to each gradation level to the effective display period of each subfield, is outputted during the selection period in each subfield, for each picture element concerning the selected row.

Accordingly, at first, the picture element group in the first row is selected by the first driving circuit upon the start of one field. The data signal is supplied to the picture element group in the first row by the aid of the second driving circuit. The data signal supplied to each of the picture elements is the data signal prepared by allotting the display time corresponding to the gradation level to the effective display period of each of the subfields (for example, ON signal and OFF signal). When one picture element is considered, the display time corresponding to the gradation level of the picture element is assigned to durations allotted to the respective subfields. In this procedure, the display time is assigned to all of the subfields in some cases, or it is assigned to some of the subfields in other cases.

Specifically, for example, when one field is divided into eight subfields (first to eighth subfields), the duration of the first subfield may be 512, and the duration of the second subfield may be 256. Similarly, the respective durations of the third to eighth subfields may be 128, 64, 32, 16, 8, and 4 respectively. Therefore, for example, when the gradation level of the picture element is 1020, all of the subfields are selected. When the gradation level is 656, the first, third, and sixth subfields are selected.

Those adopted as the output form of the data signal supplied to the picture element include, for example, a form in which the ON signal is outputted to the selected subfield, and the OFF signal is outputted to the unselected subfield.

Desirably, each of the first and second driving circuits is constructed by one driving circuit. That is, the device is desirably constructed by only two driving circuits. The only two driving circuits are sufficient, because the actuator element has the structure composed of the two electrodes (pair of electrodes), and it has the shape-retaining function.

In a preferred embodiment, the gradation level of each of the picture elements is a gradation level obtained by applying, to a gradation level obtained on the basis of the image signal, a predetermined operation processing with a conversion variable corresponding to a magnitude of dispersion with respect to a standard brightness of the picture element.

In general, an identical predetermined electric field is applied to the respective actuator elements corresponding to all of the picture elements so that all of the picture elements are in the ON state, it is rare that all of the picture elements have an identical brightness. The brightness of each of the picture elements is often dispersed due to, for example, any dispersion caused by production of the actuator element. However, in the present invention, the gradation level of each of the picture elements, which is obtained in accordance with the image signal, is subjected to the predetermined operation processing with the conversion variable corresponding to the magnitude of the dispersion of the picture element with respect to the standard brightness. Therefore, a practical gradation level of each of the picture elements can be obtained.

In this embodiment, it is desirable that the conversion variable is a variable used to converge the dispersion in brightness of each of the picture elements to a predetermined level, by applying the predetermined operation processing.

It is desirable for the display-driving device constructed as described above that the first driving circuit is capable of setting at lest three voltage levels, and the second driving circuit is capable of setting at least two voltage levels.

In a preferred embodiment, the row selection effected by the first driving circuit is performed by outputting a selection pulse signal during the selection period, outputting an unselection signal during the unselection period, and outputting a reset pulse signal during a reset period; and the data signal output effected by the second driving circuit is performed by outputting an ON signal during the selection period in the effective display period of the allotted subfield of the respective subfields, and outputting an OFF signal during the selection period of the effective display period of the other subfields.

Accordingly, in relation to one picture element, for example, the highest voltage in the positive direction is applied to the picture element during the selection period concerning the subfield selected by the assignment of the duration of the gradation level. Therefore, the actuator element, which constructs the picture element, makes bending displacement in the first direction (direction for the actuator element to approach the optical waveguide plate) in accordance with the application of the voltage to induce the emission of leakage light (light emission) from the optical waveguide plate as described above. The bending displacement state is stored until application of a voltage in the opposite direction (supply of the reset pulse signal).

The unselection signal is outputted during the unselection period after the selection period. In this process, the unselection signal may be a signal which is fixed at a voltage smaller than the voltage during the selection period, or it may be a signal which fluctuates in an alternate manner. Accordingly, the actuator element maintains the state of bending displacement in the first direction even in the unselection period.

The reset pulse signal is supplied to the actuator element during the next reset period. For example, the reset pulse signal is a signal which is allowed to have the highest voltage in the negative direction. Therefore, the actuator element in turn makes displacement in the second direction (direction to make separation from the optical waveguide plate). Thus, there is given a state in which the brightness is lowest (light-off).

The series of operations as described above are performed only for the selected subfield. In the case of the unselected subfield, the OFF signal is supplied to the picture element during the selection period. Therefore, the light-off state is given during the period of the unselected subfield.

A voltage, which is sufficient to make the bending displacement of the actuator element, is applied to the <Z[]z actuator element of the objective picture element during an output period of the ON signal; and a voltage, which is sufficient to restore the displacement of the actuator element, is applied to the actuator element of the objective picture element during an output period of the reset pulse signal. The actuator element, to which the ON signal is supplied during the selection period, makes the bending displacement during the output period of the ON signal, and the picture element corresponding to the actuator element causes light emission. This state is maintained over the unselection period. The actuator element is restored to the original state (OFF state) by the aid of the output of the reset pulse signal outputted during the next reset period, and the concerning picture element is in the light-off state.

An absolute value (B) of a difference between a maximum value of the voltage applied during the unselection period to the actuator element of each of the picture elements and a maximum value of the voltage applied by the OFF signal during the selection period is not more than 100% of an absolute value (A) of a difference between a maximum value of the voltage applied by the ON signal during the selection period and a maximum value of the voltage applied by the OFF signal (i.e., B≦A). Desirably, there is given B≦0.5A, and more desirably B is not more than 30% of A.

It is desirable that the absolute value (B) of the difference is smaller than the absolute value (A) of the difference between the ON signal and the OFF signal, because of the following reason. That is, it is possible to utilize the voltage range in which the displacement of the actuator element in the ON state is high, and the displacement of the actuator element in the OFF state is small, during the unselection.

It is desirable that the absolute value (A) is set to be not less than 10 V. More desirably, the absolute value (A) is not less than 20 V.

It is preferable that the first driving circuit outputs a selecting window pulse for applying, to the actuator element of the objective picture element, a voltage sufficient to allow the actuator element to make the bending displacement, by means of combination with the ON signal during the selection period. It is also preferable that the first driving circuit outputs a resetting window pulse for applying, to the actuator element of the objective picture element, a voltage sufficient to restore the displacement of the actuator element during the reset period. It is also preferable that the first driving circuit outputs an unselecting window pulse for decreasing a difference in average voltage applied during the unselection period, to the actuator element of each of the picture elements during the unselection period.

It is desirable for the display-driving device constructed as described above that phase information is added to at least the ON signal so that a difference in average voltage applied during the unselection period is decreased for the actuator element of each of the picture elements.

It is necessary that the bending displacement state of the actuator element is maintained as it is during the unselection period. Therefore, ideally, it is desirable to apply a fixed electric potential in a degree in which no influence is exerted on the bending displacement as described above, during the unselection period.

However, the data signal (ON signal and OFF signal) for another row successively appears during the unselection period of each subfield, because all of the row selection is completed in each of the subfields. That is, as for one picture element, the voltage waveform during the unselection period for the picture element is determined by the pattern of the data signal (appearance pattern of ON signal and OFF signal) for the rows other then the row to which the concerning picture element belongs in the column to which the concerning picture element belongs.

For example, when the ON signal is outputted for all of the rows except for the row including the concerning picture element, the average voltage of the concerning picture element during the unselection period is fixed at a voltage level (conveniently referred to as "high voltage level") obtained by subtracting the reference level from the voltage level of the ON signal. When the OFF signal is outputted for all of the rows except for the row including the concerning picture element, the average voltage is fixed at a voltage level (conveniently referred to as "low voltage level") obtained by subtracting the reference level from the voltage level of the OFF signal. When the ON signal and the OFF signal are alternately outputted for all of the rows except for the row including the concerning picture element, the average voltage is an intermediate voltage between the high voltage level and the low voltage level.

As a result, the bending displacement of the actuator element during the unselection period is delicately changed depending on the change in voltage (voltage change depending on the pattern of the ON signal and the OFF signal). Especially, when a cluster of a large number of rows output the ON signal, or when they output the OFF signal, then there is a possibility that the display state (brightness and gradation) of the picture element may be unstable during the unselection period, because the difference concerning the average voltage is large.

When the ON signal and the OFF signal appear alternately, then the average voltage waveform in this case is not fixed to the intermediate voltage, and it fluctuates with a certain offset, because the pulse widths of the ON signal and the OFF signal are approximately the same as the selection period.

Accordingly, in the present invention, in order to solve the problem described above, the phase information is added to the selection pulse signal and the ON signal and/or the OFF signal respectively. Alternatively, the phase information is also added to the reset signal in addition to the signals described above.

Specifically, for example, the ON signal and the OFF signal are allowed to have their respective pulse widths which are made to be smaller than an address time for the first driving circuit, and their respective phases are deviated from each other by a predetermined angle. Further, the reset pulse signal is allowed to have its phase which is deviated by a predetermined angle with respect to the ON signal and the OFF signal.

Accordingly, both of the ON signal and the OFF signal constitute pulse signals in which the high level and the low level exist in a mixed manner, during the period corresponding to the selection period.

Therefore, when consideration is made for one picture element as described above, the following situation is given. That is, the pulse signal, which has a narrow pulse width and which has its amplitude of (high voltage level—low voltage level), continuously appears during the unselection period for the concerning picture element, in all cases including the case in which the ON signal is outputted for all of the rows, the case in which the OFF signal is outputted for all of the rows, and the case in which ON signal and the OFF signal are alternately outputted in the unit of row. As a result, the average voltage during the unselection period does not depends on the pattern of the ON signal and the OFF signal, and it has an approximately constant value. Therefore, the display state (brightness and gradation) during the unselection period is stabilized. Moreover, the pulse width of the pulse signal which appears during the unselection period is sufficiently shorter than the period corresponding to the selection period. This fact, in combination of the fact that the response speed of light emission is slow to some extent, makes it possible to obtain the effect of low-pass filter. The display state (light emission state) during the selection period is maintained as it is during the unselection period, and the unstable display state as described above is almost dissolved.

The phase of the reset pulse signal is deviated by the predetermined angle with respect to the ON signal or the OFF signal. Therefore, the highest voltage in the negative direction is necessarily applied to each of the picture elements during the reset period. Accordingly, the actuator element for constructing each of the picture elements is reliably in the state in which the brightness is lowest (light-off) during the reset period.

Besides, it is preferable that at least any one of the ON signal and the OFF signal has its pulse cycle which is 1/n (n is an arbitrary real number from 1 to 5) of an address time.

Desirably, the real number is 1 to 3. This is because of the following reason. That is, the low-pass filter effect is well exerted when the number of pulses is large. However, a small number of pulses or a small number of voltage-switching times is effective to reduce the electric power consumption.

In another aspect, the present invention provides a display-driving method for driving a display comprising an optical waveguide plate for introducing light thereinto, and a driving section provided opposingly to one plate surface of the optical waveguide plate and including a number of actuator elements arranged corresponding to a large number of picture elements, for displaying, on the optical waveguide plate, a picture image corresponding to an image signal by controlling leakage light at a predetermined portion of the optical waveguide plate by controlling displacement action of each of the actuator elements in a direction to make contact or separation with respect to the optical waveguide plate in accordance with an attribute of the image signal to be inputted; the display-driving method comprising the steps of selecting the actuator elements at least in one row unit, outputting displaying information to the selected row, and making gradation control for each of the picture elements at least in accordance with a temporal modulation system.

Accordingly, it is unnecessary to perform, for example, complicated voltage switch and voltage selection even when the range of display gradation is widened, it is possible to suppress the setting number of working voltages to the minimum, and it is possible to realize a simplified arrangement of a peripheral circuit system (including driving circuits).

In the method described above, it is preferable that the actuator element of the display comprises a shape-retaining layer, an operating section having at least a pair of electrodes formed on the shape-retaining layer, a vibrating section for supporting the operating section, and a fixed section for supporting the vibrating section in a vibrating manner; wherein the display comprises a displacement-transmitting section for transmitting the displacement action of the actuator element to the optical waveguide plate, the displacement action being generated by voltage application to the pair of electrodes.

In a preferred embodiment, it is preferable to use, for example, a piezoelectric/electrostrictive layer and an anti-ferroelectric layer as the shape-retaining layer.

In the method described above, for example, when the gradation control is performed in accordance with a voltage control system, it is preferable that a display period for one image is assumed to be one field, and an effective display period comprising a selection period and an unselection period is set during the period.

In the method described above, when the gradation control is performed in accordance with the temporal modulation system, a display period for one image is assumed to be one field, and one divided period obtained by dividing the one field into a plurality of divided ones is assumed to be a subfield; and an effective display period comprising a selection period and an unselection period is set for each subfield; wherein the effective display period is set to have a temporal length corresponding to a unit gradation level allotted to the subfield.

In a preferred embodiment, at least a reset period, in which display brightness is substantially zero, is provided between the effective display period of a certain subfield and the effective display period of the next subfield. Alternatively, the reset period and the unselection period may be provided therebetween.

It is preferable for the display-driving method described above that at least one dummy subfield is provided in the one field in addition to the plurality of subfields; and the dummy subfield has an effective display period which is constructed by only a selection period. In this embodiment, it is preferable that the dummy subfield is selectively used so that a number of the subfields to be used is increased substantially in a stepwise manner in accordance with increase in the gradation level.

It is desirable for the method described above that a preparatory period is provided immediately before the selection period or during the selection period, in order to stabilize operation of the actuator element.

In the method as described above, timing control is performed so that all row selection is completed in each subfield; and timing control is performed so that a data signal, which is prepared by allotting a display time corresponding to each gradation level to the effective display period of each subfield, is outputted during the selection period in each subfield, for each picture element concerning the selected row.

In the method described above, the gradation level of each of the picture elements is a gradation level obtained by applying, to a gradation level obtained on the basis of the image signal, a predetermined operation processing with a conversion variable corresponding to a magnitude of dispersion with respect to a standard brightness of the picture element. In this embodiment, it is assumed that the conversion variable is a variable used to converge the dispersion in brightness of each of the picture elements to a predetermined level, by applying the predetermined operation processing.

Upon the row selection, at lest three voltage levels may be set, and upon the output of the displaying information, at least two voltage levels may be set. Specifically, the row selection is effected by outputting a selection pulse signal during the selection period, outputting an unselection signal during the unselection period, and outputting a reset pulse signal during a reset period; and the output of displaying information is effected by outputting an ON signal during the selection period in the effective display period of the allotted subfield of the respective subfields, and outputting an OFF signal during the selection period of the effective display period of the other subfields.

It is preferable that a voltage, which is sufficient to make the bending displacement of the actuator element, is applied to the actuator element of the objective picture element during an output period of the ON signal; and a voltage, which is sufficient to restore the displacement of the actuator element, is applied to the actuator element of the objective picture element during an output period of the reset pulse signal.

It is desirable that an absolute value of a difference between a maximum value of the voltage applied during the unselection period to the actuator element of each of the picture elements and a maximum value of the voltage applied by the OFF signal during the selection period is not more than 100% of an absolute value of a difference between a maximum value of the voltage applied by the ON signal during the selection period and a maximum value of the voltage applied by the OFF signal.

It is preferable that a selecting window pulse for applying, to the actuator element of the objective picture element, a voltage sufficient to allow the actuator element to make the bending displacement is outputted by means of combination with the ON signal during the selection period. It is also preferable that a resetting window pulse for applying, to the actuator element of the objective picture element, a voltage sufficient to restore the displacement of the actuator element is outputted during the reset period. It is also preferable that an unselecting window pulse for decreasing a difference in average voltage applied during the unselection period is outputted to the actuator element of each of the picture elements during the unselection period.

It is preferable that phase information is added to at least the ON signal so that a difference in average voltage applied during the unselection period is decreased for the actuator element of each of the picture elements.

In this embodiment, the phase information may be added to the selection pulse signal and the ON signal and/or the OFF signal respectively. Alternatively, the phase information may be also added to the reset signal in addition to the signals described above.

Preferably, the ON signal and the OFF signal are allowed to have their respective pulse widths which are made to be smaller than an address time for the row selection, and their respective phases are deviated from each other by a predetermined angle.

Besides, an alternative method is available, in which at least any one of the ON signal and the OFF signal has its pulse cycle which is 1/n of the address time (n is an arbitrary real number from 1 to 5, preferably a real number from 1 to 3).

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 14A shows a waveform of a column signal (first column) used in a first driving system;

FIG. 14B shows a waveform of a row signal (first row) used in the first driving system;

FIG. 14C shows a voltage waveform illustrating the voltage applied to a specified picture element (first row, first column);

FIG. 16 illustrates a signal form of a column signal in accordance with a second driving system for the driving device according to the embodiment of the present invention;

FIG. 17A shows a waveform of the column signal (first column) used in the second driving system;

FIG. 17B shows a waveform of a row signal (first row) used in the second driving system;

FIG. 17C shows a voltage waveform illustrating the voltage applied to a specified picture element (first row, first column);

FIG. 18 illustrates signal forms of a column signal and a row signal in accordance with a third driving system for the driving device according to the embodiment of the present invention;

FIG. 19A shows a waveform of the column signal (first column) used in the third driving system;

FIG. 19B shows a waveform of the row signal (first row) used in the third driving system;

FIG. 19C shows a voltage waveform illustrating the voltage applied to a specified picture element (first row, first column);

FIG. 22 illustrates signal forms of a column signal and a row signal in accordance with a fifth driving system for the driving device according to the embodiment of the present invention;

FIG. 23A shows a waveform of the column signal (first column) used in the fifth driving system;

FIG. 23B shows a waveform of the row signal (first row) used in the fifth driving system;

FIG. 23C shows a voltage waveform illustrating the voltage applied to a specified picture element (first row, first column);

FIG. 26 illustrates signal forms of a column signal and a row signal in accordance with a sixth driving system for the driving device according to the embodiment of the present invention;

FIG. 27A shows a waveform of the column signal (first column) used in the sixth driving system;

FIG. 27B shows a waveform of the row signal (first row) used in the sixth driving system;

FIG. 27C shows a voltage waveform illustrating the voltage applied to a specified picture element (first row, first column);

FIG. 42 shows a table illustrating a relationship between the classification into groups and the conversion variable concerning a first preferred function incorporated into the driving device according to the embodiment of the present invention;

FIG. 44 shows a table illustrating the nonlinear state of the display brightness obtained when ordinary unit gradation levels are used;

FIG. 46 shows a table illustrating an example of the use of the dummy subfield based on the second function.

DESCRIPTION OF THE PREFERRED EMBODIMENTS

Illustrative embodiments of the display-driving device and the display-driving method according to the present invention (hereinafter simply referred to as "driving device according to the embodiment") will be explained below with reference to FIGS. 1 to 46. Prior thereto, explanation will be made with reference to FIGS. 1 to 9 for the arrangement of the display to which the driving device according to the embodiment of the present invention is applied.

General Structure of Display

Figure 1:
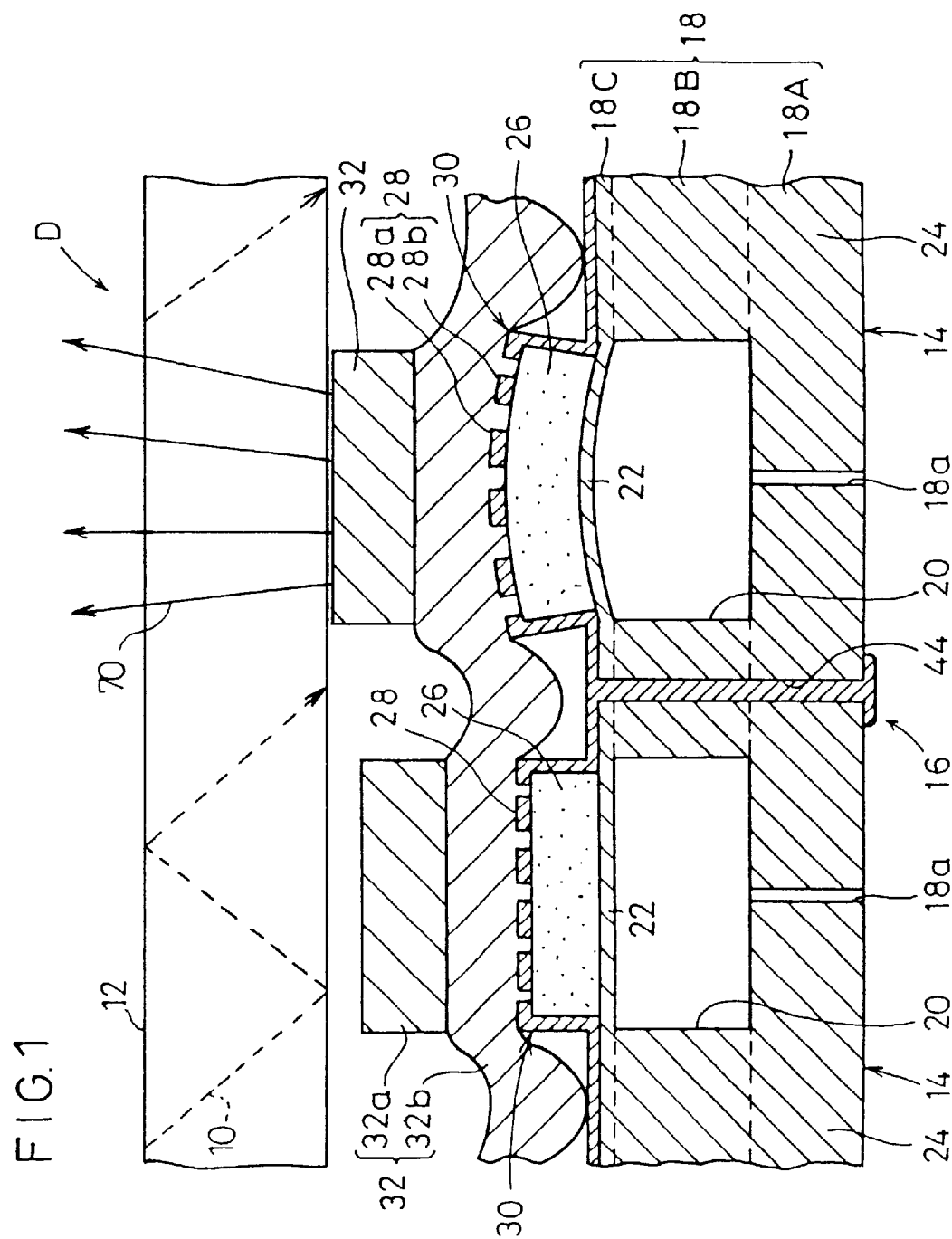
FIG. 1 shows a cross-sectional arrangement illustrating a display to which a driving device according to the embodiment of the present invention is applied.

As shown in FIG. 1, the display D comprises an optical waveguide plate 12 for introducing light 10 thereinto, and a display section 16 provided opposingly to the back surface of the optical waveguide plate 12 and including a large number of actuator elements 14 which are arranged corresponding to picture elements (image pixels).

The display section 16 includes a substrate 18 composed of, for example, a ceramic. The actuator elements 14 are arranged at positions corresponding to the respective picture elements on the substrate 18. The substrate 18 has its first principal surface which is arranged to oppose to the back surface of the optical waveguide plate 12. The first principal surface is a continuous surface (flushed surface). Hollow spaces 20 for forming respective vibrating sections as described later on are provided at positions corresponding to the respective picture elements at the inside of the substrate 18. The respective hollow spaces 20 communicate with the outside via through-holes 18a each having a small diameter and provided at a second principal surface of the substrate 18.

The portion of the substrate 18, at which the hollow space 20 is formed, is thin-walled. The other portion of the substrate 18 is thick-walled. The thin-walled portion has a structure which tends to undergo vibration in response to external stress, and it functions as a vibrating section 22. The portion other than the hollow space 20 is thickwalled, and it functions as a fixed section 24 for supporting the vibrating section 22.

That is, the substrate 18 has a stacked structure comprising a substrate layer 18A as a lowermost layer, a spacer layer 18B as an intermediate layer, and a thin plate layer 18C as an uppermost layer. The substrate 18 can be recognized as an integrated structure including the hollow spaces 20 formed at the positions in the spacer layer 18B corresponding to the picture elements. The substrate layer 18A functions as a substrate for reinforcement, as well as it functions as a substrate for wiring. The substrate 18 may be sintered in an integrated manner, or it may be additionally attached.

As shown in FIG. 1, each of the actuator elements 14 comprises the vibrating section 22 and the fixed section 24 described above, as well as a main actuator element 30 including a shape-retaining layer 26 composed of, for example, a piezoelectric/electrostrictive layer or an antiferroelectric layer directly formed on the vibrating section 22 and a pair of electrodes 28 (a row electrode 28a and a column electrode 28b) formed on an upper surface of the shape-retaining layer 26, and a displacement-transmitting section 32 connected onto the main actuator element 30 as shown in FIG. 1, for increasing the contact area with respect to the optical waveguide plate 12 to obtain an area corresponding to the picture element.

That is, the display D has the structure in which the main actuator elements 30 comprising the shape-retaining layers 26 and the pairs of electrodes 28 are formed on the substrate 18. The pair of electrodes 28 may have a structure in which they are formed on upper and lower sides of the shape-retaining layer 26, or they are formed on only one side of the shape-retaining layer 26. However, in order to advantageously join the substrate 18 and the shape-retaining layer 26, it is preferable that the pair of electrodes 28 are formed only on the upper side (the side opposite to the substrate 18) of the shape-retaining layer 26 so that the substrate 18 directly contacts with the shape-retaining layer 26 without any difference in height, as in the display D.

Explanation of shapes of respective constitutive members

Figure 2:
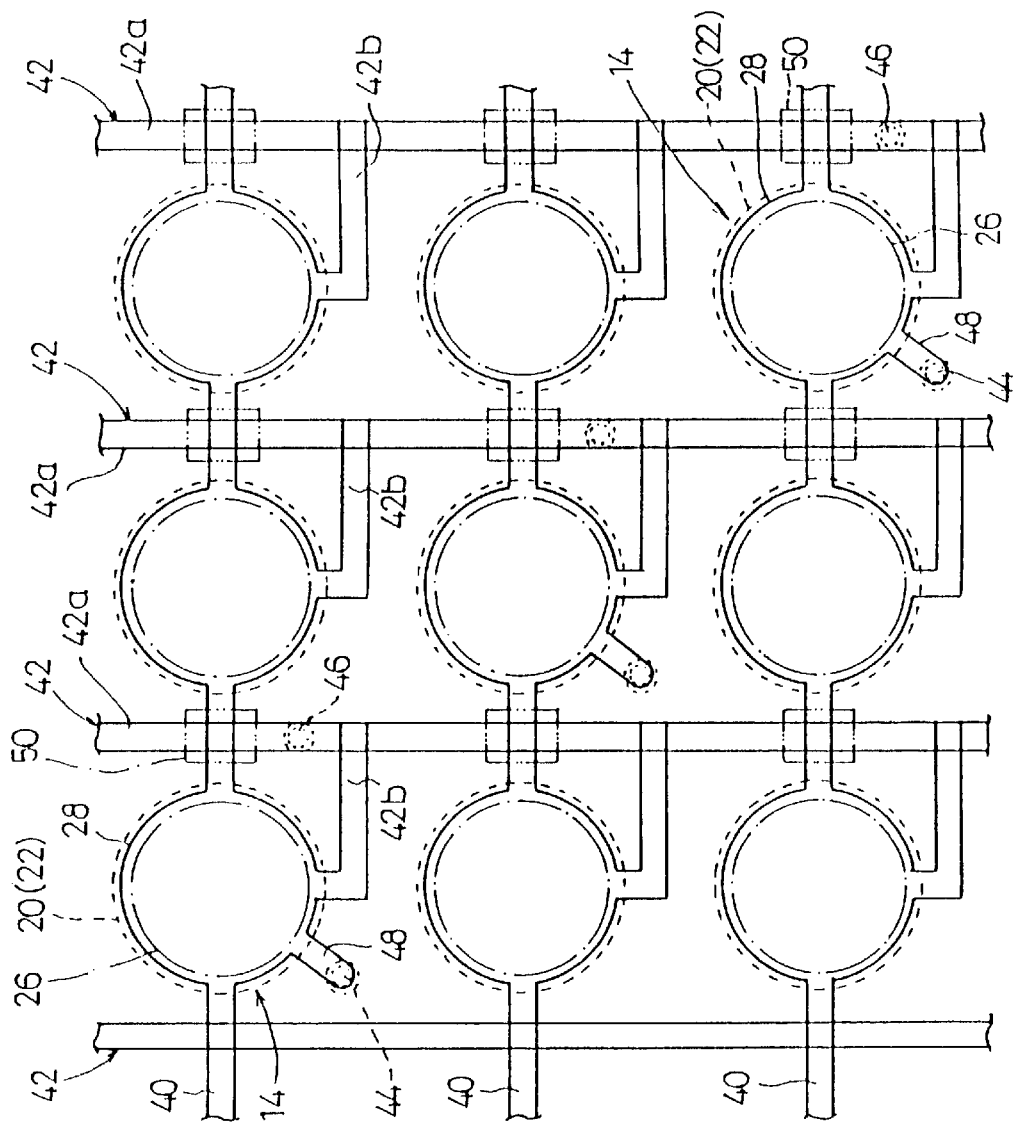
FIG. 2 shows an enlarged plan view illustrating an arrangement of actuator elements (picture elements or image pixels) included in the display.

The shapes of the respective members will now be explained below with reference to FIGS. 2 to 10. At first, as shown in FIG. 2, the hollow space 20, which is formed in the substrate 18, has a circular circumferential superficial configuration, i.e., the vibrating section 22 has a circular planar configuration (see broken lines). The shape-retaining layer 26 has a circular planar configuration (see chain lines). The pair of electrodes 28 form an outer circumferential configuration which is circular as well (see solid lines). In this embodiment, the vibrating section 22 is designed to have the largest size. The outer circumferential configuration of the pair of electrodes 28 is designed to have the second largest size. The planar configuration of the shape-retaining layer 26 is designed to have the smallest size. Alternatively, it is allowable to make design so that the outer circumferential configuration of the pair of electrodes 28 is largest.

Figure 3:
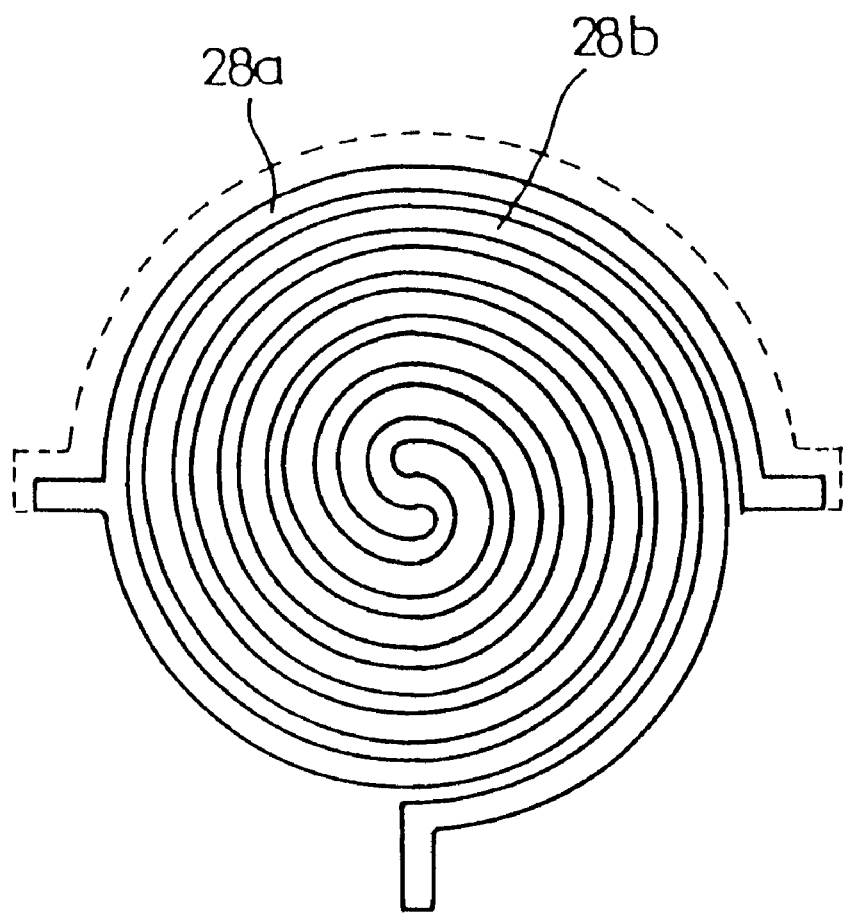
FIG. 3 shows a plan view illustrating a planar configuration (spiral configuration) of a pair of electrodes included in the display.

The pair of electrodes 28 (row electrodes 28a and column electrodes 28b) formed on the shape-retaining layer 26 have, for example, a spiral planar configuration as shown in FIG. 3, in which the pair of electrodes 28a, 28b are parallel to one another and separated from each other to form a spiral structure composed of several turns. The number of turns of the spiral is actually not less than 5 turns. However, FIG. 3 illustratively shows 3 turns in order to avoid complicated illustration.

As shown in FIG. 2, the wiring arrangement communicating with the respective electrodes 28a, 28b includes vertical selection lines 40 having a number corresponding to a number of rows of a large number of the picture elements, and signal lines 42 having a number corresponding to a number of columns of the large number of the picture elements. Each of the vertical selection lines 40 is electrically connected to the row electrode 28a of each of the picture elements (actuator elements 14, see FIG. 1). Each of the signal lines 42 is electrically connected to the column electrode 28b of each of the picture elements 14. The respective vertical selection lines 40, which are included in one row, are wired in series such that the wiring is led from the row electrode 28a provided for the picture element in the previous column, and then the wiring is connected to the row electrode 28a provided for the picture element in the present column. The signal line 42 comprises a main line 42a extending in the direction of the column, and branch lines 42b branched from the main line 42a and connected to the column electrode 28b of each of the picture elements 14.

The voltage signal is supplied to the respective vertical selection lines 40 from an unillustrated wiring board (stuck to the second principal surface of the substrate 18) via through-holes 44. The voltage signal is also supplied to the respective signal lines 42 from the unillustrated wiring board via through-holes 46.

Various arrangement patterns may be assumed for the through-holes 44, 46. However, in the illustrative arrangement shown in FIG. 2, the through-holes 44 for the vertical selection lines 40 are formed as follows provided that the number of rows is M, and the number of columns is N. In the case of N=M or N>M, the through-hole 44 is formed in the vicinity of a picture element in the nth row and nth column (n=1, 2. . . ) and at a position deviated toward the signal line (main line) in the (n−1)th column. In the case of N<M, the through-hole 44 is formed in the vicinity of a picture element in the (αN+n)th row and nth column (α=0, 1. . . (quotient of M/N−1)) and at a position deviated toward the signal line (main line) in the (n−1)th column.

On the other hand, the through-holes 46 for the signal lines 42 are formed as follows. In the case of N=M or N<M, the through-hole 46 is formed on the main line 42a of each of the signal lines 42 and at a position adjacent to a picture element in the nth row and nth column (n=1, 2. . . ). In the case of N>M, the through-hole 46 is formed on the main line 42a of each of the signal lines 42 and at a position adjacent to a picture element in the nth row and (βM+n)th column (β=0, 1. . . (quotient of N/M−1)). The through-hole 44 for the vertical selection line 40 is not formed on the vertical selection line 40, unlike the through-hole 46 for the signal line 42. Accordingly, a relay conductor 48 is formed between the through-hole 44 and the row electrode 28a, for making electric continuity therebetween.

Insulative films 50 (shown by two-dot chain lines), each of which is composed of, for example, a silicon oxide film, a glass film, or a resin film, are allowed to intervene at portions of intersection between the respective vertical selection lines 40 and the respective signal lines 42, in order to ensure insulation between the mutual wiring arrangements 40, 42.

Figure 4:
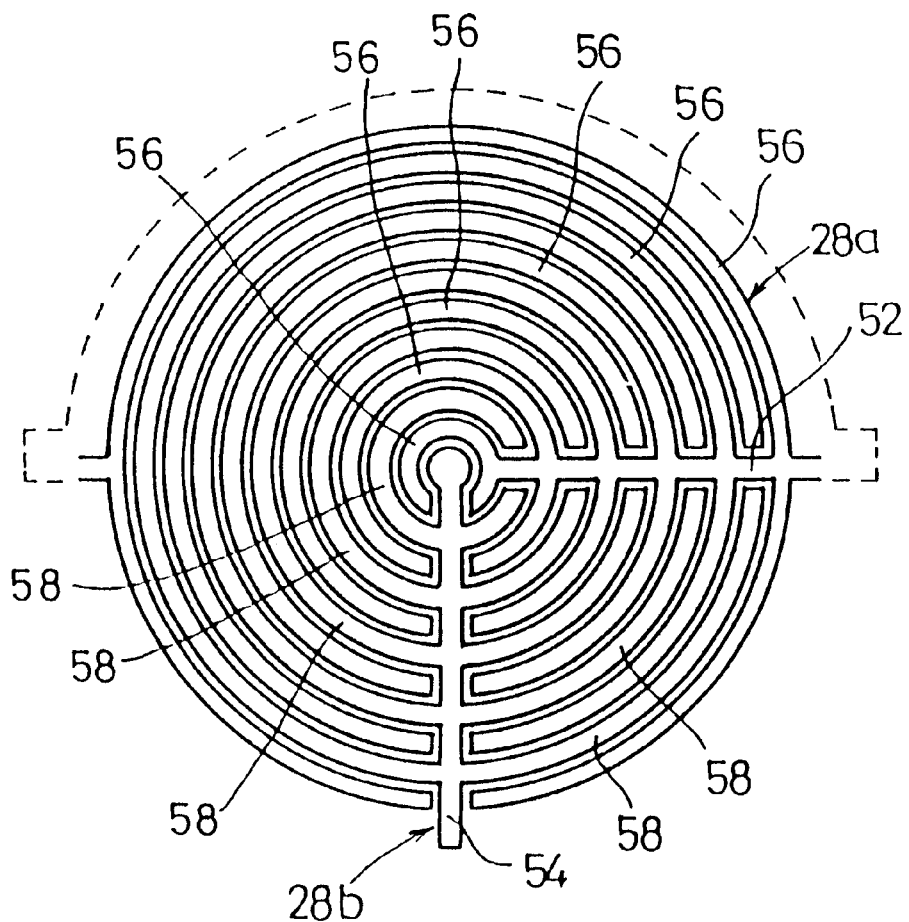
FIG. 4 shows a plan view illustrating a planar configuration (branched configuration) of a pair of electrodes included in the display.

The planar configuration of the pair of electrodes 28 is not limited to the spiral configuration as shown in FIG. 3. The planar configuration may be a configuration as shown in FIG. 4. Specifically, each of the pair of electrodes 28a, 28b has a configuration composed of a trunk 52, 54 which extends toward the center of the shape-retaining layer 26, and a lot of branches 56, 58 branched from the trunk 52, 54. In this configuration, the pair of electrodes 28a, 28b are separated from each other and arranged complementarily (hereinafter referred to as "branched configuration" for convenience).

Figure 5:
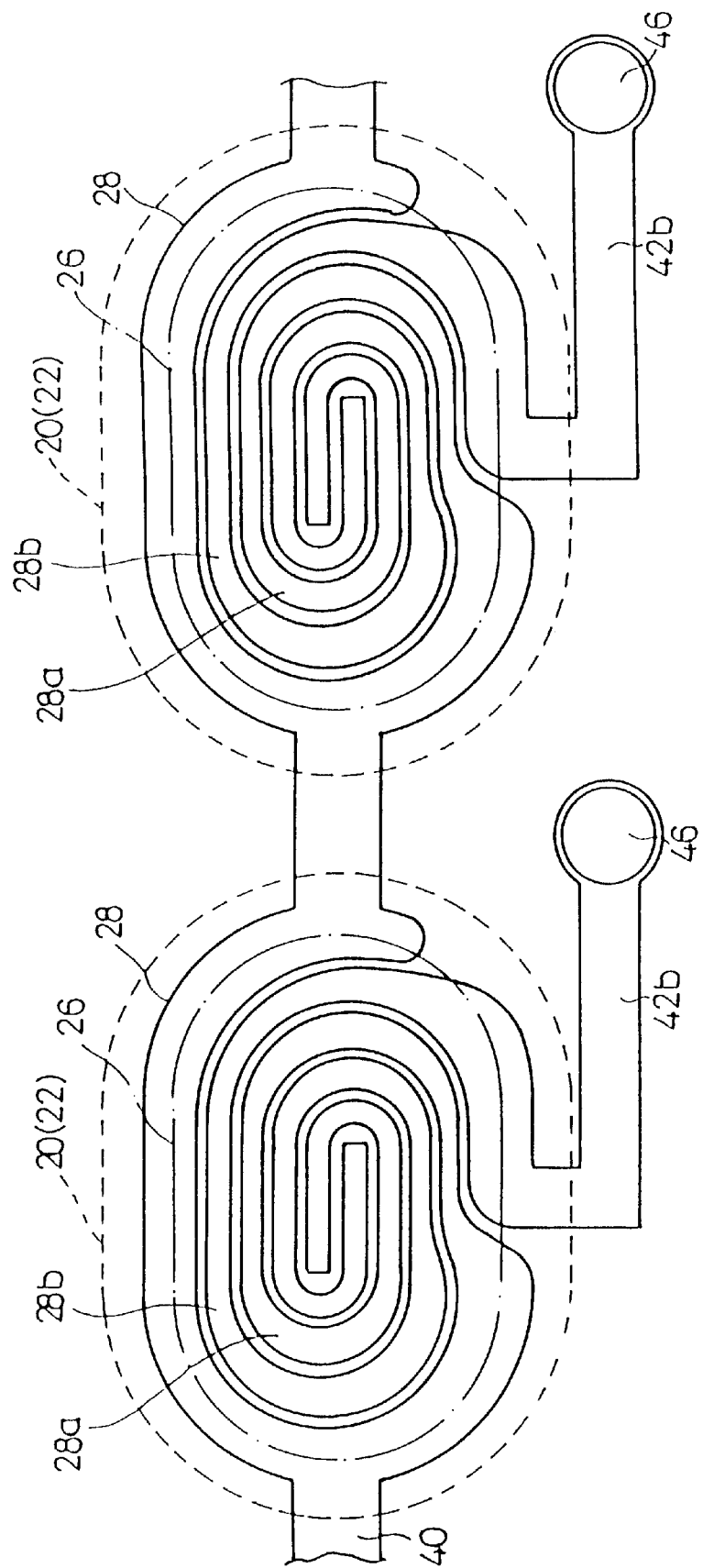
FIG. 5 shows a plan view illustrating a planar configuration (oblong configuration, spiral configuration) of a vibrating section, a shape-retaining layer, and a pair of electrodes included in the display.
Figure 6:
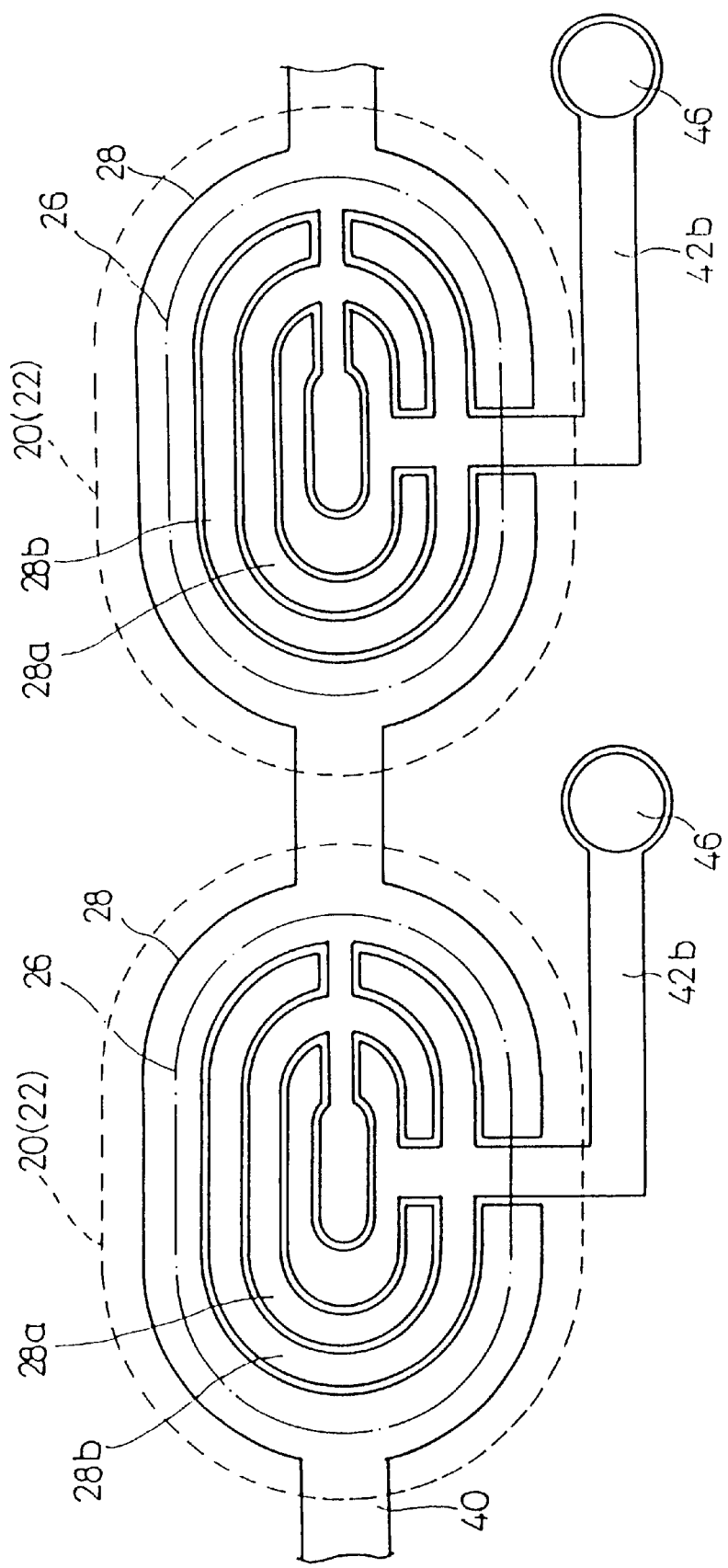
FIG. 6 shows a plan view illustrating a planar configuration (oblong configuration, branched configuration) of a vibrating section, a shape-retaining layer, and a pair of electrodes included in the display.
Figure 7:
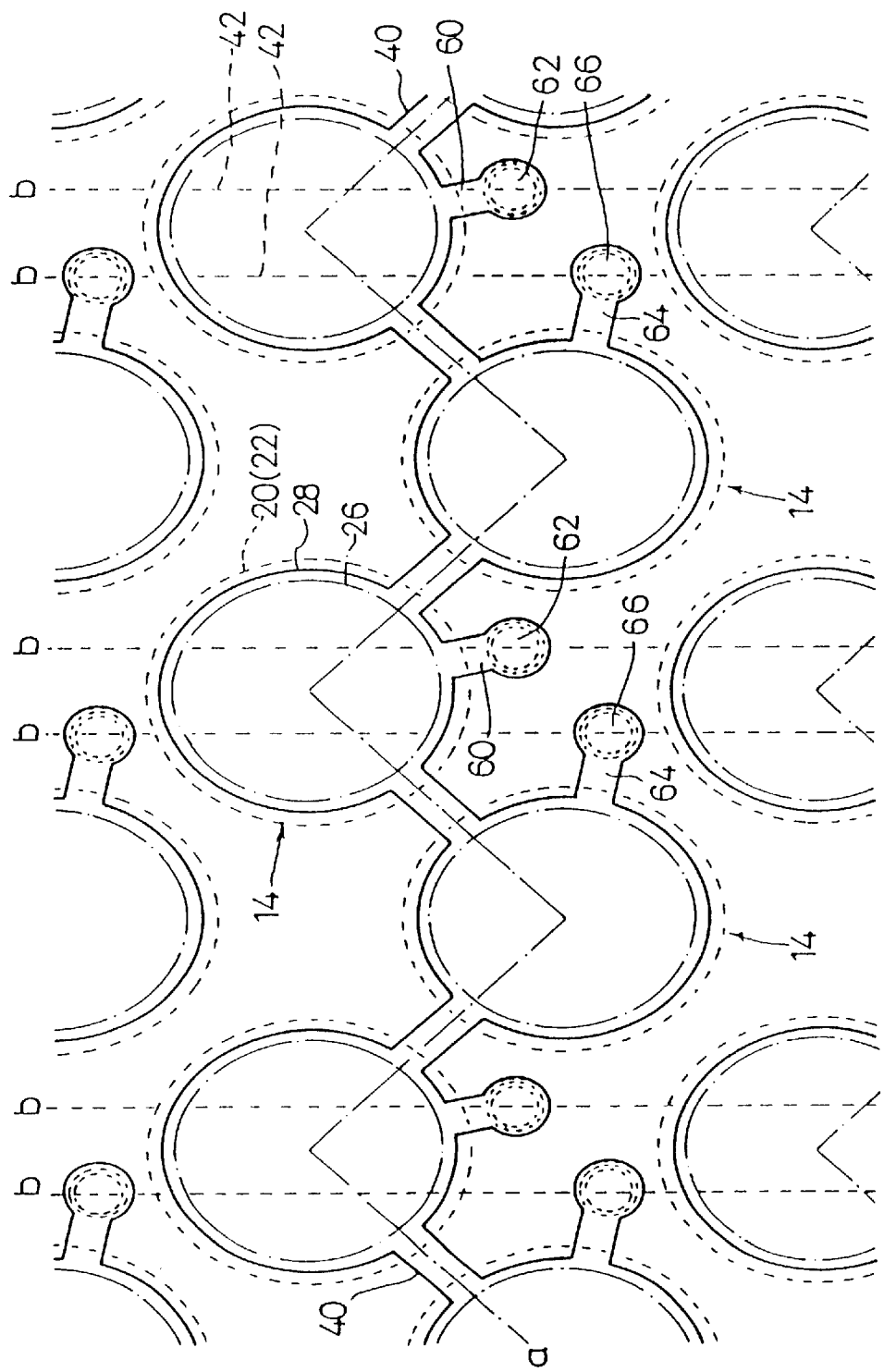
FIG. 7 shows an enlarged plan view illustrating another exemplary arrangement of actuator elements (picture elements) included in the display.

The display D constructed as described above has been explained as one having the circular planar configuration of the vibrating section 22, the circular planar configuration of the shape-retaining layer 26, and the circular outer circumferential configuration formed by the pair of electrodes 28. Alternatively, it is also preferable to use oblong configurations (track configurations) as shown in FIGS. 5 and 6, and an elliptic configuration as shown in FIG. 7.

Figure 8:
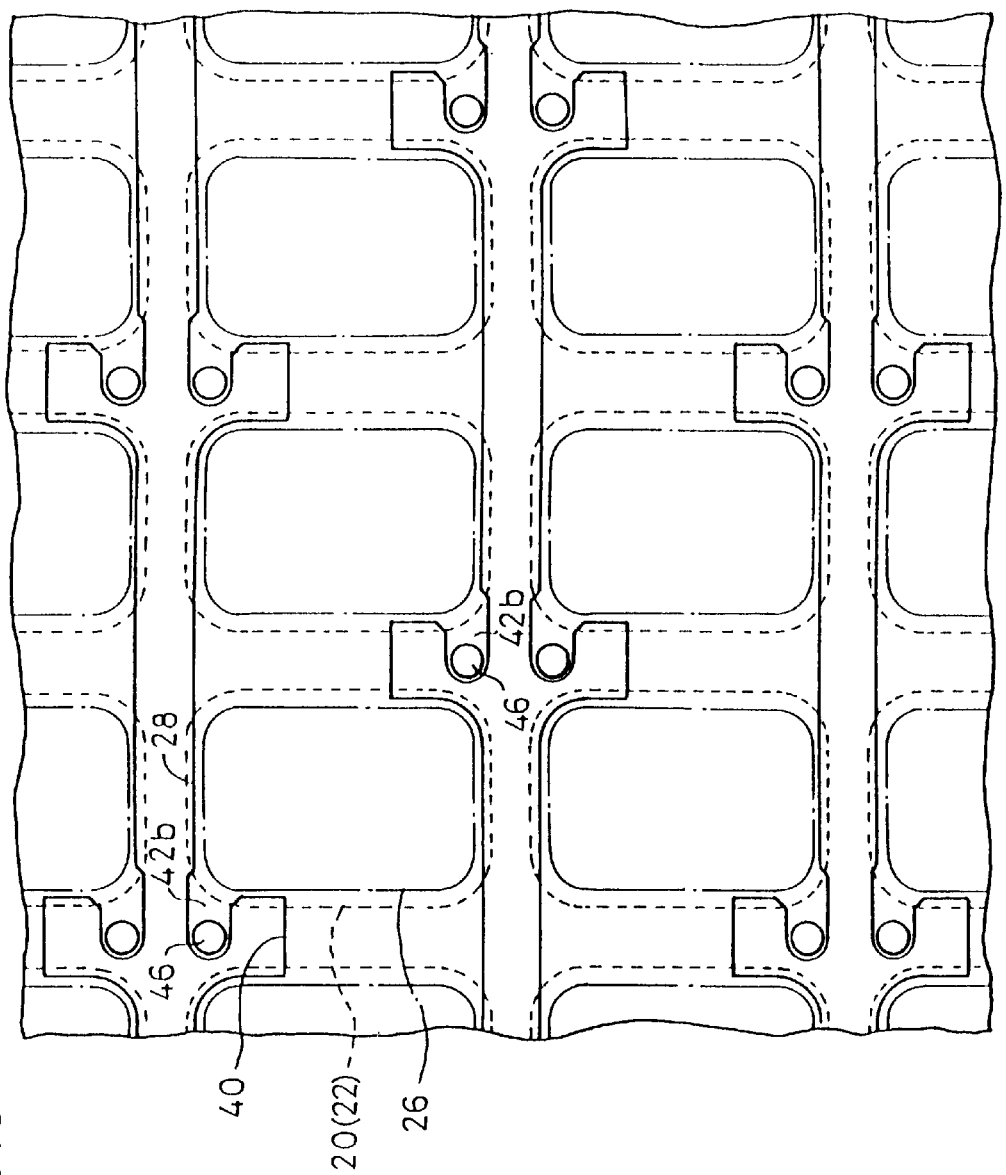
FIG. 8 shows an enlarged plan view illustrating another exemplary arrangement of actuator elements (picture elements) included in the display.

Further alternatively, both of the planar configuration of the vibrating section 22 and the planar configuration of the shape-retaining layer 26 may be rectangular configurations with smoothed corners as shown in FIG. 8. Further alternatively, both of the planar configuration of the vibrating section 22 and the planar configuration of the shape-retaining layer 26 may be polygonal configurations (for example, octagonal configurations) with respective apex angle portions having rounded shapes as shown in FIG. 9.

The configuration of the vibrating section 22, the planar configuration of the shape-retaining layer 26, and the outer circumferential configuration formed by the pair of electrodes 28 may be combinations of circular and elliptic configurations, or combinations of rectangular and elliptic configurations, without any special limitation. Although not shown, those preferably adopted as the planar configuration of the shape-retaining layer 26 include a ring-shaped configuration. In this case, those usable as the outer circumferential configuration include various ones such as circular, elliptic, and rectangular configurations. The ring-shaped planar configuration of the shape-retaining layer 26 makes it unnecessary to form any electrode on the hollow portion. Therefore, it is possible to decrease the electrostatic capacity without decreasing the displacement amount.

Figure 9:
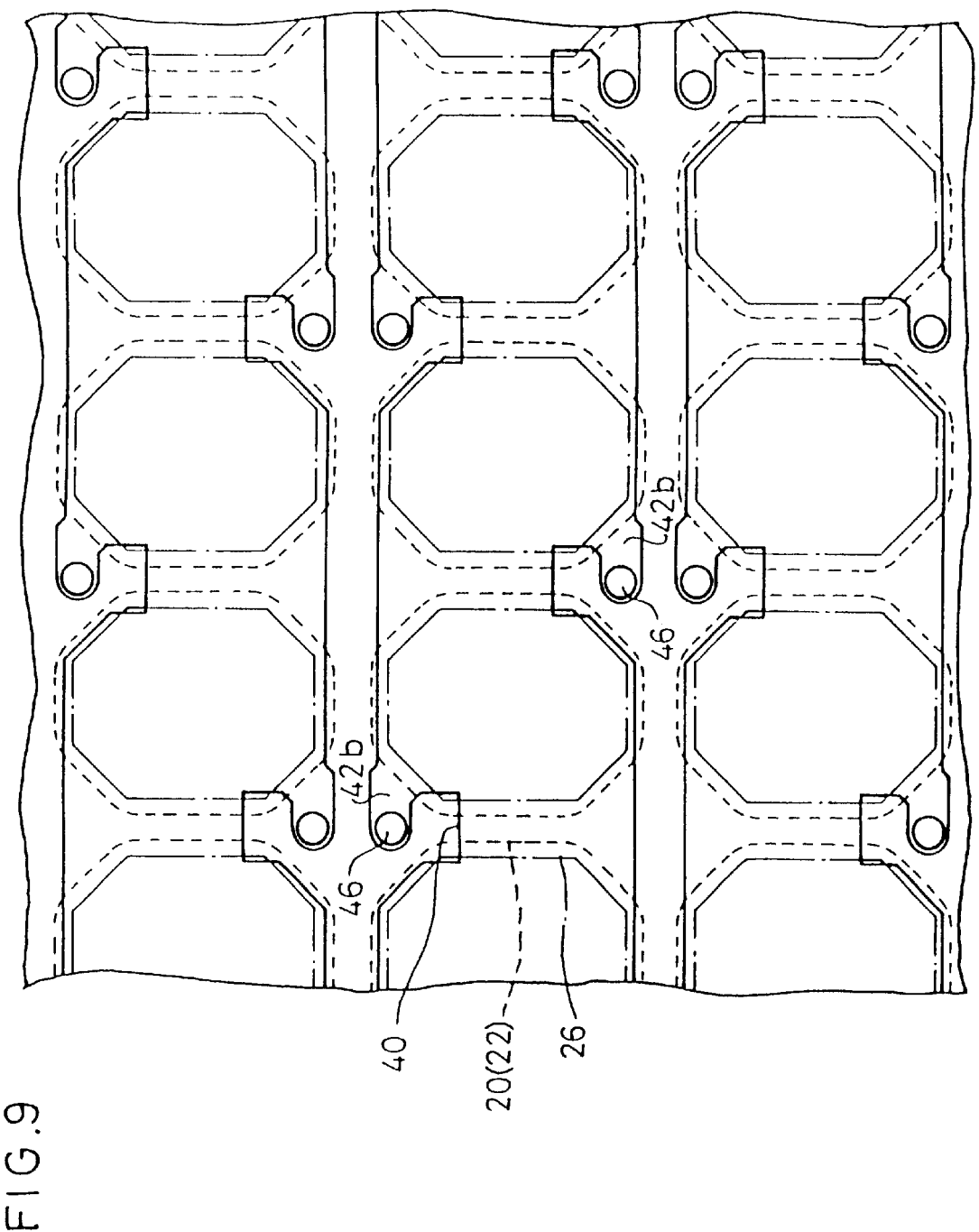
FIG. 9 shows an enlarged plan view illustrating another exemplary arrangement of actuator elements (picture elements) included in the display.

In the illustrative arrangements shown in FIGS. 2, 8, and 9, the respective actuator elements 14 (picture elements) are illustratively arranged in the matrix form on the substrate 18. Alternatively, as shown in FIG. 7, the picture elements (actuator elements) 14 may be arranged in a zigzag form with respect to the respective rows. In the case of the arrangement pattern shown in FIG. 7, the actuator elements (picture elements) 14 are arranged in the zigzag form in relation to the respective rows. Accordingly, the line (indicated by a chain line "a") connecting through the vertical selection lines 40 respectively has a zigzag form in relation to each of the rows. The signal lines 42 have a wiring pattern as shown by broken lines "b" wired on the unillustrated wiring board, in which the picture elements 14 arranged in the zigzag form are divided, for example, into a group of picture elements (actuator elements) 14 located vertically upwardly and a group of picture elements (actuator elements) 14 located vertically downwardly, and two signal lines 42 are wired mutually adjacently at positions corresponding to the former and latter groups of picture elements. In FIG. 7, the picture elements arranged in the zigzag form are wired as follows. That is, for example, the column electrode 28b of the picture element (actuator element) 14 located vertically upwardly is electrically connected to the right signal line 42 of the mutually adjacent two signal lines 42, 42, via a relay conductor 60 and a through-hole 62. The column electrode 28b of the picture element (actuator element) 14 located vertically downwardly is electrically connected to the left signal line 42 of the mutually adjacent two signal lines 42, 42, via a relay conductor 64 and a through-hole 66.

Explanation of shape-retaining layer

By the way, when the piezoelectric/electrostrictive layer is used as the shape-retaining layer 26, those usable as the piezoelectric/electrostrictive layer include ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, as well as any combination of them. It is needless to say that the major component contains the compound as described above in an amount of not less than 50% by weight. Among the ceramics described above, the ceramic containing lead zirconate is most frequently used as the constitutive material of the piezoelectric/electrostrictive layer according to the embodiment of the present invention.

When the piezoelectric/electrostrictive layer is composed of a ceramic, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof. For example, it is preferable to use a ceramic containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 26, it is desirable to use, as the anti-ferroelectric layer, a compound containing a major component composed of lead zirconate, a compound containing a major component composed of lead zirconate and lead stannate, a compound obtained by adding lanthanum to lead zirconate, and a compound obtained by adding lead zirconate and lead niobate to a component composed of lead zirconate and lead stannate.

Especially, when an anti-ferroelectric film, which contains a component comprising lead zirconate and lead stannate as represented by the following composition, is applied as a film-type element such as the anti-ferroelectric film-type element according to the first and second embodiments, it is possible to perform driving at a relatively low voltage. Therefore, application of such an anti-ferroelectric film is especially preferred.

$$Pb_{0.99}Nb_{0.02}[(Zr_xSn_{1-x})_{1-y}Ti_y]_{0.98}O_3$$

wherein, $0.5 < x < 0.6$, $0.05 < y < 0.063$, $0.01 < Nb < 0.03$

The anti-ferroelectric layer may be porous. When the anti-ferroelectric layer is porous, it is desirable that the porosity is not more than 30%.

Explanation of operation of display

Next, the operation of the display D constructed as described above will be briefly described with reference to FIG. 1. At first, the light 10 is introduced, for example, from the end portion of the optical waveguide plate 12. In this embodiment, all of the light 10 is totally reflected at the inside of the optical waveguide plate 12 without being transmitted through the front and back surfaces thereof by controlling the magnitude of the refractive index of the optical waveguide plate 12. In this state, when a certain actuator element 14 is in the selected state, and the displacement-transmitting section 32 corresponding to the actuator element 14 contacts, at a distance of not more than the wavelength of light 10, with the back surface of the optical waveguide plate 42, then the light 10, which has been totally reflected until that time, is transmitted to the surface of the displacement-transmitting section 32 contacting with the back surface of the optical waveguide plate 12.

The light 10, which has once arrived at the surface of the displacement-transmitting section 32, is reflected by the surface of the displacement-transmitting section 32, and it behaves as scattered light 70. A part of the scattered light 70 is reflected again in the optical waveguide plate 12. However, almost all of the scattered light 70 is not reflected by the optical waveguide plate 12, and it is transmitted through the front surface of the optical waveguide plate 12.

That is, the presence or absence of light emission (leakage light) at the front surface of the optical waveguide plate 12 can be controlled depending on the presence or absence of the contact of the displacement-transmitting section 32 disposed at the back of the optical waveguide plate 12. Especially, in the display device according to the embodiment of the present invention, one unit for making the displacement action of the displacement-transmitting section 32 in the direction to make contact or separation with respect to the optical waveguide plate 12 may be recognized as one picture element. A large number of the picture elements are arranged in a matrix configuration or in a zigzag configuration concerning the respective rows. Therefore, it is possible to display a picture image (characters and graphics) corresponding to the image signal on the front surface of the optical waveguide plate in the same manner as the cathode ray tube, the liquid crystal display device, and the plasma display, by controlling the displacement action in each of the picture elements in accordance with the attribute of the inputted image signal.

Principle of operation of actuator element

Figure 10:
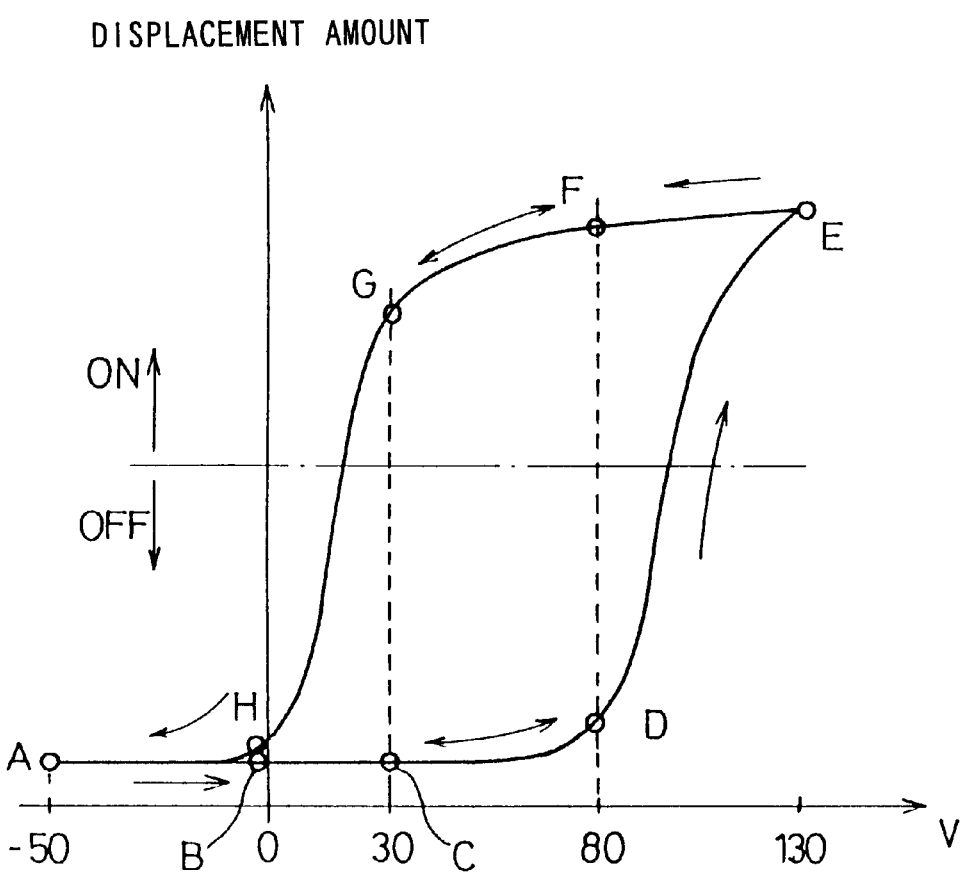
FIG. 10 shows a bending displacement characteristic of the actuator element (picture element) included in the display.

Next, the principle of operation effected in the respective actuator elements 14 when the piezoelectric layer is used as the shape-retaining layer 26 will be explained on the basis of the bending displacement characteristic shown in FIG. 10. The bending displacement characteristic shown in FIG. 10 is obtained by applying a voltage between the pair of electrodes 28a, 28b of the main actuator element 30 to perform a polarization treatment for the shape-retaining layer 26, and then observing the bending displacement of the actuator element 14 while continuously changing the voltage applied to the actuator element 14. In this embodiment, as shown in FIG. 1, the direction of bending displacement is positive when the actuator element 14 makes bending displacement in a first direction (direction to make approach to the optical waveguide plate 12).

The measurement of the bending displacement characteristic will be specifically explained with reference to an example. At first, when a voltage is applied between the pair of electrodes 28a, 28b to perform the polarization treatment for the shape-retaining layer 26, an electric field in the positive direction is generated in the superficial direction around the first principal surface of the shape-retaining layer 26.

The intensity of the electric field generated in the shape-retaining layer 26 is largest at the first principal surface, and it is gradually decreased in the depth direction. Therefore, it is difficult to advance the polarization at deep portions. However, the polarization can be allowed to proceed to portions located in the depth direction by applying a sufficient electric field and an appropriate amount of heat for a sufficient period of time.

A voltage, which exceeds the range of use of the voltage (for example, −50 V to 130 V) usable to operate the actuator element 14 of the display D, is applied, for example, for 7 hours at an appropriate temperature. Thus, the polarization treatment is achieved in the same direction as that of the generated electric field.

After that, the voltage application between the pair of electrodes 28a, 28b is stopped to give a no-voltage-loaded state. Simultaneously with the start of measurement, a sine wave having a frequency of 1 kHz, a positive peak voltage of 130 V, and a negative peak voltage of −50 V is applied between the pair of electrodes 28a, 28b of the actuator element 14. The displacement amount is continuously measured at respective points (Point A to Point H) by using a laser displacement meter. FIG. 10 shows a bending displacement characteristic obtained by plotting results of the measurement on a graph of electric field-bending displacement. As indicated by arrows in FIG. 10, the displacement amount of the bending displacement continuously changes in accordance with continuous increase and decrease in applied voltage while providing a certain degree of hysteresis.

Specifically, at first, it is assumed that the measurement is started from a no-voltage-loaded state (applied voltage=0 V) indicated by Point B. At Point B, only a uniform electric field, which is caused by the polarization treatment, is generated in the shape-retaining layer 26. Therefore, no elongation occurs in the shaperetaining layer 26, and the displacement-transmitting section 32 and the optical waveguide plate 12 are in a separated state, i.e., in the OFF state.

Next, when the positive peak voltage (=130 V) is applied between the pair of electrodes 28a, 28b of the actuator element 14, then as shown by Point E, the direction of polarization in the shape-retaining layer 26 is coincident with the direction of the electric field brought about by the applied voltage, and the electric field is applied intensely in the vicinity of the surface of the piezoelectric/electrostrictive layer 26. Therefore, the piezoelectric/electrostrictive layer 26 is elongated in the horizontal direction, and the actuator element 14 makes bending displacement in the first direction (the direction to make approach to the optical waveguide plate 12). The convex displacement of the actuator element 14 allows the displacement-transmitting section 32 to make displacement toward the optical waveguide plate 12, and the displacement-transmitting section 32 contacts with the optical waveguide plate 12.

The displacement-transmitting section 32 contacts with the back surface of the optical waveguide plate 12 in response to the bending displacement of the main actuator element 30. When the displacement-transmitting section 32 contacts with the back surface of the optical waveguide plate 12, for example, the light 10, which has been totally reflected in the optical waveguide plate 12, is transmitted through the back surface of the optical waveguide plate 12, and it is transmitted to the surface of the displacement-transmitting section 32. The light 10 is reflected by the surface of the displacement-transmitting section 32. Accordingly, the picture element corresponding to the actuator element 14 is in the ON state.

The displacement-transmitting section 32 is provided to reflect the light transmitted through the back surface of the optical waveguide plate 12, and it is provided to increase the contact area with respect to the optical waveguide plate 12 to be not less than a predetermined size. That is, the light emission area is determined by the contact area between the displacement-transmitting section 32 and the optical waveguide plate 12.

In the display D described above, the displacement-transmitting section 32 includes the plate member 32a for determining the substantial light emission area, and the displacement-transmitting member 32b for transmitting the displacement of the main actuator element 30 to the plate member 32a.

The contact between the displacement-transmitting section 32 and the optical waveguide plate 12 means the fact that the displacement-transmitting section 32 and the optical waveguide plate 12 are positioned at a distance of not more than the wavelength of the light 10 (light 10 introduced into the optical waveguide plate 12).

It is preferable that portions other than the plate member 32a which makes contact with the optical waveguide plate 12 are covered with a black matrix. Especially, it is preferable to use, for example, a metal film such as those made of Cr, Al, Ni, and Ag as the black matrix, because of the following reason. That is, such a metal film absorbs a small amount of light, and hence it is possible to suppress attenuation and scattering of the light transmitted through the optical waveguide plate 12. Therefore, such a metal film is used especially preferably.

Next, when the voltage application to the pair of electrode 28a, 28b of the actuator element 14 is stopped to give the no-voltage-loaded state, the actuator element 14 intends to make restoration from the convex state to the original state (state indicated by Point B). However, due to the hysteresis characteristic, the actuator element 14 does not undergo complete restoration to the state of Point B, and it gives a state in which it is slightly displaced in the first direction from Point B (state indicated by Point H). In this state, the displacement-transmitting section 32 and the optical waveguide plate 12 are in a state in which they are separated from each other, i.e., in the OFF state.

Next, when the negative peak voltage (−50 V) is applied between the pair of electrode 28a, 28b of the actuator element 14, then the direction of polarization in the shape-retaining layer 26 is mutually opposite to the direction of the electric field brought about by the voltage application as shown by Point A, and the shape-retaining layer 26 is contracted in the horizontal direction. Accordingly, the slight displacement in the first direction in the no-voltage-loaded state is counteracted, and the actuator element 14 completely makes restoration to the original state.

As also understood from the characteristic curve, the ON state is maintained owing to the memory function (hysteresis characteristic) of the shape-retaining layer 26 even when the applied voltage is lowered, for example, up to 30 V to 80 V after giving the ON state by applying the positive peak voltage between the pair of electrodes 28a, 28b. The memory function is also effected in the OFF state in the same manner as described above. The OFF state is maintained owing to the memory function (hysteresis characteristic) of the shape-retaining layer 26 even when the applied voltage is raised, for example, up to 30 V to 80 V after giving the OFF state by applying 0 V or the negative peak voltage between the pair of electrodes 28a, 28b.

That is, the actuator element 14 having the shaperetaining layer 26 can be defined as an actuator element which has at least two or more displacement states at an identical voltage level.

The actuator element 14 having the shape-retaining layer 26 has the following features.

(1) The threshold characteristic concerning the change from the OFF state to the ON state is steep as compared with the case in which no shape-retaining layer 26 exists. Accordingly, it is possible to narrow the deflection width of the voltage, and it is possible to mitigate the load on the circuit.

(2) The difference between the ON state and the OFF state is distinct, resulting in improvement in contrast.

(3) The dispersion of threshold value is decreased, and an enough margin is provided for the voltage setting range.

It is desirable to use, as the actuator element 14, an actuator element 14 which makes, for example, upward displacement (giving the separated state upon no voltage load and giving the contact state upon voltage application) because of easiness of control. Especially, it is desirable to use the structure having the pair of electrodes 28a, 28b on the surface.

Explanation of driving device

Figure 11:
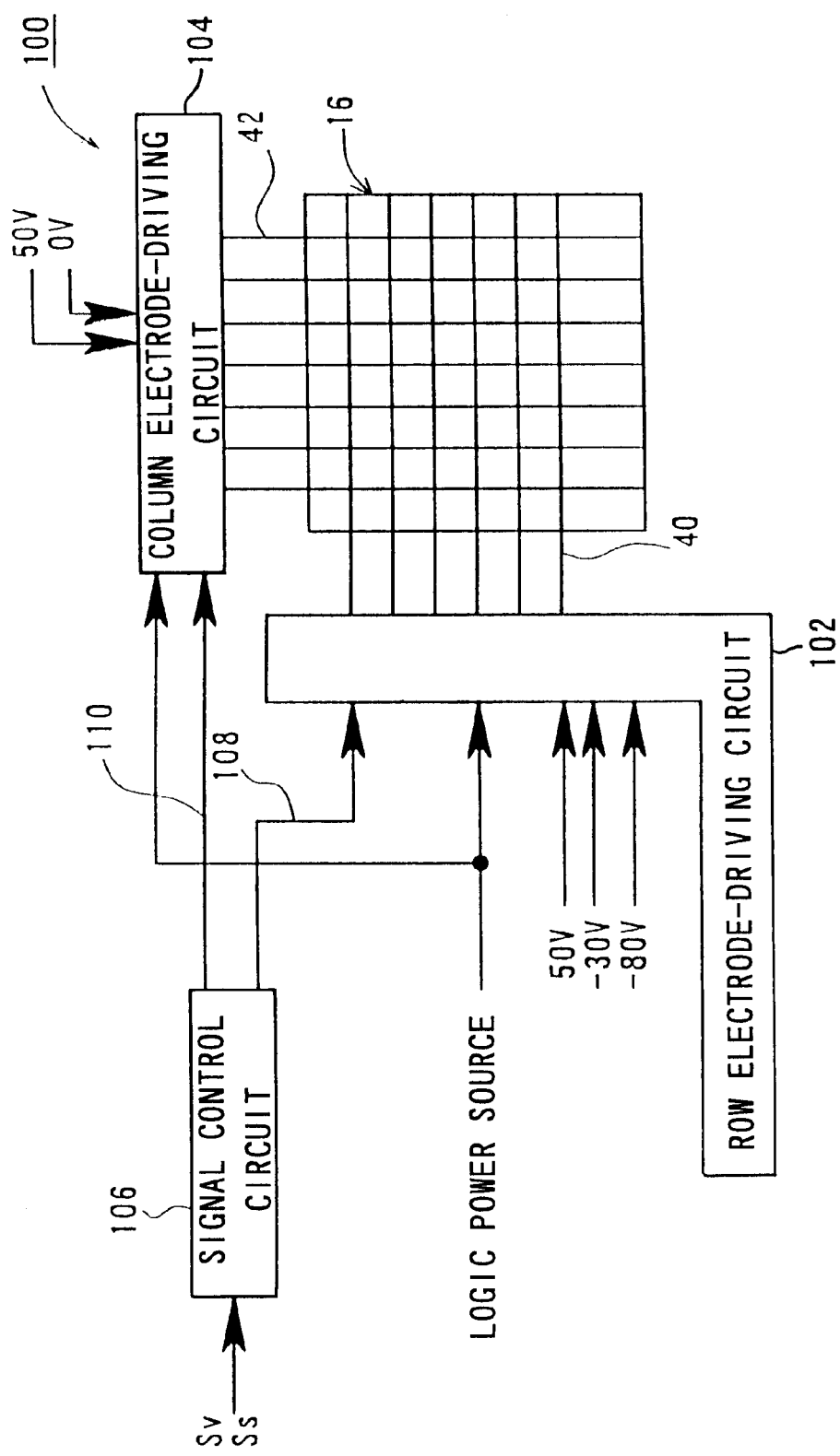
FIG. 11 shows an arrangement of the driving device according to the embodiment of the present invention.

Next, explanation will be made for a driving device 100 according to the embodiment of the present invention with reference to FIG. 11. The driving device 100 comprises a row electrode-driving circuit for selectively supplying a driving signal to the vertical selection lines 40 (connected in series to the row electrodes 28a of the actuator elements 14 for the respective rows) for the display section 16 comprising a large number of actuator elements 14 arranged in the matrix configuration or in the zigzag configuration so that the actuator elements 14 are successively selected in one row unit, a column electrode-driving circuit 104 for outputting a data signal in parallel to the signal lines 42 for the display section 16 so that the data signal is supplied to the column electrodes 28b of the respective actuator elements 14 on the line (selected line) selected by the row electrode-driving circuit 102 respectively, and a signal control circuit 106 for controlling the row electrode-driving circuit 102 and the column electrode-driving circuit 104 on the basis of a picture image signal Sv and a synchronization signal Ss to be inputted.

A logic power source voltage (for example, ±5 V) for logical operation performed in an internal logic circuit, and three types of row side power source voltages (for example, 50 V, −30 V, and −80 V) are supplied to the row electrode-driving circuit 102 by the aid of an unillustrated power source circuit. The logic power source voltage and two types of column side power source voltages (for example, 50 V and 0 V) are supplied to the column electrode-driving circuit 104 by the aid of the unillustrated power source circuit.

The signal control circuit 106 comprises, at its inside, a timing controller, a frame memory, and an I/O buffer, which is constructed such that the row electrode-driving circuit 102 and the column electrode-driving circuit 104 are subjected to gradation control on the basis of the temporal modulation system via a row side control line 108 communicating with the row electrode-driving circuit 102 and a column side control line 110 communicating with the column electrode-driving circuit 104.

It is desirable that the row electrode-driving circuit 102 and the column electrode-driving circuit 104 have the following features.

(1) The actuator element undergoes the capacitive load. Therefore, considering the fact that the capacitive load is subjected to the driving, for example, it is desirable that the partial voltage ratio, which is applied to the capacitive load, is not less than 50% at the time of completion of voltage (ON voltage) application for allowing the actuator element 14 to make the bending displacement.

(2) In order to obtain an displacement amount of the actuator element 14 which makes it possible to express the ON state and the OFF state of the picture element, it is desirable that an voltage output of not less than 20 V can be provided.

(3) It is desirable to consider the fact that the direction of the output current is recognized to be bidirectional.

(4) It is desirable that the load concerning the two-electrode structure in the row direction and the column direction can be subjected to the driving.

Explanation of gradation control based on temporal modulation system

The gradation control based on the temporal modulation system will now be explained with reference to FIGS. 12 and 13. At first, the display period for one image is assumed to be one field, and one divided period, which is obtained by equally dividing the one field, for example, into eight, is assumed to be a subfield. On this assumption, the effective display period Td is set for each of the subfields. The effective display period Td is set such that it is longest in the initial subfield (first subfield SF1), and it becomes short at a ratio of ½ along with passage of the subfield.

The length of the effective display period Td is expressed by the size of the data value as follows. That is, as shown in FIG. 12, when the effective display period of the first subfield SF1 is assumed to be, for example, "512", then the second subfield SF2 is set to have "256", the third subfield SF3 is set to have "128", the fourth subfield SF4 is set to have "64", the fifth subfield SF5 is set to have "32", the sixth subfield SF6 is set to have "16", the seventh subfield SF7 is set to have "8", and the eighth subfield SF8 is set to have "4".

In this embodiment, the row electrode-driving circuit 102 is subjected to timing control by the aid of the signal control circuit 106 so that all row selection is completed in the respective subfields SF1 to SF8. Therefore, the time for the row electrode-driving circuit 102 to select one row is restricted by the duration obtained by dividing the duration of one subfield by the number of rows of the display section 16, for which the obtained duration or the time shorter than the obtained duration is selected. It is preferable to select 1/n of the obtained duration (n is an arbitrary real number from 1 to 5, preferably a real number from 1 to 3). The time for the row electrode-driving circuit 102 to select one row corresponds to the time required to switch the address for the display section 16. Therefore, the time described above can be defined as the address time Ta.

In the driving device 100 according to the embodiment of the present invention, the address time Ta is set to be 1/n of the duration described above. Further, as shown in FIG. 13, each of the effective display periods Td is divided into the selection period Ts and the unselection period Tu. The reset period Tr and the unselection period Tu are provided between the effective display period Td of a certain subfield and the effective display period Td of the next subfield. The example shown in FIG. 13 shows a simplified format illustrating a case in which one field is divided into three subfield SF1 to SF3, and the line number is 4, in order to avoid complicated illustration.

In the embodiment of the present invention, the selection period Ts and the reset period Tr are set to be the same time as the address time Ta. Therefore, as for each of the subfields SF1 to SF8, all of the period except for the selection period Ts and the reset period Tr, i.e., the period obtained by subtracting 2×address time from the period of the subfield is the unselection period Tu. However, in order to completely reset (make restoration to the original position of) the displacement of the actuator element 14, it is allowable that the reset period Tr is set to be longer than the address time Ta.

Further, in the embodiment of the present invention, the signal control circuit 106 is operated for each of the picture elements concerning the selected line to prepare the data signal by allotting the display time corresponding to each gradation level to the effective display period Td of each of the subfields SF1 to SF8. Obtained data signals are outputted by the aid of the column electrode-driving circuit 104 during the selection periods Ts in the respective subfields SF1 to SF8.

Accordingly, for example, simultaneously with the start of one field, the picture element group included in the first row is selected by the row electrode-driving circuit 102. The data signal is supplied to the picture element group included in the first row by the aid of the column electrode-driving circuit 104. The data signal, which is supplied to each of the picture elements, is the data signal (for example, ON signal and OFF signal) prepared by allotting the display time corresponding to the gradation level to the effective display period Td of each of the subfields SF1 to SF8. When one picture element is considered, the display time corresponding to the gradation level of the picture element is assigned to the duration allotted to each of the subfields. In this procedure, the display time is assigned to all of the subfields in some cases, and the display time is assigned to several subfields in other cases.

For example, when the gradation level of the concerning picture element is 1020, all of the subfields SF1 to SF8 are selected. When the gradation level is 656, the first, third, and sixth subfields SF1, SF3, and SF6 are selected.

The output form of the data signal supplied to the concerning picture element is as follows. That is, for example, it is possible to adopt a form in which the ON signal is outputted to the selected subfield, and the OFF signal is outputted to the unselected subfield.

Explanation of first driving system

Specifically, the first driving system for the driving device 100 according to the embodiment of the present invention will be explained with reference to a timing chart shown in FIG. 14. In this embodiment, in order to simplify the explanation, the explanation will be directed only to a display pattern of the picture elements in the first column provided that the number of rows is 8. In FIG. 14, a horizontal stripe pattern is assumed to illustrate a case in which light emission is effected on odd number rows, and light-off is effected on even number rows. The timing chart shown in FIG. 14 illustrates respective waveforms of a column signal Sc for the first column, a row signal Sr for the first row, and an applied voltage Vp for the picture element in the first row and first column.

In the first driving system, the row electrode-driving circuit 102 outputs a selection pulse signal Ps during the selection period Ts (address time Ta) of the effective display period Td, it outputs an unselection signal Su during the unselection period Tu during the effective display period Td and during the unselection period Tu after the reset period Tr, and it outputs a reset pulse signal Pr during the reset period Tr.

More specifically, the selection pulse signal Ps has a pulse waveform in which the pulse width is approximately the same as the selection period Ts (address time Ta), and the peak voltage is −80 V. The unselection signal Su is fixed at the reference level (−30 V). The reset pulse signal Pr has a pulse waveform in which the pulse width is approximately the same as the reset period Tr (address time Ta), and the peak voltage is +50 V.

The ON signal, which is deflected in the direction opposite to the polarity of the selection pulse signal Ps, is outputted by the column electrode-driving circuit 104 during the selection period Ts in the effective display period Td of the allotted subfield of the respective subfields. The OFF signal is outputted during the selection period Ts in the effective display period Td of the subfields other than the above. That is, in the embodiment shown in FIG. 14, the ON signal (50V) is outputted during the output period corresponding to the odd number rows, and the OFF signal (0 V) is outputted during the output period corresponding to the even number rows.

Therefore, as for the picture element in the first row and first column, the ON signal (50 V) is applied to the column electrode 28b during the selection period Ts, and the selection pulse signal Ps (−80 V) is applied to the row electrode 28a. Accordingly, the voltage Vp applied between the pair of electrodes 28a, 28b of the picture element is 130 V. Thus, the picture element is allowed to be in the ON state, and it makes light emission, according to the bending displacement characteristic shown in FIG. 10.

The ON signal and the OFF signal are alternately applied to the column electrode 28b during the unselection period Tu after the selection period Ts. Therefore, a difference of 30 V between the OFF signal (0V) and the reference level (−30 V), and a difference of 80 V between the ON signal (50 V) and the reference level (−30 V) are alternately applied between the pair of electrodes 28a, 28b of the picture element. In this procedure, as also shown in the characteristic curve in FIG. 10, the actuator element 14 of the concerning picture element repeatedly makes the displacement at 80 V (Point F) and the displacement at 30 V (Point G). Thus, the light emission effected by the concerning picture element is maintained although the displacement fluctuates within a certain range.

During the reset period Tr, the OFF signal (0 V) is applied to the column electrode 28b, and the reset pulse signal Pr (+50 V) is applied to the row electrode 28a. Therefore, the voltage Vp applied between the pair of electrodes 28a, 28b of the picture element is −50 V. Thus, the picture element is in the OFF state, and it undergoes light-off, according to the bending displacement characteristic shown in FIG. 10.

The ON signal and the OFF signal are alternately applied to the column electrode 28b during the unselection period Tu after the reset period Tr, in the same manner as performed in the unselection period Tu after the selection period Ts. Therefore, the voltages of 30 V and 80 V are alternately applied between the pair of electrodes 28a, 28b of the concerning picture element. In this procedure, as also shown in the characteristic curve in FIG. 10, the actuator element 14 of the concerning picture element repeatedly makes the displacement at 80 V (Point D) and the displacement at 30 V (Point C). Thus, the light-off effected by the picture element is maintained although the displacement fluctuates within a certain range.

As for other picture elements, for example, as for the picture element of the second row and first column, the OFF signal is supplied during the selection period Ts. Therefore, a difference of 80 V between the voltage (0 V) of the OFF signal and the voltage (−80 V) of the selection pulse signal Ps is applied between the pair of electrodes 28a, 28b. The actuator element 14 of the concerning picture element is restored to the original state by means of the reset period Tr at the previous timing. Therefore, the displacement state at Point D is given, and the light-off effected by the concerning picture element is maintained as it is.

Thus, an image is displayed on the display screen by successively repeating the series of operations described above.

As described above, according to the first driving system, it is unnecessary to perform, for example, complicated voltage switch and voltage selection even when the range of display gradation of each picture element is widened. Therefore, it is possible to suppress the setting number of working voltages to the minimum.

As shown in FIG. 10, the actuator element 14 for constructing each of the picture elements has the memory function for the bending displacement. However, in the driving device 100 according to the embodiment of the present invention, the peak value of the pulse signal for the row selection is a voltage value at which the actuator element 14 sufficiently makes the bending displacement in the first direction, the voltage value during the unselection period Tu thereafter is set within a range in which the actuator element 14 is capable of storing the displacement, and the voltage value during the reset period Tr indicating the completion of the effective display period Td is set to be a voltage value in a degree for the actuator element 14 to make restoration. Therefore, it is possible to easily control the actuator element 14 in accordance with the temporal modulation system. Further, the voltage value during the unselection period Tu is set to be the voltage value described above (voltage value within the range in which the actuator element 14 is capable of storing the displacement). Therefore, the selection period Ts can be made further short, for example, it can be made short up to the address time Ta.

By the way, it is necessary during the unselection period Tu that the state of bending displacement of the actuator element 14 is maintained as it is. Therefore, ideally, it is desirable to apply a fixed electric potential in a degree in which the bending displacement of the actuator element 14 is not affected thereby during the unselection period Tu.

However, in each of the subfields, all of the row selection is completed. Therefore, the data signal for another row (ON signal and OFF signal) successively appear during the unselection period Tu for each of the subfields. That is, as for one picture element, the voltage waveform of the concerning picture element during the unselection period Tu is determined depending on the pattern of the data signal (appearance pattern of the ON signal and the OFF signal) for the rows other than the row to which the concerning picture element belongs in the column to which the concerning picture element belongs.

Figure 15A:
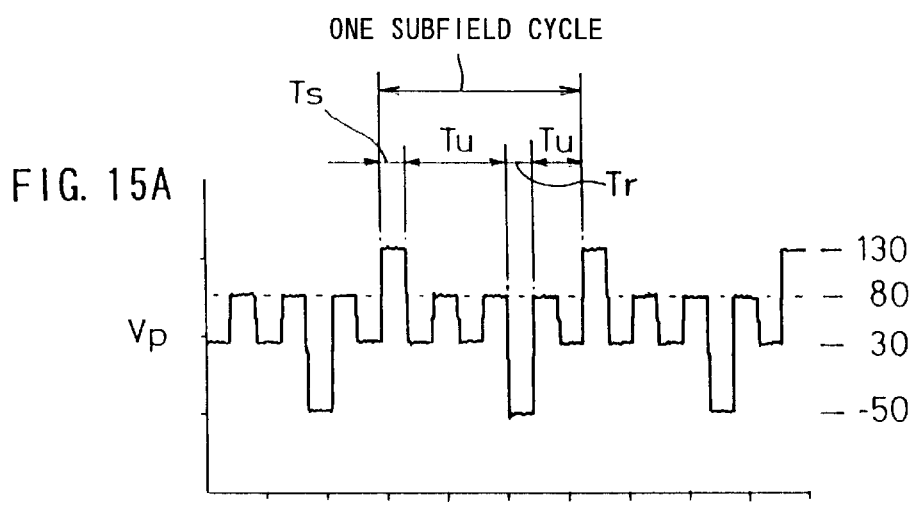
FIG. 15A shows a waveform illustrating the applied voltage shown in FIG. 14C.
Figure 15B:
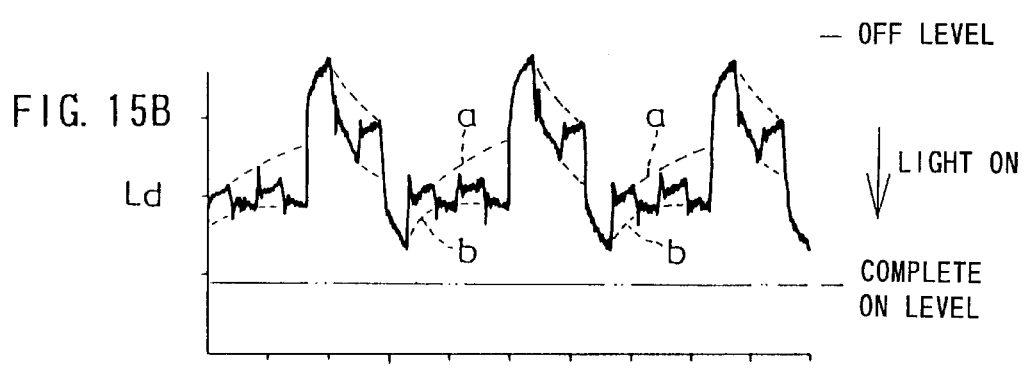
FIG. 15B shows the distribution of light emission intensities of picture elements, obtained in accordance with the first driving system.

This fact will be specifically explained with reference to FIGS. 14A to 14C and FIGS. 15A and 15B. FIG. 15A shows a voltage waveform of the voltage Vp applied between the pair of electrodes 28a, 28b. FIG. 15B shows a graph obtained by supplying the applied voltage Vp to the actuator element 14, and measuring, with a photodiode, the change in intensity of light (Ld) scattered by the picture element.

At first, as shown by a chain line "a" in FIG. 14A, for example, when the ON signal is outputted for all of the rows except for the row (first row) including the picture element in the first row and first column, the average voltage of the concerning picture element during the unselection period Tu is fixed at a voltage level (conveniently referred to as "high voltage level (80 V)") obtained by subtracting the reference level (−30 V) from the voltage level (50 V) of the ON signal as shown by a chain line "a" in FIG. 14C. At this time, the light emission intensity of the concerning picture element is distributed along a broken line "b" shown in FIG. 15B.

Next, as shown by a broken line "b" in FIG. 14A, when the OFF signal is outputted for all of the rows except for the row (first row) including the concerning picture element, the average voltage is fixed at a voltage level (conveniently referred to as "low voltage level (30 V)") obtained by subtracting the reference level (−30 V) from the voltage level (0 V) of the OFF signal as shown by a chain line "b"

in FIG. 14C. At this time, the light emission intensity of the concerning picture element is distributed along a broken line "a" shown in FIG. 15B.

Therefore, in this situation, there is a difference of 50 V between the average voltage of 80 V during the unselection period obtained when the ON signal is outputted for all of the other rows and the average voltage of 30 V obtained when the OFF signal is outputted for all of the other rows.

As shown by a solid line in FIG. 14A, when the ON signal and the OFF signal are alternately outputted in the unit of row for all of the rows except for the row (first row) including the concerning picture element, the average voltage is an intermediate voltage between the high voltage level (80 V) and the low voltage level (30 V).

As a result, the bending displacement of the actuator element 14 during the unselection period Tu is delicately changed depending on the voltage change (voltage change depending on the pattern of the ON signal and the OFF signal). Especially, when the ON signal or the OFF signal is outputted for a cluster of a large number of rows, the difference in average voltage is large. Therefore, there is a possibility that the display state (brightness and gradation) of the concerning picture element during the unselection period Tu may become unstable.

Further, for example, when the ON signal is outputted for all of the rows, there is a possibility that a state may be given in which the actuator element 14 of the concerning picture element is not sufficiently restored (state of slight displacement in the first direction from the position of Point B), because the voltage Vp applied between the pair of electrodes 28a, 28b during the reset period is a voltage obtained by subtracting the voltage (50 V) of the reset pulse signal Pr from the voltage (50 V) of the ON signal as shown in FIG. 14C, namely because the voltage of 0 V is applied. It is feared that any inconvenience concerning brightness occurs during the display cycle effected thereafter. For this reason, it is necessary to use a large reset voltage which compensates the difference caused by the pattern of the ON signal and the OFF signal.

When the ON signal and the OFF signal alternately appear, then the average voltage waveform in this case is not fixed to the intermediate voltage described above, and it fluctuate with a certain offset, because the pulse width of the ON signal and the OFF signal is approximately the same as the selection period Ts.

The second to sixth driving systems described below are provided as driving systems to dissolve the problem as described above, in which phase information is added to the ON signal, the OFF signal, the selection pulse signal Ps, or the reset pulse signal Pr.

Explanation of second driving system

At first, the second driving system will be explained with reference to FIG. 16 and FIGS. 17A to 17C. As shown in FIG. 16, the second driving system is a system in which phase information is added to only the ON signal. In this embodiment, the ON signal has a waveform in which it rises simultaneously with the start of the selection period Ts, and the pulse width is ½ of the address time Ta. The OFF signal is 0 V and constant in this embodiment. As shown in FIG. 17B, the respective output timings of the selection pulse signal Ps, the unselection signal Su, and the reset pulse signal Pr are the same as those used in the first driving system (see FIG. 14B).

Accordingly, as shown in FIG. 16, the ON signal constitutes a pulse signal in which the high level and the low level exist in a mixed manner within one address time Ta.

When consideration is made for one picture element as described above, the following situation is given. That is, when the ON signal and the OFF signal are alternately outputted in the unit of row (see a solid line "a") as shown in FIG. 17A, and when the ON signal is outputted for all of the other rows (see a chain line "b") as shown in FIG. 17A, then the pulse signal having an amplitude of (high voltage level (80 V)-low voltage level (30 V)) appears on every second one (see a solid line "c") or continuously (see a chain line "d") during the unselection period Tu for the concerning picture element as shown in FIG. 17C. When the OFF signal is outputted for all of the other rows, the pulse waveform is not generated during the unselection period Tu for the concerning picture element, giving a constant voltage of 30 V.

In this embodiment, when the ON signal is outputted for all of the other rows, the average voltage during the unselection period Tu is 55 V. When the OFF signal is outputted for all of the other rows, the average voltage is 30 V. The difference between the average voltages is 25 V which is lower than the value (50 V) used in the first driving system described above.

As described above, in the second driving system, it is possible to lower the difference in average voltage during the unselection period Tu. Therefore, the display state (brightness and gradation) during the unselection period Tu is stabilized.

When the picture element is turned ON, the actuator element 14 is applied with the ON signal having the polarity different from that of the selection pulse signal Ps during the output period (selection period Ts) of the selection pulse signal Ps. Therefore, a voltage (130 V) sufficient to displace the actuator element 14 in the first direction is applied between the pair of electrodes 28a, 28b of the actuator element 14 of the picture element over a period of time of ½ of the address time Ta from the start point of time of the selection period Ts.

When the OFF signal is supplied during the selection period Ts, a voltage of 80 V is applied between the pair of electrodes 28a, 28b of the actuator element 14 over the selection period Ts. Therefore, the light-off state obtained in the reset period Tr is maintained for the picture element to which the OFF signal is supplied.

In the second driving system, the pulse width of the reset pulse signal Pr is approximately the same as the address time Ta. Therefore, a voltage (−50 V) sufficient to restore the actuator element 14 to the original position is necessarily applied during the reset period Tr for the concerning picture element.

Specifically, when the ON signal is applied to those included in another row during the period in which the reset pulse signal Pr is applied to the concerning picture element, the voltage of −50 V is applied during the period of the reset period Tr except for the pulse width of the ON signal. When the OFF signal is applied to those included in another row, the voltage of −50 V is applied during all of the reset period Tr. Accordingly, the actuator element 14 can be completely restored, and it can be subjected to light-off during the reset period Tr. No inconvenience in brightness and gradation appears in the following display cycle. It is unnecessary to use any large reset voltage to compensate the difference caused by the pattern of the ON signal and the OFF signal.

Explanation of third driving system

Next, the third driving system will be explained with reference to FIG. 18 and FIGS. 19A to 19C. As shown in FIG. 18, the third driving system is a system in which phase information is added to the ON signal and the selection pulse signal Ps respectively. In this embodiment, the ON signal has a waveform in which it rises simultaneously with the start of the selection period Ts, and the pulse width is ½ of the address time Ta. The selection pulse signal Ps has a phase opposite to that of the ON signal. The OFF signal is 0 V and constant in this embodiment. As shown in FIG. 19B, the output timings of the unselection pulse signal Su and the reset pulse signal Pr are the same as those used in the first driving system (see FIG. 14B).

That is, the ON signal and the selection pulse signal Ps constitute a pulse signal respectively in which the high level and the low level exist in a mixed manner within one address time Ta.

Also in this embodiment, when consideration is made for one picture element, the following situation is given. That is, when the ON signal and the OFF signal are alternately outputted in the unit of row (see a solid line "a") as shown in FIG. 19A, and when the ON signal is outputted for all of the other rows (see a chain line "b") as shown in FIG. 19A, then the pulse signal having an amplitude of (high voltage level (80 V)—low voltage level (30 V)) appears on every second one (see a solid line "c") or continuously (see a chain line "d") during the unselection period Tu for the concerning picture element as shown in FIG. 19C. When the OFF signal is outputted for all of the other rows, the pulse waveform is not generated during the unselection period Tu for the concerning picture element, giving a constant voltage of 30 V.

Therefore, when the ON signal is outputted for all of the other rows, the average voltage during the unselection period Tu is 55 V. When the OFF signal is outputted for all of the other rows, the average voltage is 30 V. The difference between the average voltages is 25 V, in the same manner as the second driving system described above.

As described above, in the third driving system, it is also possible to lower the difference in average voltage during the unselection period Tu, in the same manner as the second driving system described above. Therefore, the display state (brightness and gradation) during the unselection period Tu is stabilized.

When the concerning picture element is turned ON, the actuator element 14 is applied with the ON signal having the phase opposite to that of the selection pulse signal Ps during the selection period Ts. Therefore, a voltage (130 V) sufficient to displace the actuator element 14 in the first direction is applied over a period of time of ½ of the address time Ta from the start point of time of the selection period Ts. When the OFF signal is supplied during the selection period Ts, a voltage of 80 V is applied to the actuator element 14 over the selection period Ts. Therefore, the light-off state obtained in the reset period Tr is maintained for the picture element to which the OFF signal is supplied.

In the third driving system, a voltage (−50 V) sufficient to restore the actuator element 14 to the original position is necessarily applied during the reset period Tr for the concerning picture element, in the same manner as described in the second driving system. Therefore, the actuator element 14 can be completely restored, and it can be subjected to light-off during the reset period Tr.

In this embodiment, the selection pulse signal Ps has the waveform having the phase opposite to that of the ON signal. However, it is also allowable to adopt a pulse waveform which is narrower or wider than the pulse width of ci the ON signal, i.e., a form of window pulse.

Explanation of fourth driving system

Figure 20:
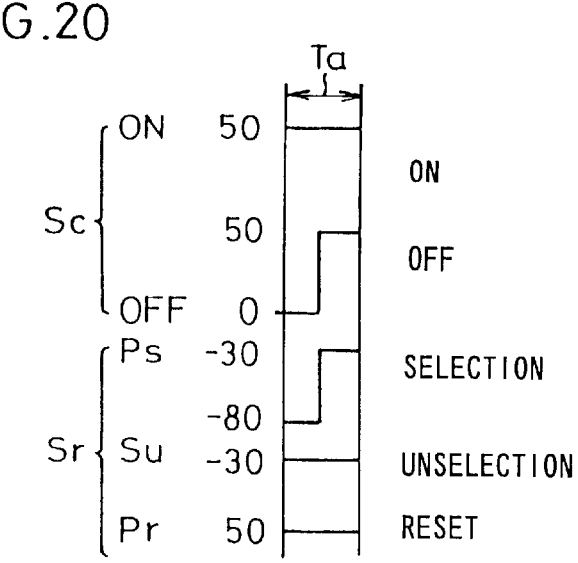
FIG. 20 illustrates signal forms of a column signal and a row signal in accordance with a fourth driving system for the driving device according to the embodiment of the present invention.
Figure 21A:
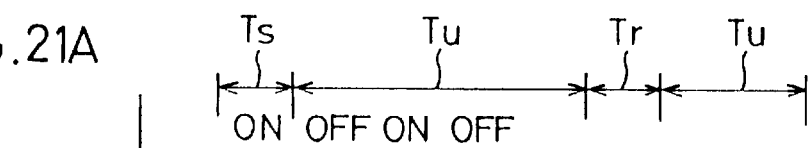
FIG. 21A shows a waveform of the column signal (first column) used in the fourth driving system.
Figure 21B:
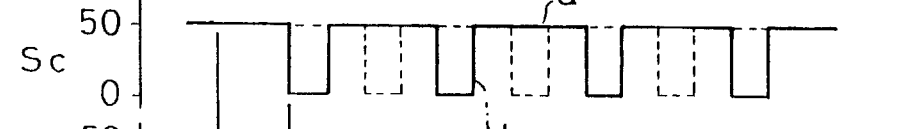
FIG. 21B shows a waveform of the row signal (first row) used in the fourth driving system.

Next, the fourth driving system will be explained with reference to FIG. 20 and FIGS. 21A to 21C. As shown in FIG. 20, the fourth driving system is a system in which phase information is added to the OFF signal and the selection pulse signal Ps respectively. In this embodiment, the OFF signal has a waveform in which it rises at the intermediate point of time of the selection period Ts, and the pulse width is ½ of the address time Ta. The selection pulse signal Ps has the same phase as that of the OFF signal. The ON signal is 50 V and constant in this embodiment. As shown in FIG. 21B, the output timings of the unselection pulse signal Su and the reset pulse signal Pr are the same as those used in the first driving system (see FIG. 14B).

That is, the OFF signal and the selection pulse signal Ps constitute a pulse signal respectively in which the high level and the low level exist in a mixed manner within one address time Ta.

Figure 21C:
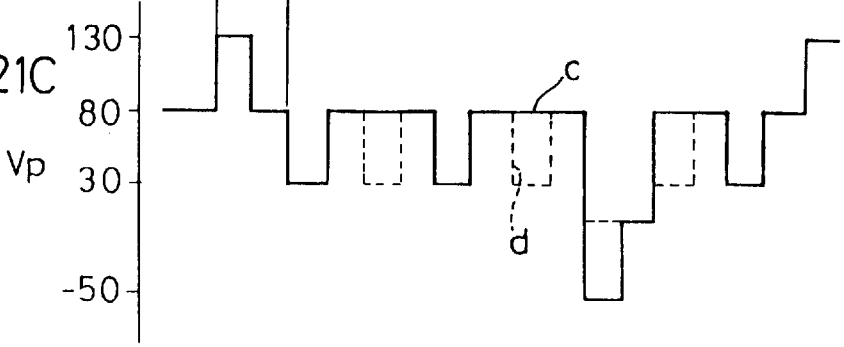
FIG. 21C shows a voltage waveform illustrating the voltage applied to a specified picture element (first row, first column)

Also in this embodiment, when consideration is made for one picture element, the following situation is given. That is, when the ON signal and the OFF signal are alternately outputted in the unit of row (see a solid line "a") as shown in FIG. 21A, and when the OFF signal is outputted for all of the other rows (see a broken line "b") as shown in FIG. 21A, then the pulse signal having an amplitude of (high voltage level (80 V)—low voltage level (30 V)) appears on every second one (see a solid line "c") or continuously (see a broken line "d") during the unselection period Tu for the concerning picture element as shown in FIG. 21C. When the ON signal is outputted for all of the other rows, the pulse waveform is not generated during the unselection period Tu for the concerning picture element, giving a constant voltage of 80 V. In other words, the selection pulse signal Ps constitutes a window pulse with respect to the ON signal.

Therefore, when the ON signal is outputted for all of the other rows, the average voltage during the unselection period Tu is 80 V. When the OFF signal is outputted for all of the other rows, the average voltage is 55 V. The difference between the average voltages is 25 V, in the same manner as the second driving system described above.

As described above, in the fourth driving system, it is also possible to lower the difference in average voltage during the unselection period Tu, in the same manner as the second driving system described above. Therefore, the display state (brightness and gradation) during the unselection period Tu is stabilized.

When the concerning picture element is turned ON, a voltage (130 V) is applied, which is sufficient to displace the actuator element 14 in the first direction during the period in which the selection pulse signal Ps is outputted, of the selection period Ts. When the OFF signal is supplied during the selection period Ts, a voltage of 30 V to 80 V is applied to the actuator element 14. Therefore, the light-off state obtained in the reset period Tr is maintained for the picture element to which the OFF signal is supplied.

Explanation of fifth driving system

Next, the fifth driving system will be explained with reference to FIG. 22 to FIG. 25B. As shown in FIG. 22, the fifth driving system is a system in which phase information is added to the ON signal, the OFF signal, and the selection pulse signal Ps respectively. In this embodiment, the ON signal has a waveform in which it rises simultaneously with the start of the selection period Ts, and the pulse width is ½ of the address time Ta. The OFF signal has a phase opposite to that of the ON signal. The selection pulse signal Ps has the same phase as that of the OFF signal. As shown in FIG. 23B, the output timings of the unselection pulse signal Su and the reset pulse signal Pr are the same as those used in the first driving system (see FIG. 14B).

That is, the ON signal, the OFF signal, and the selection pulse signal Ps constitute a pulse signal respectively in which the high level and the low level exist in a mixed manner within one address time Ta.

Also in this embodiment, when consideration is made for one picture element, the following situation is given. That is, when the ON signal and the OFF signal are alternately outputted in the unit of row (see a solid line "a") as shown in FIG. 23A, when the ON signal is outputted for all of the other rows (see a broken line "b") as shown in FIG. 23A, and when the OFF signal is outputted for all of the other rows (not shown, because of complicated illustration), then the pulse signal having an amplitude of (high voltage level (80 V)—low voltage level (30 V)) appears continuously (see a solid line "d" and a broken line "d") during the unselection period Tu for the concerning picture element as shown in FIG. 23C.

Therefore, when the ON signal is outputted for all of the other rows, and when the OFF signal is outputted for all of the other rows, then the average voltage during the unselection period Tu is 55 V in both cases. The difference between the average voltages is 0 V.

Figure 24A:
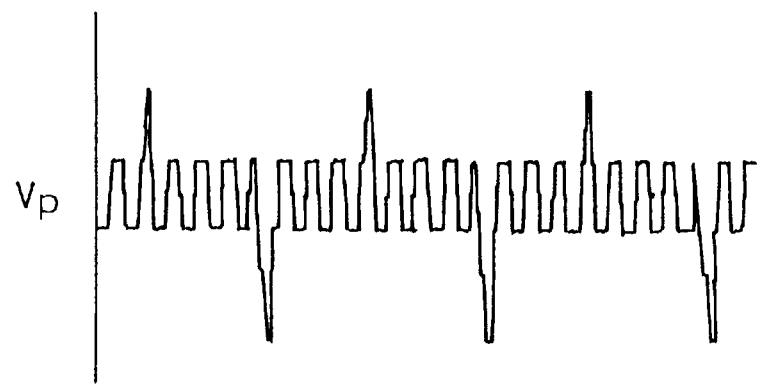
FIG. 24A shows a voltage waveform of the applied voltage shown in FIG. 23C used when the display pattern of lined up picture elements is composed of white/black/white/black . . . in the fifth driving system.
Figure 24B:
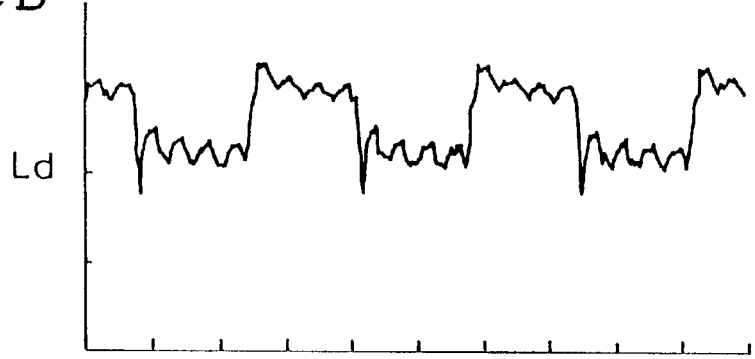
FIG. 24B shows the distribution of light emission intensities of the picture elements obtained when the voltage shown in FIG. 24A is applied.
Figure 25A:
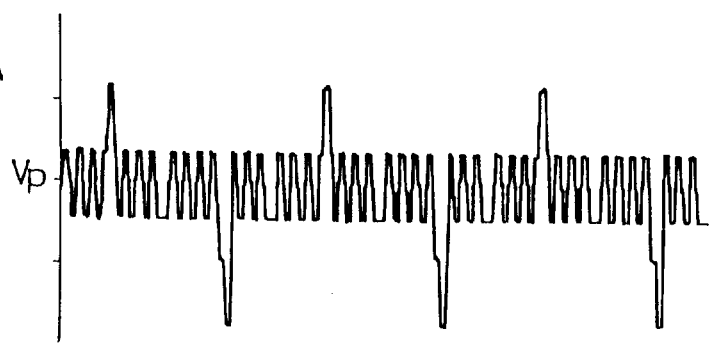
FIG. 25A shows a voltage waveform of the applied voltage shown in FIG. 23C used when the display pattern of lined up picture elements is composed of four white rows and four black rows.
Figure 25B:
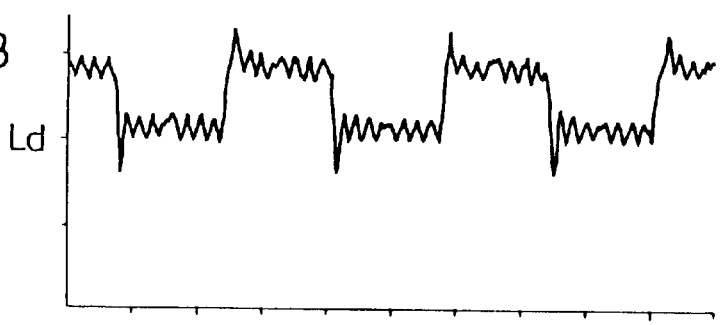
FIG. 25B shows the distribution of light emission intensities of the picture elements obtained when the voltage shown in FIG. 25A is applied.

Explanation will now be made for the way of change in output intensity distribution of the photodiode depending on the pattern of the ON signal and the OFF signal, with reference to FIG. 24A to FIG. 25B. At first, FIGS. 24A and 24B show an output intensity distribution of the photodiode obtained by assuming a case in which the display pattern of lined up picture elements is white/black/white/black . . . FIGS. 25A and 25B show an output intensity distribution of the photodiode obtained by assuming a case in which the display pattern of lined up picture elements is white for four rows and black for four rows.

According to these drawings, it is understood that the pulse signals having narrow pulse widths continuously appear during the unselection period for the picture elements.

As described above, in the fifth driving system, the pulse signal continuously appears during the unselection period Tu. Therefore, the average voltage during the unselection period Tu does not depend on the pattern of the ON signal and the OFF signal. The average voltage has an approximately constant value. Thus, the display state (brightness and gradation) during the unselection period Tu is stabilized.

The pulse width of the continuously appearing pulse signal differs depending on the pattern of the ON signal and the OFF signal. Those shown in the drawings include the pulse width which is ½ of the address time Ta and the pulse width which is approximately the same as the address time Ta. However, owing to the fact that the response speed of light emission effected by each of the picture elements is slow to some extent, it is possible to obtain the lowpass filter effect. The display state (light emission state) obtained during the selection period Ts is maintained during the unselection period Tu as it is. The unstable display state as described above is almost dissolved.

The selection pulse signal Ps and the ON signal are in the relationship of opposite phase. Therefore, a voltage (130 V) sufficient to displace the actuator element 14 in the first direction is applied between the pair of electrodes 28a, 28b of the actuator element 14 of the concerning picture element over a period of time of ½ of the address time Ta from the start point of time of the selection period Ts. When the OFF signal is supplied during the selection period Ts, a voltage of 80 V is applied between the pair of electrodes 28a, 28b of the actuator element 14 at least over the selection period Ts. Therefore, the light-off state obtained in the reset period Tr is maintained for the picture element to which the OFF signal is supplied.

In the fifth driving system, a voltage (−50 V) sufficient to restore the actuator element 14 to the original position is necessarily applied during the reset period Tr for the concerning picture element, in the same manner as described in the second driving system. Therefore, the actuator element 14 can be completely restored, and it can be subjected to light-off during the reset period Tr.

In this embodiment, the selection pulse signal Ps has the waveform having the phase opposite to that of the ON signal. However, it is also allowable to adopt a pulse waveform which is narrower or wider than the pulse width of the ON signal, i.e., a form of window pulse.

Explanation of sixth driving system

Next, the sixth driving system will be explained with reference to FIG. 26 and FIGS. 27A and 27C. As shown in FIG. 26, the sixth driving system is a system in which phase information is added to the ON signal, the OFF signal, the selection pulse signal Ps, and reset pulse signal Pr respectively. The ON signal, the OFF signal, and the selection pulse signal Ps have the same pulse waveforms as those used in the fifth driving system described above. However, the reset pulse signal Pr has a pulse waveform in which it rises during the reset period Tr, and it falls during the reset period Tr. That is, the reset pulse signal Pr has a pulse waveform in which the pulse width is narrower than the reset period Tr (address time Ta).

That is, the ON signal, the OFF signal, the selection pulse signal Ps, and the reset pulse signal Pr constitute a pulse signal respectively in which the high level and the low level exist in a mixed manner within one address time Ta. As shown in FIG. 27B, the output timing of the unselection signal Su is the same as that used in the first driving system described above.

When consideration is made for one picture element, the following situation is given. That is, when the ON signal and the OFF signal are alternately outputted in the unit of row as shown in FIG. 27A, when the ON signal is outputted for all of the other rows (not shown), and when the OFF signal is outputted for all of the other rows (not shown), then the pulse signal having an amplitude of (high voltage level (80 V)—low voltage level (30 V)) appears continuously during the unselection period Tu for the concerning picture element as shown in FIG. 27C.

Therefore, also in this embodiment, when the ON signal is Outputted for all of the other rows, and when the OFF signal is outputted for all of the other rows, then the average voltage during the unselection period Tu is 55 V in both cases, in the same manner as described in the fifth driving system. The difference between the average voltages is 0 V.

As described above, in the sixth driving system, the pulse signal continuously appears during the unselection period Tu. Therefore, the average voltage during the unselection period Tu does not depend on the pattern of the ON signal and the OFF signal. The average voltage has an approximately constant value. Thus, the display state (brightness and gradation) during the unselection period Tu is stabilized.

The selection pulse signal Ps and the ON signal are in the relationship of opposite phase. Therefore, a voltage (130 V) sufficient to displace the actuator element 14 in the first direction is applied during the selection period Ts. When the OFF signal is supplied during the selection period Ts, the light-off state obtained in the reset period Tr is maintained.

Especially, in the sixth driving system, the reset pulse signal Pr, which has the pulse width narrower than the reset period Tr and which includes the edges of the ON signal and the OFF signal, is outputted during the reset period Tr. Therefore, a voltage (−50 V) sufficient to restore the actuator element 14 to the original position is necessarily applied during the reset period Tr for the concerning picture element.

As described above, in the second to sixth driving systems, each of the edges of the ON signal, the OFF signal, and the selection pulse signal is set to be at the position of ½ of the address time. However, there is no necessity to make limitation thereto. The edge can be set at an arbitrary position within one address time Ta provided that the following conditions are satisfied.
(1) The voltage (130 V), which is sufficient to make the displacement in the first direction, is applied to the concerning actuator element 14 during the selection period Ts upon ON selection for the concerning picture element.
(2) The voltage (30 V to 80 V), which makes it possible to maintain the displacement during the reset, is applied to the concerning actuator element 14 during the selection period Ts upon the OFF selection for the concerning picture element.
(3) The voltage (−50 V), which is sufficient to make the restoration to the original position, is applied to the concerning actuator element 14 during the reset period Tr upon the reset for the concerning picture element.

Explanation of driving device concerning modified embodiment

Next, explanation will be made for a modified embodiment 100A of the driving device according to the embodiment of the present invention with reference to FIG. 28. Components or parts corresponding to those shown in FIG. 11 are designated by the same reference numerals, duplicate explanation of which will be omitted.

Figure 28:
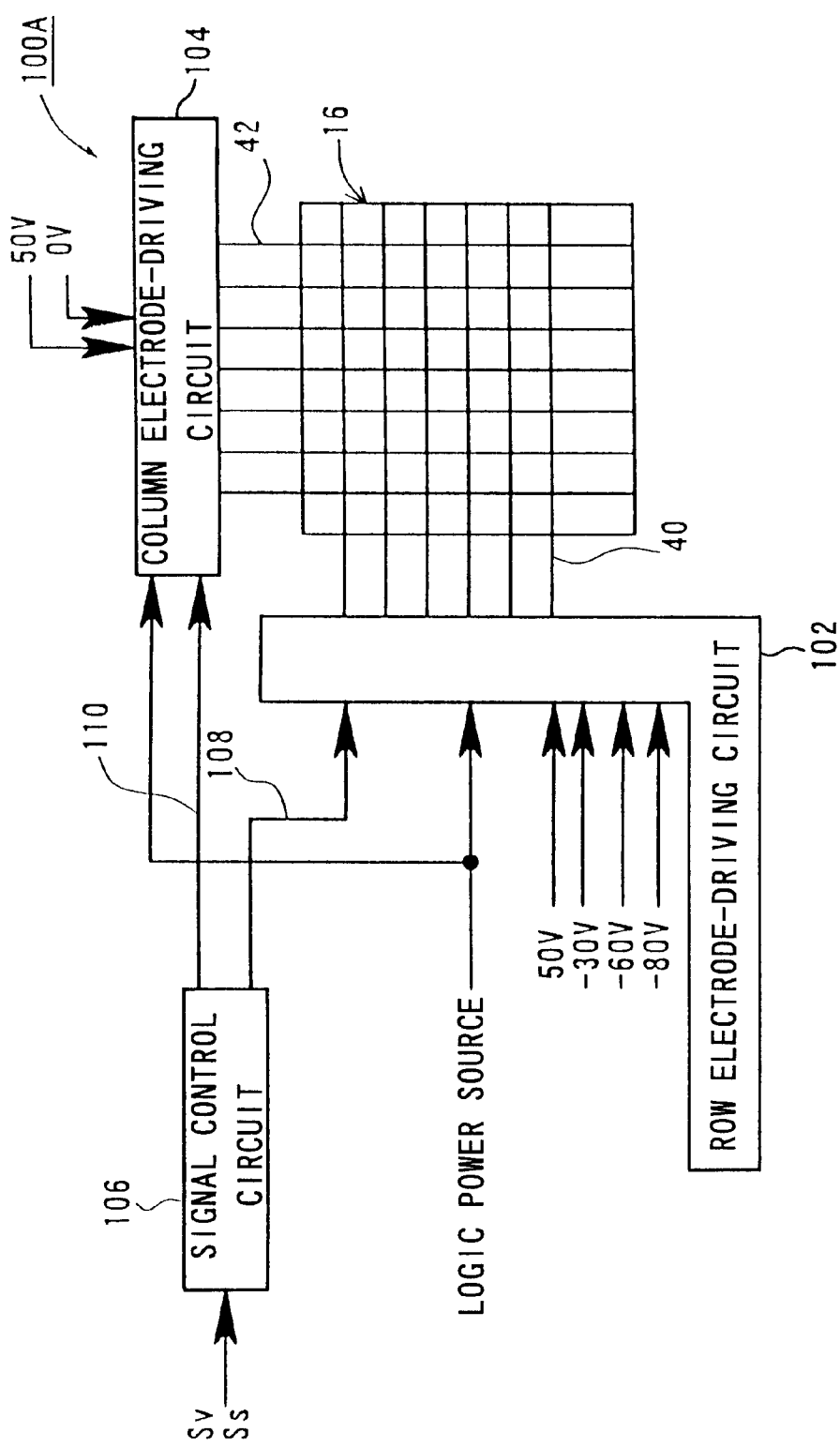
FIG. 28 shows an arrangement illustrating a modified embodiment of the driving device according to the embodiment of the present invention.

As shown in FIG. 28, the driving device 100A according to the modified embodiment is constructed approximately in the same manner as the driving device 100 according to the embodiment of the present invention described above. However, the former is different from the latter in that the logic power source voltage (for example, ±5 V), and four types of row side power source voltages (for example, 50 V, −30 V, −60 V, and −80 V) are supplied to the row electrode-driving circuit 102 by the aid of an unillustrated power source circuit.

In the driving system effected by the driving device 100A according to this modified embodiment (conveniently referred to as "seventh driving system"), phase information is added to the ON signal, the OFF signal, the selection pulse signal Ps, and the reset pulse signal Pr, in the same manner as the sixth driving system.

Explanation of seventh driving system

Figure 29:
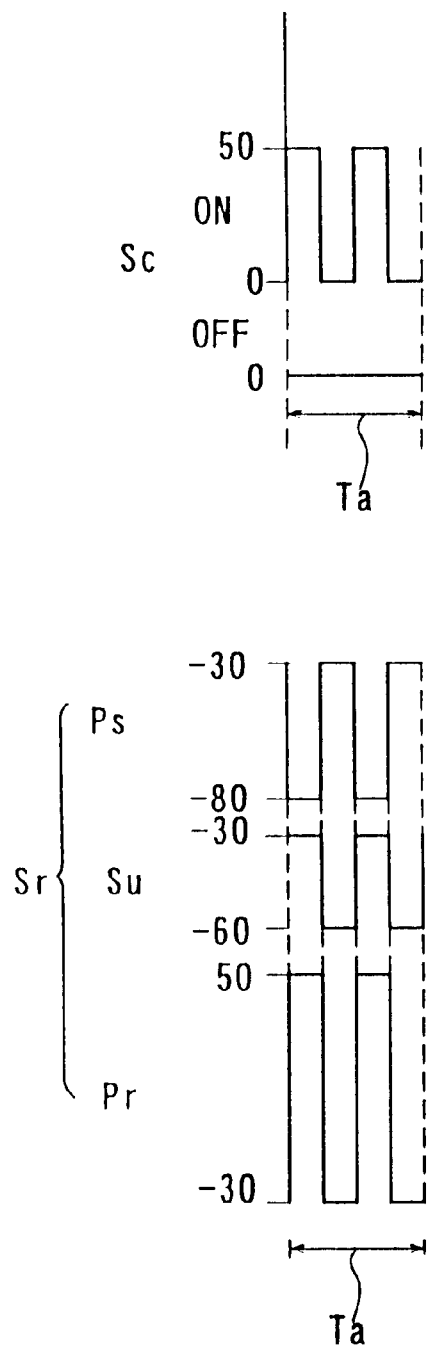
FIG. 29 illustrates signal forms of a column signal and a row signal in accordance with a seventh driving system for the driving device according to the embodiment of the present invention.
Figure 30:
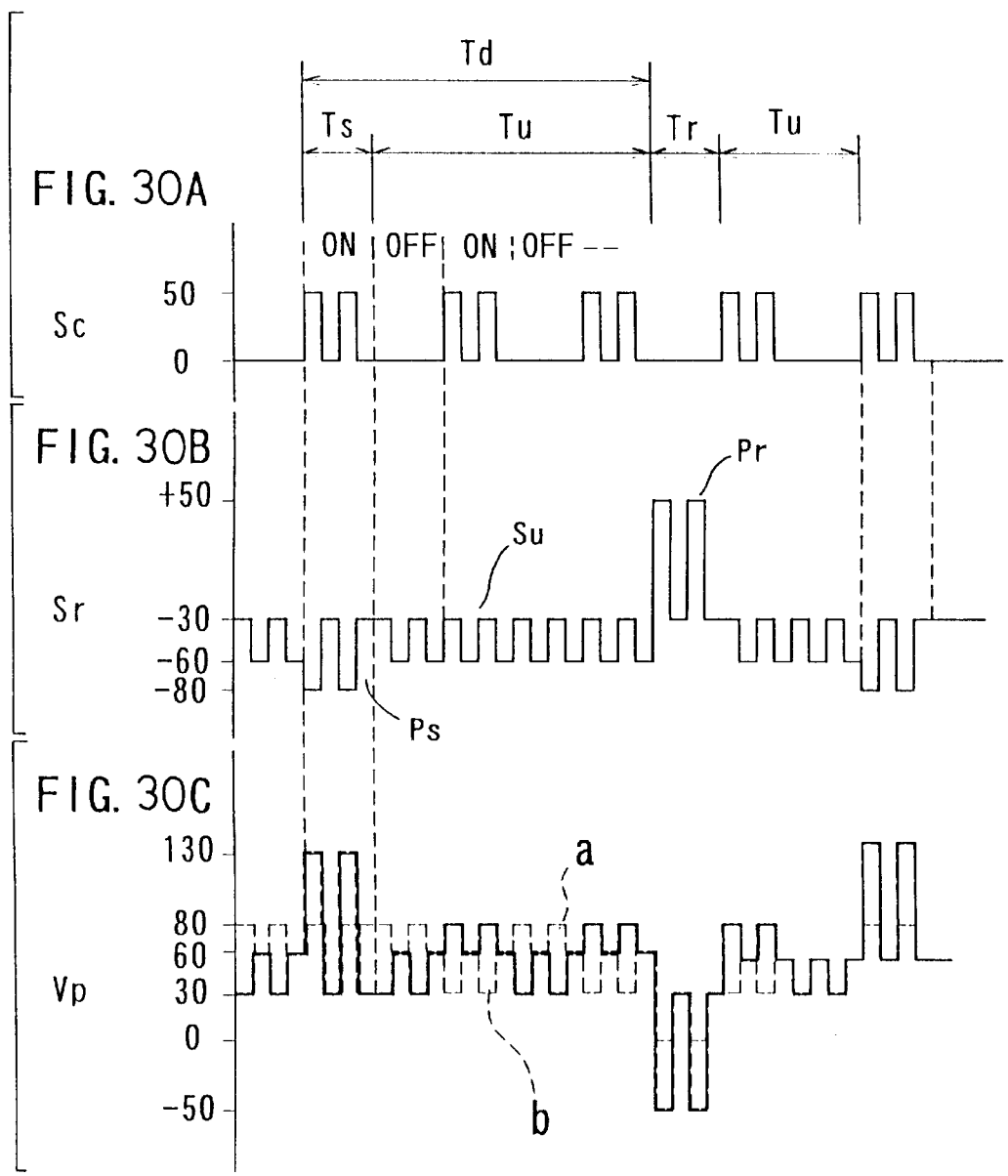
FIG. 30A shows a waveform of the column signal (first column) used in the seventh driving system.
FIG. 30B shows a waveform of the row signal (first row) used in the seventh driving system.
FIG. 30C shows a voltage waveform illustrating the voltage applied to a specified picture element (first row, first column)

Specifically, the seventh driving system will be explained with reference to FIG. 29 and FIGS. 30A to 30C. As shown in FIG. 29, the seventh driving system is a system in which phase information is added to the ON signal, the selection pulse signal Ps, the unselection signal Su, and reset pulse signal Pr respectively. In this embodiment, the ON signal has a waveform in which it rises simultaneously with the start of the selection period Ts, and it has a pulse cycle of ½ of the address time Ta (the pulse width is ¼ of the address time Ta). The selection pulse signal Ps has a waveform in which the phase is opposite to that of the ON signal, and the amplitude is −80 V to −30 V. The unselection signal Su has a waveform in which the phase is the same as that of the ON signal, and the amplitude is −60 V to −30 V. The reset pulse signal Pr has a waveform in which the phase is the same as that of the ON signal, and the amplitude is −30 V to +50 V. The OFF signal is 0 V and constant in this embodiment.

Accordingly, as shown in FIG. 29, all of the ON signal, the selection pulse signal Ps, the unselection signal Su, and the reset pulse signal Pr constitute a pulse signal respectively in which the high level and the low level exist in a mixed manner within one address time Ta.

Therefore, when consideration is made for one picture element (for example, picture element in the first row and first column), the following situation is given. That is, when the ON signal is outputted for all of the rows, the voltage waveform, which is applied to the concerning picture element during the unselection period Tu, is a waveform as shown by a broken line "a" in FIG. 30C in which the pulse signal having a pulse cycle of ½ of the address time Ta and having an amplitude of (80 V to 60 V) is continuously outputted. Therefore, the average voltage thereof is 70 V. In this situation, in the selection period Ts, a waveform is given, in which two pulse signals having a pulse cycle of ½ of the address time Ta and having an amplitude of (130 V to 30 V) are outputted. In the reset period Tr, a waveform is given, in which two pulse signals having a pulse cycle of ½ of the address time Ta and having an amplitude of (30 V to −50 V) are outputted.

On the other hand, when the OFF signal is outputted for all of the rows, the voltage waveform, which is applied to the concerning picture element during the unselection period Tu, is a waveform as shown by a broken line "b" in FIG. 30C in which the pulse signal having a pulse cycle of ½ of the address time Ta and having an amplitude of (60 V to 30 V) is continuously outputted. Therefore, the average voltage thereof is 45 V. In this situation, in the selection period Ts, a waveform is given, in which two pulse signals having a pulse cycle of ½ of the address time Ta and having an amplitude of (80 V to 30 V) are outputted. In the reset period Tr, a waveform is given, in which two pulse signals having a pulse cycle of ½ of the address time Ta and having an amplitude of (30 V to 0 V) are outputted.

When the ON signal and the OFF signal are alternately outputted in the unit of row for all of the rows except for the row including the concerning picture element (first row), a waveform is given, in which two pulse signals having a pulse cycle of ½ of the address time Ta and having an amplitude of (80 V to 60 V) are outputted, and two pulse signals having a pulse cycle of ½ of the address time Ta and having an amplitude of (60 V to 30 V) are outputted. Therefore, the average voltage thereof is 60 V.

As described above, in the seventh driving system, the average voltage is 70 V when all of the rows are turned ON, and the average voltage is 45 V when all of the rows are turned OFF. Therefore, the maximum difference in average voltage, which is brought about by the difference in pattern of the ON signal and the OFF signal, is 25 V. The difference in average voltage during the unselection period Tu, which is caused by the pattern, can be made small as compared with the first driving system described above.

Especially, in the seventh driving system, the pulse signal, which continuously appears during the unselection period Tu, has the small voltage amplitude during the address time Ta. Therefore, it is possible to suppress the fluctuation of the light amount during the unselection period Tu.

Owing to the fact that the pulse cycle of the continuously appearing pulse signal is ½ of the address time Ta which is short, and that the response speed of light emission effected by each of the picture elements is slow to some extent, it is possible to obtain the low-pass filter effect also in the seventh driving system. The display state (light emission state) obtained during the selection period is maintained as it is during the unselection period Tu, and the unstable display state as described above is almost dissolved.

By the way, in each of the subfields, the display brightness is zero during the reset period Tr. Therefore, it is feared that the response speed of the actuator element 14 may be delayed depending on the position of restoration during the reset period Tr when the actuator element 14 is allowed to make the bending displacement in the effective display period Td in the next subfield.

However, in the first to seventh driving systems described above, the unselection period Tu is set after the reset period Tr. Therefore, the level of the voltage applied to the actuator element 14 can be set to be, for example, in the vicinity of the threshold value for ON and OFF within the range in which the picture element is turned OFF, during the unselection period Tu. Thus, it is possible to improve the response speed with respect to the bending displacement to be effected in the next effective display period Td.

That is, the unselection period Td after the reset period Tr can be used as a preliminary period for bootstrap for the bending displacement of the actuator element 14. The voltage during the unselection period Tu can be desirably provided by using a circuit which makes it possible to perform the input from at least one of the row electrode-driving circuit 102 and the column electrode-driving circuit 104.

Figure 31:
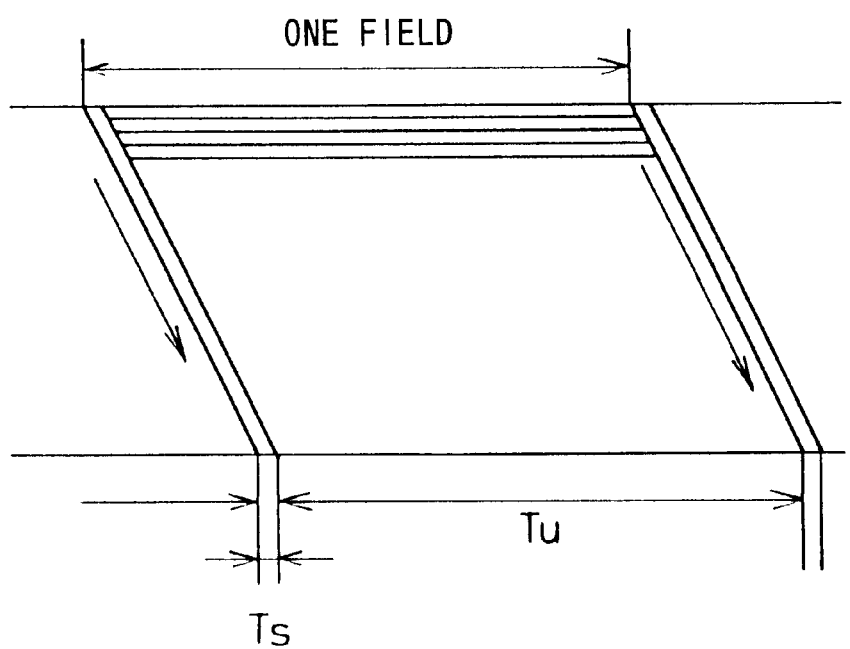
FIG. 31 illustrates a case in which the gradation control is performed without dividing one field into a plurality of subfields.

In the first to seventh driving systems described above, one field is equally divided into a plurality of subfields. For example, one field is equally divided into eight subfields. Alternatively, as shown in FIG. 31, one field is not divided into a plurality of ones, but one field may by constructed by a series of selection period Ts and unselection period Tu. In this case, the image display can be realized by performing the gradation control based on the voltage control system, not based on the temporal modulation system described above.

Explanation of voltage control system

Figure 32:
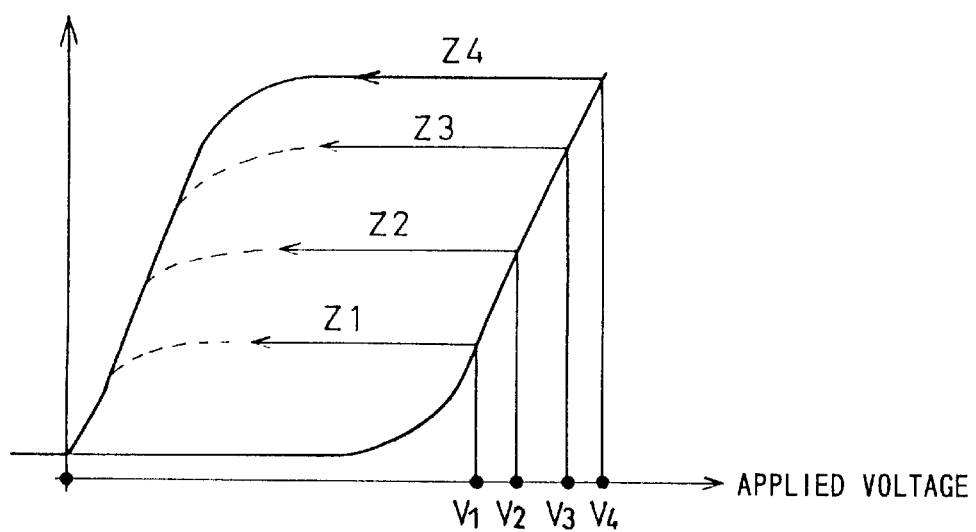
FIG. 32 shows a displacement characteristic of the actuator element for explaining the gradation control based on the voltage control system.

The voltage control system is based on the use of the fact that the actuator element 14 having the shape-retaining function makes displacement in an analog manner in response to the level of the applied voltage as shown, for example, in FIG. 32. The voltage to be applied to the picture element is divided into a plurality of ones (equally divided or arbitrarily divided) in accordance with the resolution of gradational expression, and the voltage in conformity with the gradation of the picture element is applied to the actuator element 14. Thus, it is possible to achieve the gradation control on the basis of the voltage control system.

Modified embodiment of subfield division

Figure 12:
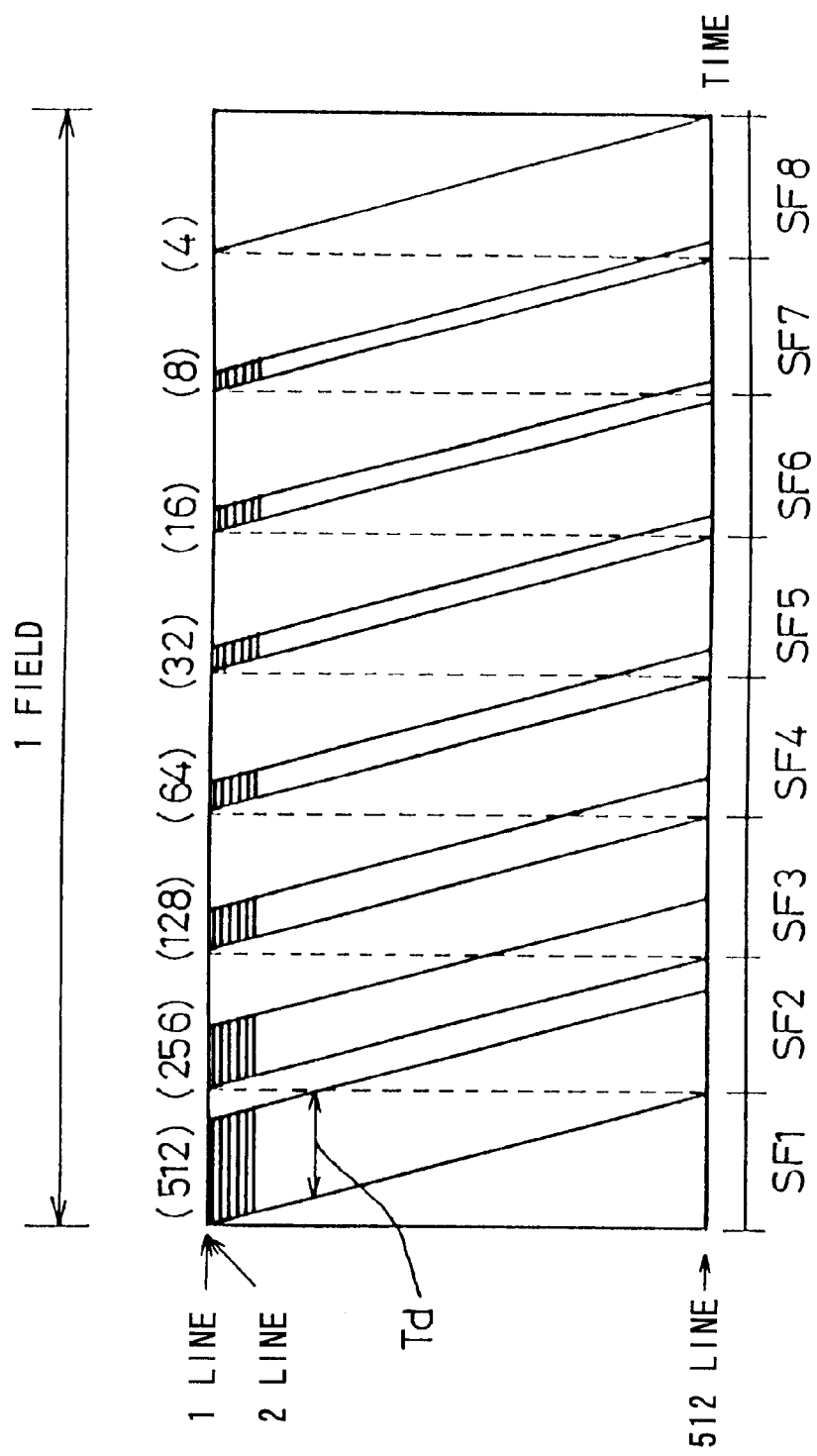
FIG. 12 illustrates gradation control based on the temporal modulation system, especially depicting an example in which one field is divided into eight subfields.
Figure 13:
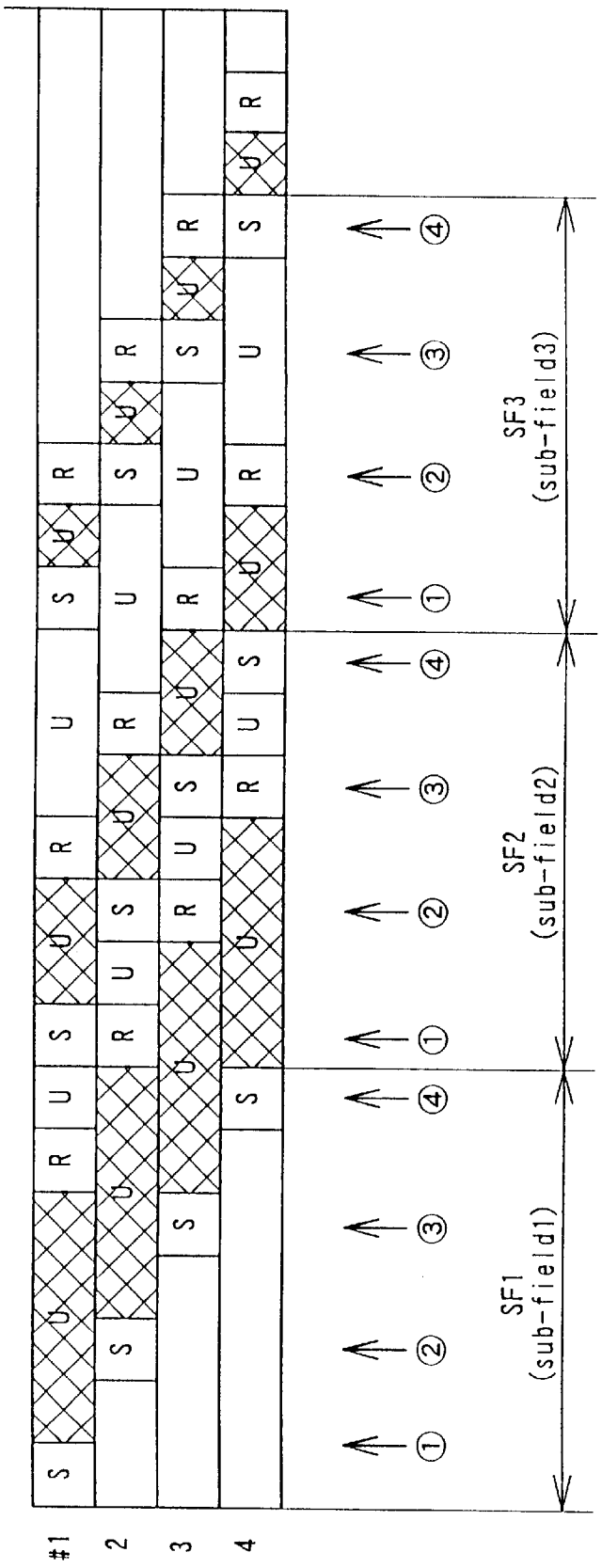
FIG. 13 shows a timing chart illustrating the temporal modulation system for the driving device according to the embodiment of the present invention.
Figure 33:
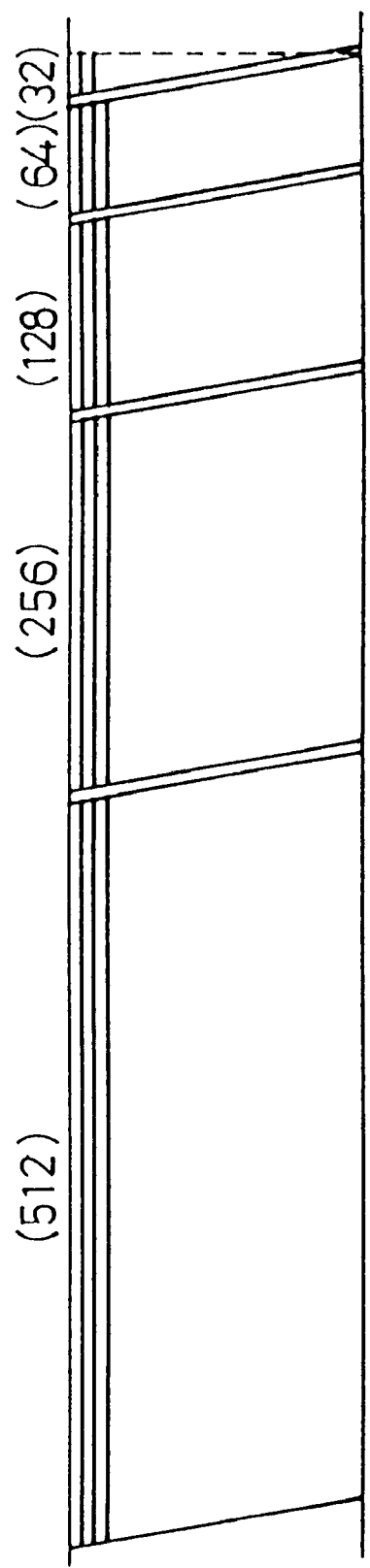
FIG. 33 shows an example in which especially one field is divided while increasing the ratio of the effective display period, in order to explain the gradation control based on the temporal modulation system.

The method for dividing one field into a plurality of subfields is not limited to the equal division shown in FIG. 12. Alternatively, as shown in FIG. 33, a method is also conceived, in which one field is divided while increasing the ratio of the effective display period Td. In the case of this method, the effective display period Td can be maximally utilized. Therefore, this method is advantageous to improve the brightness.

The feature of the equal division (see FIG. 12) will now be explained while comparing with the division in which the ratio of the effective display period Td is increased (see FIG. 25). In the case of the equal division, it is possible to provide a large length of the selection period Ts. Therefore, the following features are obtained. (1) The peak value of the current can be suppressed, and the load on the circuit is mitigated. (2) The instantaneously generated force can be suppressed, the load on the structure (actuator element 14) is mitigated, and the long term stability is improved. (3) The dispersion of the response time of the picture element is absorbed, and the uneven brightness is reduced. Further, assuming that the length of the selection period Ts is identical, the number of rows capable of being selected in one subfield is increased, and the number of columns capable of being subjected to signal input by the aid of the column electrode-driving circuit 104 is increased. Accordingly, it is possible to decrease the number of IC's to be used for the column electrode-driving circuit 104, resulting in reduction of the cost.

Figure 34:
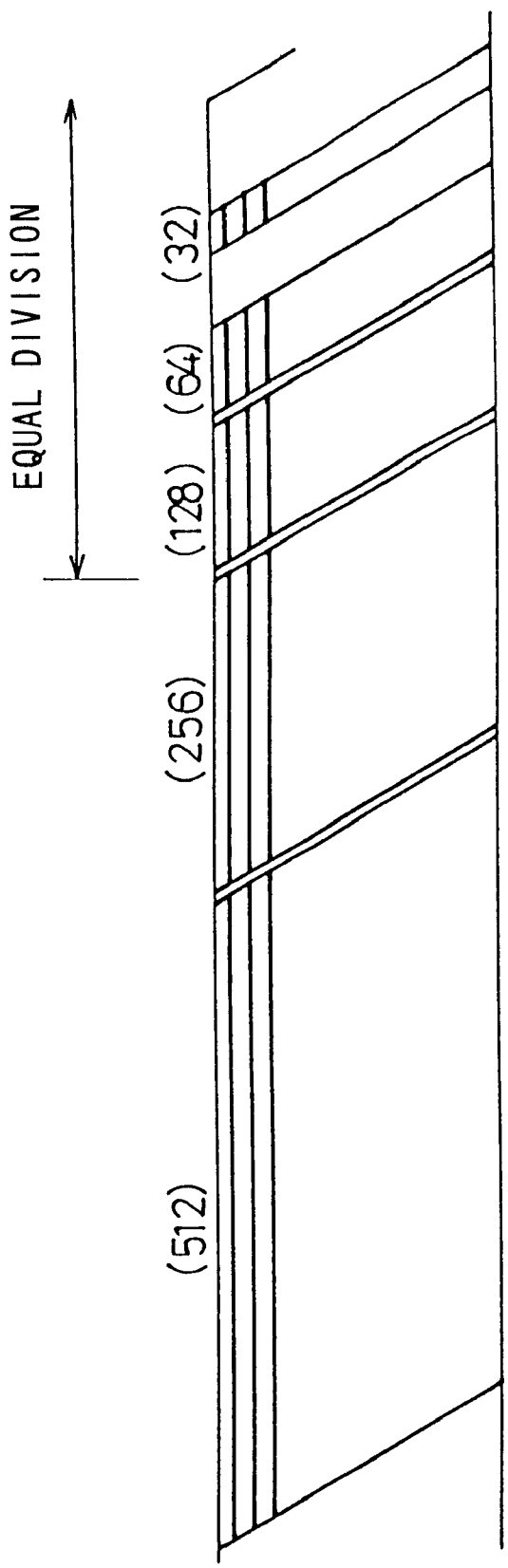
FIG. 34 shows an example in which especially a former half of one field is divided into a plurality of subfields in accordance with a dividing system while increasing the ratio of the effective display period, and a latter half is substantially equally divided into a plurality of subfields, in order to explain the gradation control based on the temporal modulation system.

In consideration of the various features described above, the ratio of division can be determined as shown in FIG. 34 in this embodiment. For example, a former half of one field may be divided into a plurality of subfields in accordance with the dividing method in which the ratio of the effective display period Td is increased, and a latter half may be divided into a plurality of subfield substantially equally. In this case, the advantages of the two dividing methods are simultaneously provided. Therefore, it is possible to highly accurately perform the gradation control, and it is possible to improve the image quality of reproduced images.

Other than the first to seventh driving systems described above, the following driving systems are conceived. Any one of the following driving systems can be realized by using the driving device 100 (see FIG. 11) according to the embodiment of the present invention.

Explanation of eighth driving system

Figure 35:
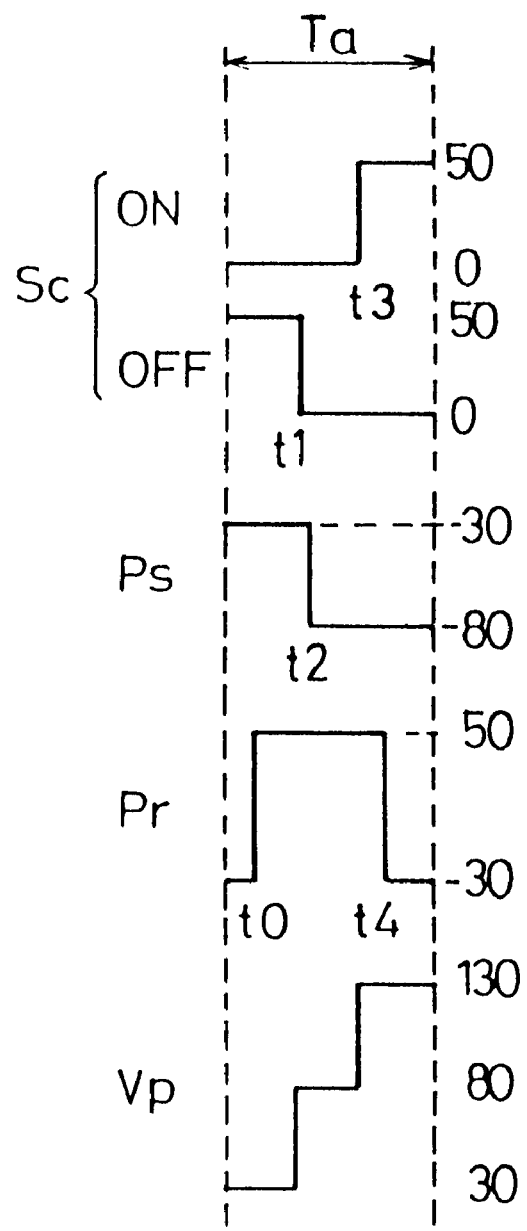
FIG. 35 shows waveforms illustrating a column signal, a row signal, and the voltage applied to a specified picture element in accordance with an eighth driving system for the driving device according to the embodiment of the present invention.

At first, as shown in FIG. 35, in the eighth driving system, the ON signal is a pulse signal which rises, for example, at a time t3 within the address time Ta, and the OFF signal is a pulse signal which falls, for example, at a time t1 as a point of time earlier than the time t3 within the address time Ta. The selection pulse signal Ps is a pulse signal which falls, for example, at a time t2 as a point of time between the time t1 and the time t3 within the address time Ta. The reset pulse signal Pr is a pulse signal which rises, for example, at a time t0 as a point of time earlier than the time t1 within the address time Ta, and which falls, for example, at a time t4 as a point of time later than the time t3. The unselection signal Su is −30 V and constant.

In this embodiment, the average voltage during the unselection period Tu is smaller than 55 V, and the dark light level is lowered. Therefore, it is possible to improve the contrast. A preparatory period to stably establish the ON state of the actuator element 14 can be provided between the point of time t2 of the fall of the selection pulse signal Ps and the point of time t3 of the rise of the ON signal. Further, this embodiment is advantageous in that the picture element can be prevented from interference of the ON voltage and the OFF voltage.

Explanation of ninth driving system

Figure 36:
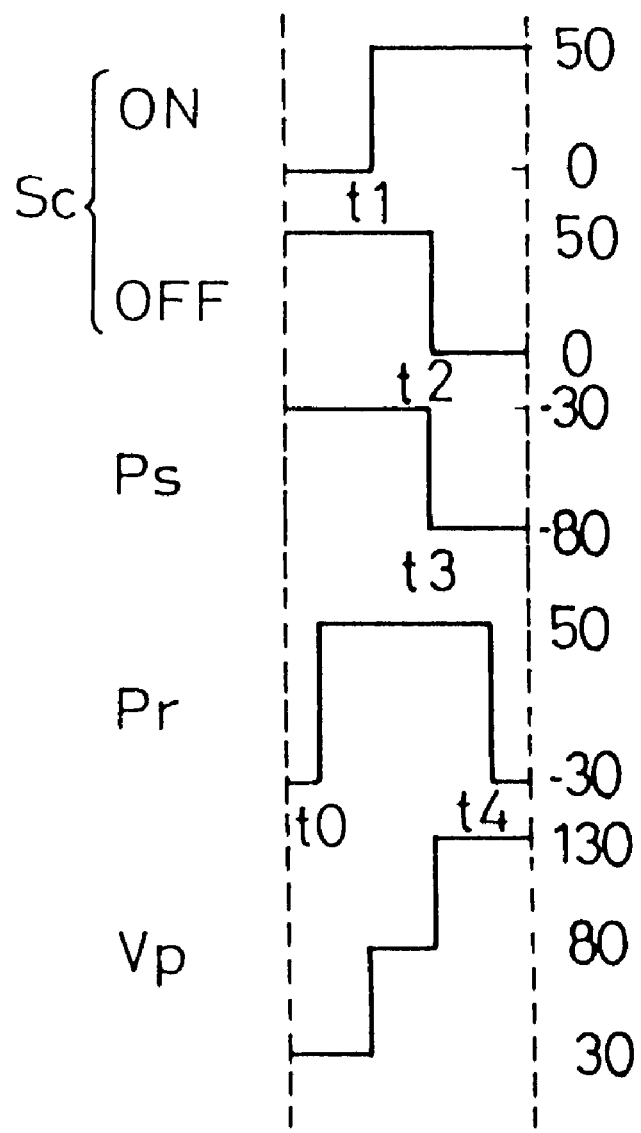
FIG. 36 shows waveforms illustrating a column signal, a row signal, and the voltage applied to a specified picture element in accordance with a ninth driving system for the driving device according to the embodiment of the present invention.

Next, as shown in FIG. 36, in the ninth driving system, the ON signal is a pulse signal which rises, for example, at a time t1 within the address time Ta, and the OFF signal is a pulse signal which falls, for example, at a time t2 as a point of time later than the time t1 within the address time Ta. The selection pulse signal Ps is a pulse signal which falls, for example, at a time t3 as approximately the same point of time as the time t2. The reset pulse signal Pr is a pulse signal which rises, for example, at a time t0 as a point of time earlier than the time t1 within the address time Ta, and which falls, for example, at a time t4 as a point of time later than the time t3. The unselection signal Su is −30 V and constant.

In this embodiment, the average voltage during the unselection period Tu is larger than 55 V, and it is possible to utilize the range in which the displacement is higher concerning the hysteresis characteristic. Thus, the brightness is increased. A preparatory period to stably establish the ON state of the actuator element 14 can be provided between the point of time t1 of the rise of the ON signal and point of time t3 of the fall of the selection pulse signal Ps.

The voltage to give the ON state is applied to the actuator element 14 at the timing (point of time t3) of the selection pulse signal Ps. At this time, the actuator element 14 requires a large amount of current. It is desirable that the row electrode-driving circuit 102 furnishes the current.

Figure 37:
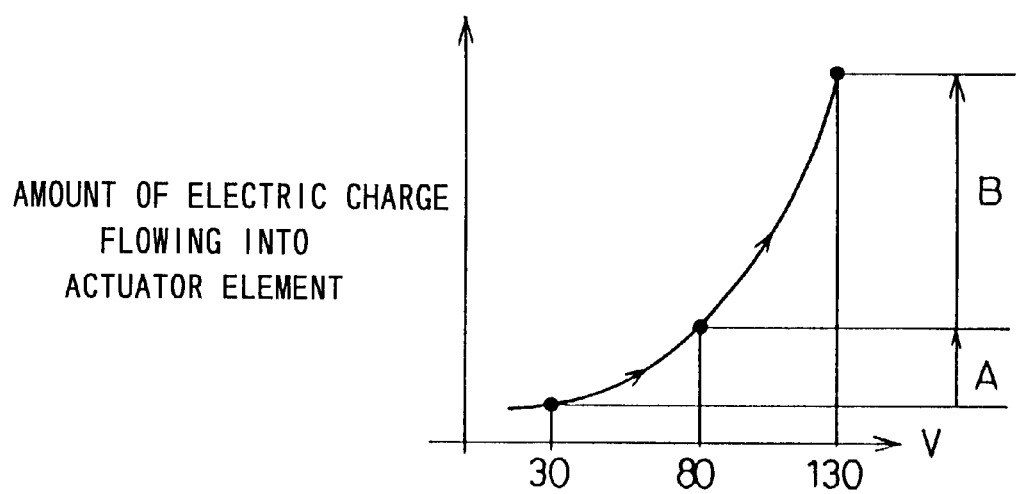
FIG. 37 shows a characteristic illustrating the change in amount of electric charge flowing into the actuator element with respect to the change in voltage applied to the actuator element.

The reason for the above will be explained with reference to FIG. 37. A large current flows through the actuator element 14 when the applied voltage changes from 80 V to 130 V (see Interval B) rather than when the applied voltage changes from 30 V to 80 V (see Interval A). It is preferable that the large current is allowed to flow from the row electrode-driving circuit 102, because of the following reason. That is, the number of elements to which the selection pulse signal Ps is applied is (number of selected rows x number of all columns) at most, however, the number of elements to which the ON signal concerning the column is the number of all elements in the same case. Therefore, assuming that the wave height value of the ON signal is equal to that of the selection pulse signal Ps, the flowing current is highly probably small during the application of the selection pulse signal. Therefore, it is possible to reduce the load on the peripheral circuit.

Explanation of tenth driving system

Figure 38:
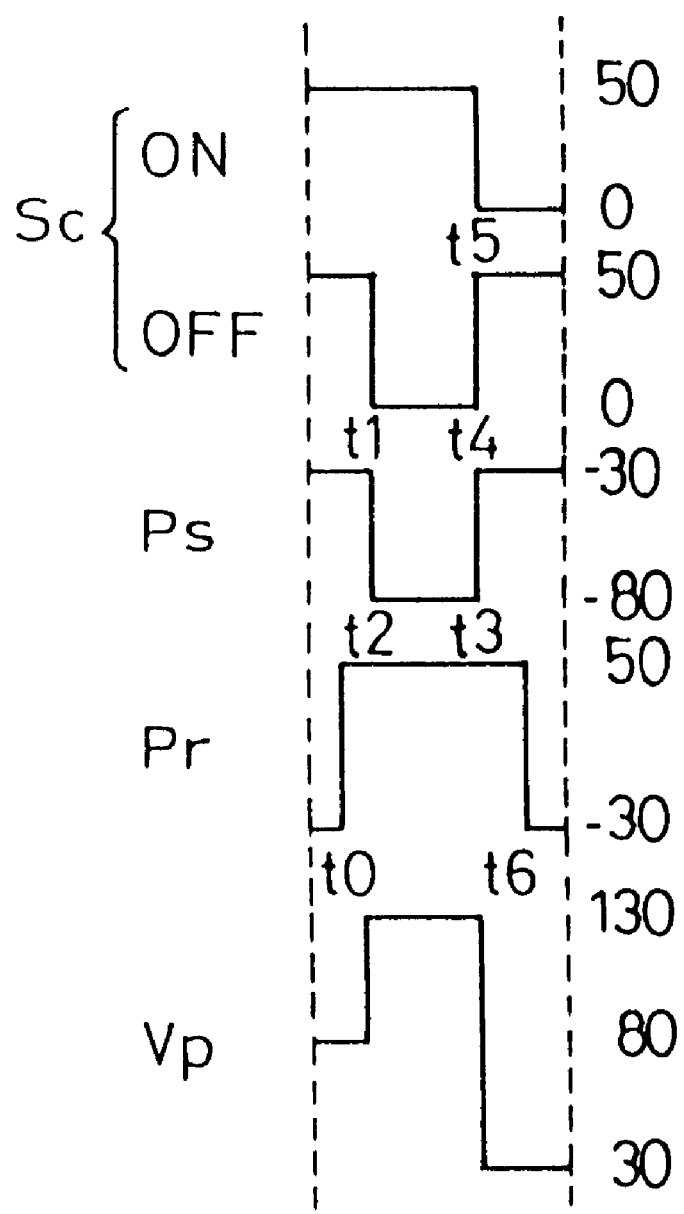
FIG. 38 shows waveforms illustrating a column signal, a row signal, and the voltage applied to a specified picture element in accordance with a tenth driving system for the driving device according to the embodiment of the present invention.

Next, as shown in FIG. 38, in the tenth driving system, the ON signal is a pulse signal which rises, for example, at a time t5 within the address time Ta, and the OFF signal is a pulse signal which falls, for example, at a time t1 as a point of time earlier than the time t5 within the address time Ta, and which rises, for example, at a time t4 as approximately the same point of time as the time t5. The selection pulse signal Ps is a pulse signal which falls, for example, at a time t2 as approximately the same point of time as the time t1, and which rises, for example, at a time t3 as a point of time earlier than the time t4. The reset pulse signal Pr is a pulse signal which rises, for example, at a time t0 as a point of time earlier than the time t1 within the address time Ta, and which falls, for example, at a time t6 as a point of time later than the time t5. The unselection signal Su is −30 V and constant. In this embodiment, the average voltage during the unselection period Tu is larger than 55 V, and it is possible to utilize the range in which the displacement is higher concerning the hysteresis characteristic. Thus, the brightness is increased. A preparatory period to stably establish the ON state of the actuator element 14 can be provided during the period from the unselection period Tu (preliminary period) of the previous subfield to the point of time of the rise the selection pulse signal Ps of the concerning subfield.

This system has the feature that the falling timing of the selection pulse signal Ps causes the arrival at the voltage to give the ON state of the actuator element 14.

The selection pulse signal Ps starts from the voltage of the unselection period Tu, and it ends at that voltage during the selection period Ts. Therefore, it is possible to avoid application of any erroneous voltage to the actuator element 14, which would be otherwise caused by superimposition of the ON signal or the OFF signal for the previous row and the selection pulse signal Ps for the selected row.

Figure 39:
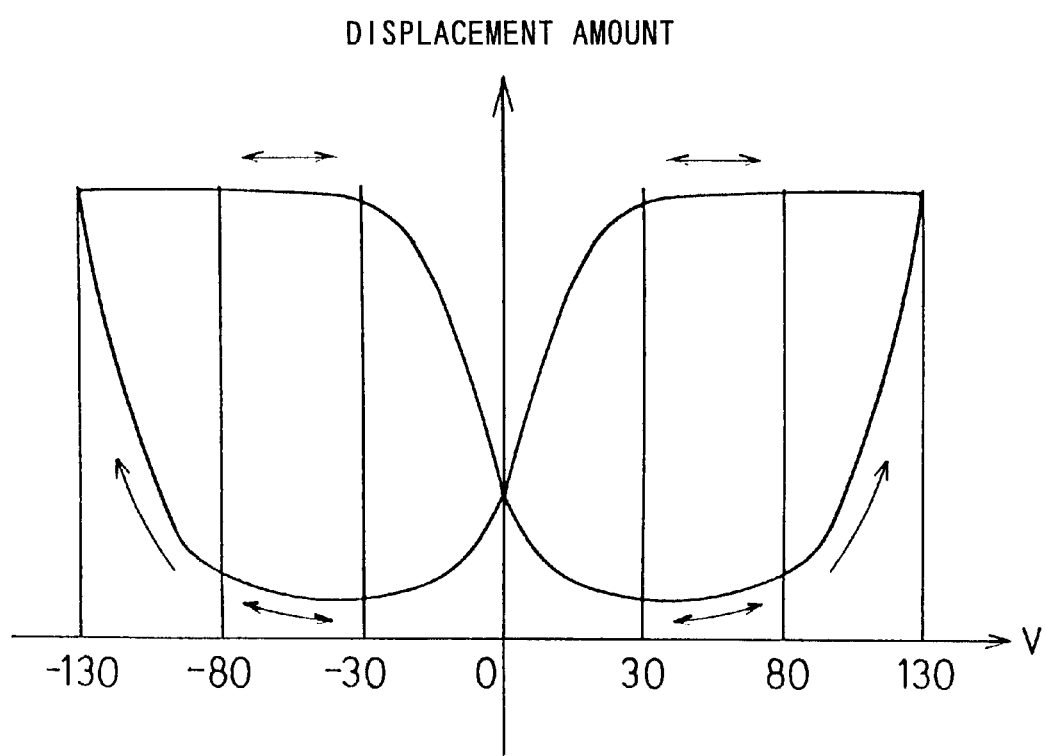
FIG. 39 shows a bending displacement characteristic on the positive side and a bending displacement characteristic on the negative side, of the actuator element (picture element)

In the embodiment described above, the voltage of +130 V is applied between the pair of electrodes 28a, 28b in order to make the bending displacement of the actuator element 14 in the first direction. However, the bending displacement characteristic (hysteresis characteristic) of the actuator element 14 appears on the positive side and the negative side respectively as shown in FIG. 39. In order to make the bending displacement of the actuator element 14 in the first direction, not only the positive side but also the negative side is utilized. Thus, it is possible to obtain a characteristic with a steep inclination of the rise of the bending displacement with respect to the change in voltage.

Figure 40:
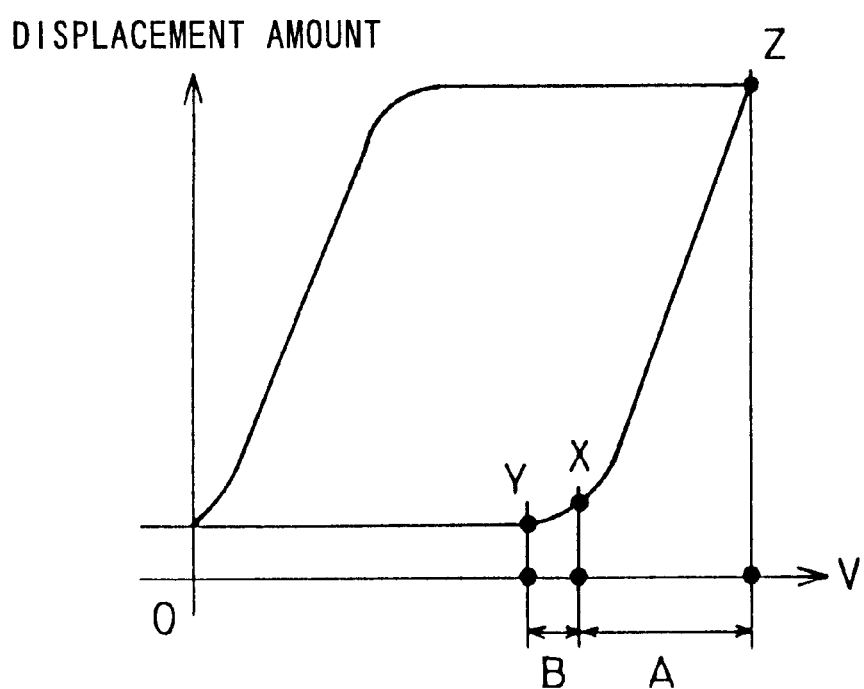
FIG. 40 shows a relationship concerning a maximum value of the voltage applied during the unselection period, a maximum value of the voltage applied by the OFF signal during the selection period, and a maximum value of the voltage applied by the ON signal during the selection period.

As shown in FIG. 40, concerning the actuator element 14 of each of the picture elements, an absolute value (B) of a difference between a maximum value (Y) of the voltage applied during the unselection period Tu and a maximum value (X) of the voltage applied by the OFF signal during the selection period Ts is not more than 100% of an absolute value (A) of a difference between a maximum value (Z) of the voltage applied by the ON signal during the selection period Ts and a maximum value (X) of the voltage applied by the OFF signal (i.e., B≦A). Desirably, there is given B≦0.5A, and more desirably there is given B≦0.3A.

The reason for the above is as follows. That is, it is possible to utilize the voltage range in which the displacement of the actuator element 14 in the ON state is high, and the displacement of the actuator element 14 in the OFF state is small during the unselection period Tu. The absolute value (A) is desirably set to be not less than 10 V, and more desirably not less than 20 V.

Figure 41:
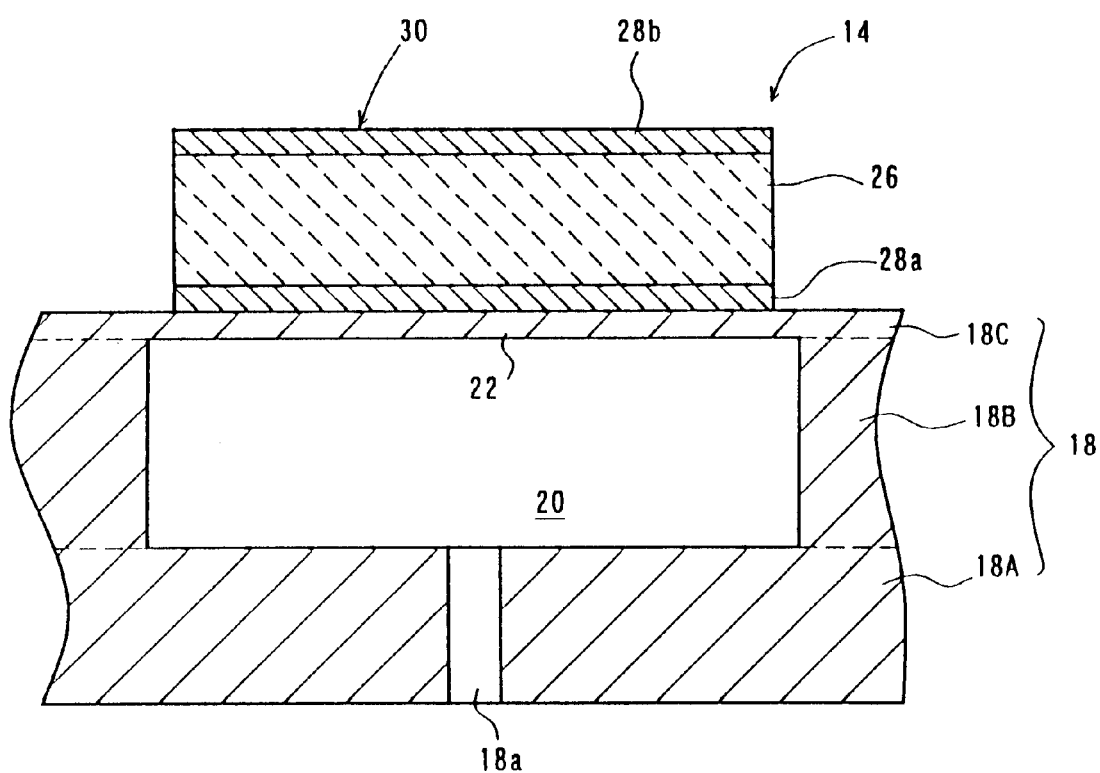
FIG. 41 shows a sectional view illustrating another embodiment of the formation form of the pair of electrodes formed on the shape-retaining layer.

The display D, to which the driving device according to the embodiment is applied, includes the pair of electrodes 28a, 28b which are formed in such a form that the row electrode 28a and the column electrode 28b are formed on the surface of the shape-retaining layer 26. Alternatively, as shown in FIG. 41, for example, it is also allowable that the row electrode 28a is formed on the lower surface of the shape-retaining layer 26, and the column electrode 28b is formed on the upper surface of the shape-retaining layer 26.

Preferred functions of driving device

Next, explanation will be made below for several preferred functions of the driving device 100 according to the embodiment of the present invention for practically using the display as described above.

Explanation of first function

At first, the first function is a function to correct the brightness dispersion of the picture element. When all of the picture elements are in the ON state by applying an identical predetermined electric field to the respective actuator elements 14 corresponding to all of the picture elements, it is rare that all of the picture elements have an identical brightness. The brightness of each of the picture elements disperses in many cases due to, for example, dispersion caused by production of the actuator element 14.

The first function makes it possible to obtain the practical gradation level of each of the picture elements by applying a predetermined operation processing with a conversion variable corresponding to the magnitude of the dispersion with respect to the standard brightness of the picture element, to the gradation level of each of the picture elements obtained in accordance with an image signal.

A variable is selected for the conversion variable in order to allow the dispersion in brightness of each of the picture elements to make convergence into a predetermined level, i.e., into a brightness of a picture element having the largest brightness in this embodiment, by applying the predetermined operation processing.

Specifically, all of the picture elements are subjected to white light emission, and the brightnesses of all of the picture elements are measured by using, for example, an illuminance meter to detect a picture element having the highest brightness of all of the picture elements and a picture element having the lowest brightness of all of the picture elements. An exemplary result of the detection is shown in FIG. 42. In this procedure, assuming that, for example, there is a four-fold difference between the brightness (illuminance) of the picture element A with the highest brightness and the brightness (illuminance) of the picture element E with the lowest brightness, when the white color (high quality white) is displayed on the display screen, the picture element E requires a display time which is four times that for the picture element A.

Figure 43:
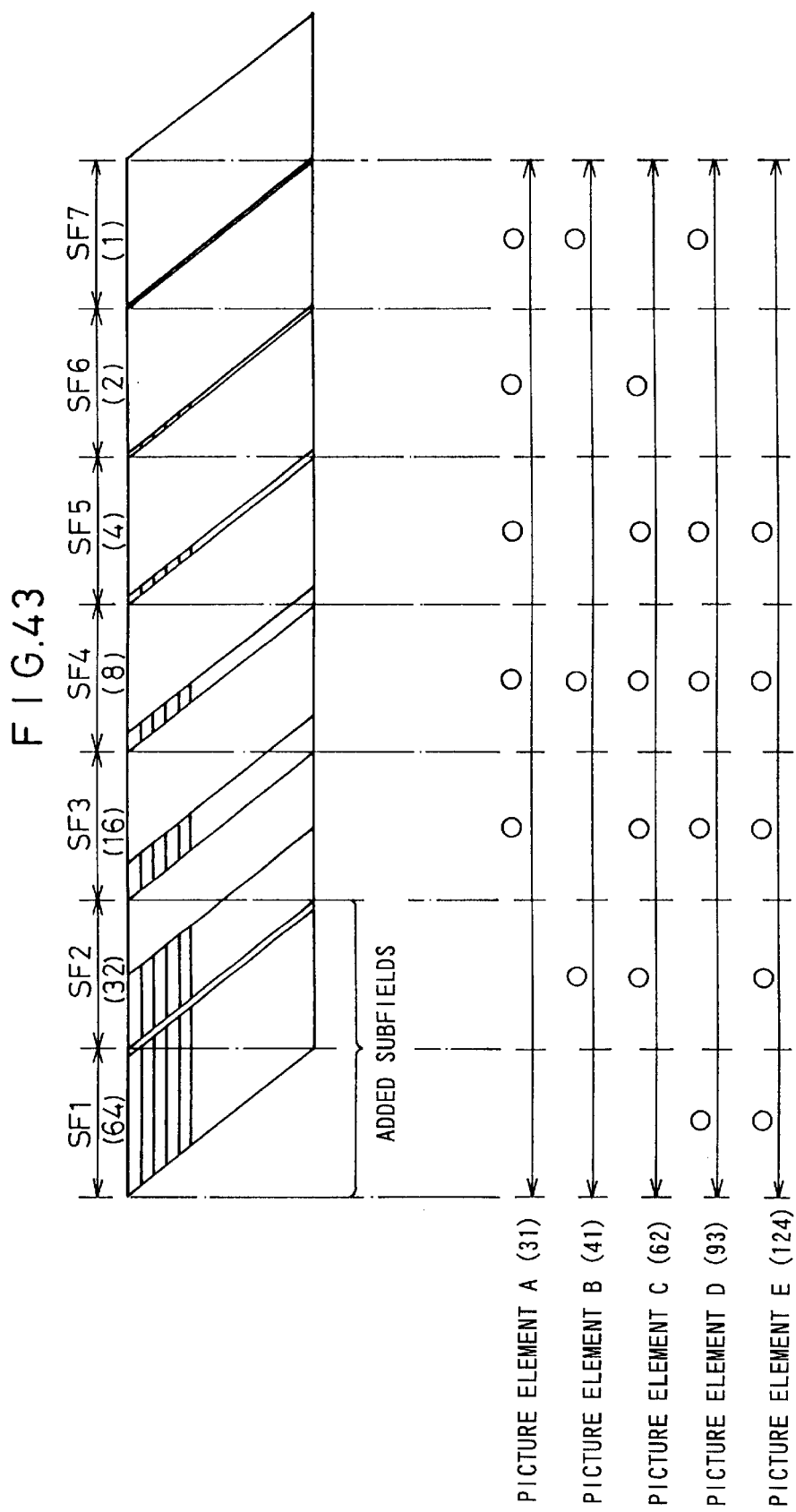
FIG. 43 shows a timing chart illustrating an example of the use of subfields in the case of the division into three groups concerning the first function.

According to the first function, the display time is supplemented by adding a number of subfields. In the case of the example described above, the four-fold display time is required. Therefore, it is suitable to add two subfields according to $4=2^2$. As shown in FIG. 43, in the case of the 32-gradation display system, a subfield SF1 of a unit gradation of "64" and a subfield SF2 of a unit gradation of "32" are added. When the ratio between the brightness of the picture element A and the brightness of the picture element E is within a range of two-fold, it is sufficient to add one subfield.

On the other hand, the conversion variable is set as follows. That is, for example, when there is the four-fold difference between the brightness of the picture element A and the brightness of the picture element E, then the conversion variable allotted to the picture element A is "1", and the conversion variable allotted to the picture element E is "4". Picture element groups having the brightnesses between brightness of the picture element A and the brightness of the picture element E are classified into groups in conformity with the magnitude of the brightness. The example shown in FIG. 42 illustrates a case of classification into three groups (five groups as a whole).

An arbitrary real number in a range of 1 to 4 is selected as the conversion variable to be allotted to the three intermediate groups respectively depending on the magnitude of the brightness of each of the groups. In this illustrative embodiment, 1.3 is selected as the conversion variable for the group (picture element B) having the relatively high brightness, 2 is selected as the conversion variable for the group (picture element C) having the brightness near to the standard brightness, and 3 is selected as the conversion variable for the group (picture element D) having the relatively low brightness.

The predetermined operation processing described above is a multiplication processing. Therefore, the practical gradation level of each of the picture elements is a level obtained by multiplying the inputted gradation level by the conversion variable corresponding to the concerning picture element.

An example will now be described with reference to FIGS. 42 and 43. At first, when a gradation level=31 is inputted into the picture element A having the highest brightness, the subfields SF3 to SF7 are used, because it is necessary to use all of the unit gradations of "16", "8", "4", "2", and "1".

When a gradation level=31 is inputted into the picture element B having the relatively high brightness, the practical gradation level is 41 (obtained by raising to a unit fractions lower than the decimal point of 40.3), because the conversion variable is 1.3. Therefore, the subfields SF2, SF4, and SF7 corresponding to the unit gradations of "32", "8", and "1" are used.

When a gradation level=31 is inputted into the picture element C having the standard brightness, the practical gradation level is 62, because the conversion variable is 2. Therefore, the subfields SF2, SF3, SF4, SF5, and SF6 corresponding to the unit gradations of "32", "16", "8", "4", and "2" are used.

When a gradation level=31 is inputted into the picture element D having the relatively low brightness, the practical gradation level is 93, because the conversion variable is 3. Therefore, the subfields SF1, SF3, SF4, SF5, and SF7 corresponding to the unit gradations of "64", "16", "8", "4", and "1" are used.

When a gradation level=31 is inputted into the picture element E having the lowest brightness, the practical gradation level is 124, because the conversion variable is 4. Therefore, the subfields SF1, SF2, SF3, SF4, and SF5 corresponding to the unit gradations of "64", "32", "16", "8", and "4" are used.

When the first function is practically used, the brightnesses of all of the picture elements are measured beforehand by using, for example, an illuminance meter to detect the picture element A having the highest brightness and the picture element E having the lowest brightness from the result of the measurement. Further, the picture element groups having the brightnesses between the brightness of the picture element A and the brightness of the picture element E are classified into the groups in conformity with the magnitude of the respective brightnesses. The picture element A and the picture element E are also classified into the groups.

The information on the classification into groups (for example, group number and conversion variable) is registered in a predetermined array variable region in ROM or nonvolatile RAM (for example, EEPROM and flash memory) incorporated in the signal control circuit 106. as, Upon the driving, the practical gradation level, which is used for all of the picture elements, is a level obtained by multiplying a gradation level of a picture element indicated by a picture image signal inputted into the signal control circuit 106, by the conversion variable for the group to which the picture element belongs. The data signal may be prepared on the basis of the practical gradation level.

According to the first function, the dispersion in brightness of each of the picture elements can be converged into the predetermined level, i.e., the brightness of the picture element having the largest brightness in this embodiment. It is possible to realize the improvement of the brightness. Simultaneously, for example, when the white color is displayed on the entire display screen, it is possible to obtain the display brightness having no nonuniformity, and it is possible to improve the image quality.

Explanation of second function

Next, the second function intends to linearize the display brightness by using a dummy subfield SF(0).

When the ratio of the light emission amount is large during the selection period Ts in a subfield which is subjected to light emission in both of the selection period Ts and the unselection period Tu, as in the display to which the driving device according to the embodiment of the present invention is applied, the gradation level depends on the number of subfields to be used (=number of selection periods Ts). According to this fact, ideally, it is desirable that the number of subfields to be used is increased in a stepwise manner as the gradation level to be expressed is successively increased.

A case is now considered, in which the 16-gradation expression is expressed by using four subfields of unit gradation levels of (1, 2, 4, and 8). As shown in a table in FIG. 44, when the gradation level is increased from 2 to 3, from 6 to 7, from 10 to 11, or from 14 to 15, the number of subfields to be used is also increased by one step. However, on the contrary, when the gradation level is increased from 3 to 4, from 7 to 8, or from 11 to 12, the number of subfields to be used is decreased. Especially, when the gradation level is increased from 7 to 8, the number of subfields to be used is decreased by as much as two steps.

As described above, concerning the subfield which is subjected to light emission in both of the selection period Ts and the unselection period Tu, when the ratio of the light emission amount in the selection period Ts is large, it is feared that the relative magnitude of the display brightness is inverted with respect to the change in gradation level.

The second function is provided in order to dissolve the inconvenience as described above by using the dummy subfield SF(0) in which there is given a unit gradation level=0.

Figure 45A:
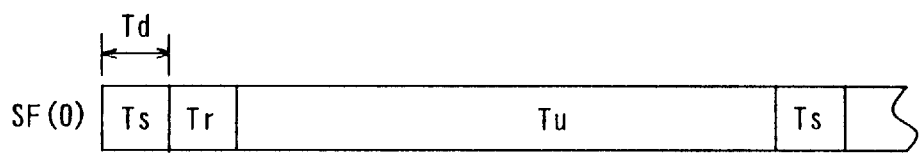
FIGS. 45A to 45E show arrangements of respective subfields including a dummy subfield used in a second preferred function incorporated into the driving device according to the embodiment of the present invention.
Figure 45B:
Figure 45C:
Figure 45D:
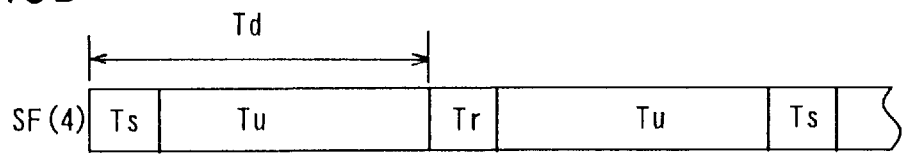
Figure 45E:
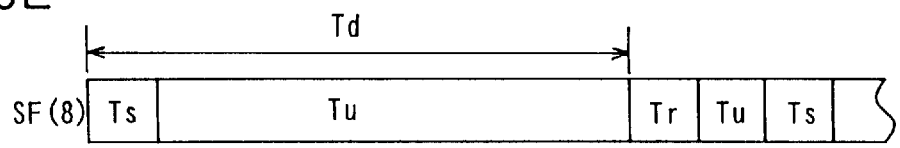

As shown in FIG. 45A, for example, the dummy subfield SF(0) is constructed as follows. That is, the effective display period Td is constructed by only the selection period Ts, and the reset period Tr directly comes after the selection period Ts. The constructions of the subfields SF(1), SF(2), SF(4), and SF(8) having the unit gradation levels of 1, 2, 4, and 8 respectively are shown in FIGS. 45B, 45C, 45D, and 45E.

Basically, the dummy subfield is used such that the gradation level, in which the number of subfields to be used is increased purely in a stepwise manner, is used as a reference, and the number of subfields to be used at a gradation level larger than the reference gradation level is the same as the number of those to be used at the reference gradation level.

Specifically, explanation will be made with reference to FIG. 46. The gradation level, at which the number of subfields to be used is increased purely in the stepwise manner, is 3, 7, and 15, wherein the number of those to be used is increased to 2, 3, and 4 respectively in the stepwise manner. The dummy subfield SF(0) is used for the gradation level 4 in which the number of subfields to be used is lower than 2, during the interval from the gradation level 3 to the gradation level 7. The dummy subfield SF(0) is used for the gradation levels 8, 9, 10, and 12 in which the number of those to be used is lower than 3, during the interval from the gradation level 7 to the gradation level 15.

Accordingly, the number of subfields to be used is 2 in all cases at the respective gradation levels ranging from the gradation level 3 to the gradation level 6. The number of subfields to be used is 3 in all cases except for the gradation level 8, at the respective gradation levels ranging from the gradation level 7 to the gradation level 14.

It is not necessary to use the dummy subfield SF(0) for the gradation levels 1 and 2, because the number of subfield to be used is 1 in both cases. However, it is allowable to use the dummy subfield SF(0) in consideration of the display brightness and the overall display balance.

As described above, the use of the second function makes it possible to increase the number of subfields to be used in the stepwise manner in conformity with the increase in gradation level to be expressed, making it possible to linearize the display brightness.

The display-driving device and the display-driving method according to the present invention are not limited to the embodiments described above. It is a matter of course that various constructions may be adopted therefor without deviating from the gist or essential characteristics of the present invention.

As explained above, according to the display-driving device and the display-driving method concerning the present invention, it is unnecessary to perform, for example, complicated voltage switch and voltage selection even when the range of display gradation is widened, it is possible to suppress the setting number of working voltages to the minimum, and it is possible to realize a simplified arrangement of the peripheral circuit system (including the driving circuits).

Further, it is possible to exhibit the function as the display by maximally utilizing the memory function of the shape-retaining layer (piezoelectric/electrostrictive layer and anti-ferroelectric layer) of the actuator element for constructing the picture element.

Moreover, the selection period for the picture element is minimized so that the electric power consumption is effectively reduced, and the cross talk between the picture elements during the unselection period is suppressed so that the stabilization of light emission and the stabilization of display brightness (gradation) are realized.

What is claimed is:

1. A display-driving device for driving a display comprising an optical waveguide plate for introducing light thereinto, and a driving section provided opposingly to one plate surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted;

said display-driving device comprising a first driving circuit for selecting said actuator elements at least in one row unit, a second driving circuit for outputting displaying information to said selected row, and a signal control circuit for controlling said first and second driving circuits, wherein:

a display period for one image is assumed to be one field and one divided period obtained by dividing said one field into a plurality of divided ones is assumed to be a subfield;

an effective display period comprising a selection period and an unselection period is set for each subfield, said effective display period is set to have a temporal length corresponding to a unit gradation level allotted to said subfield; and said first and second driving circuits are controlled to perform gradation control at least in accordance with a temporal modulation system by using said signal control circuit.

2. The display-driving device according to claim 1, wherein:

said actuator element of said display comprises a shape-retaining layer, an operating section having at least a pair of electrodes formed on said shape-retaining layer, a vibrating section for supporting said operating section, and a fixed section for supporting said vibrating section in a vibrating manner; and said display comprises a displacement-transmitting section for transmitting said displacement action of said actuator element to said optical waveguide plate, said displacement action being generated by voltage application to said pair of electrodes.

3. The display-driving device according to claim 2, wherein said shape-retaining layer is a piezoelectric/electrostrictive layer.

4. The display-driving device according to claim 2, wherein said shape-retaining layer is an anti-ferroelectric layer.

5. The display-driving device according to claim 1, wherein at least a reset period, in which display brightness is substantially zero, is provided between said effective display period of a certain subfield and said effective display period of the next subfield.

6. The display-driving device according to claim 1, wherein:
at least one dummy subfield is provided in said one field in addition to said plurality of subfields; and
said dummy subfield has an effective display period which is constructed by only said selection period.

7. The display-driving device according to claim 6, wherein said signal control circuit makes control to selectively use said dummy subfield so that a number of said subfields to be used is increased substantially in a stepwise manner in accordance with increase in said gradation level.

8. The display-driving device according to claim 1, wherein a reset period and an unselection period, in which display brightness is substantially zero, are provided between said effective display period of a certain subfield and said effective display period of the next subfield.

9. The display-driving device according to claim 1, wherein a preparatory period is provided immediately before said selection period, in order to stabilize operation of said actuator element.

10. The display-driving device according to claim 1, wherein a preparatory period is provided during said selection period, in order to stabilize operation of said actuator element.

11. The display-driving device according to claim 1, wherein:
said first driving circuit is subjected to timing control by the aid of said signal control circuit so that all row selection is completed in each subfield; and
said second driving circuit is subjected to timing control by the aid of said signal control circuit so that a data signal, which is prepared by allotting a display time corresponding to each gradation level to said effective display period of each subfield, is outputted during said selection period in each subfield, for each picture element concerning said selected row.

12. The display-driving device according to claim 11, wherein said gradation level of each of said picture elements is a gradation level obtained by applying, to a gradation level obtained on the basis of said image signal, a predetermined operation processing with a conversion variable corresponding to a magnitude of dispersion with respect to a standard brightness.

13. The display-driving device according to claim 12, wherein said conversion variable is a variable which is used to converge said dispersion in brightness of each of said picture elements to a predetermined level, by applying said predetermined operation processing.

14. The display-driving device according to claim 11, wherein said first driving circuit is capable of setting at lest three voltage levels, and said second driving circuit is capable of setting at least two voltage levels.

15. The display-driving device according to claim 11, wherein:
said first driving circuit outputs a selection pulse signal during said selection period, it outputs an unselection signal during said unselection period, and it outputs a reset pulse signal during a reset period; and
said second driving circuit outputs an ON signal during said selection period in said effective display period of said allotted subfield of said respective subfields, and it outputs an OFF signal during said selection period of said effective display period of the other subfields.

16. The display-driving device according to claim 15, wherein:
a voltage, which is sufficient to make said bending displacement of said actuator element, is applied to said actuator element of said objective picture element during an output period of said ON signal; and
a voltage, which is sufficient to restore said displacement of said actuator element, is applied to said actuator element of said objective picture element during an output period of said reset pulse signal.

17. The display-driving device according to claim 16, wherein said first driving circuit outputs a selecting window pulse for applying, to said actuator element of said objective picture element, a voltage sufficient to allow said actuator element to make said bending displacement, by means of combination with said ON signal during said selection period.

18. The display-driving device according to claim 17, wherein said first driving circuit outputs a resetting window pulse for applying, to said actuator element of said objective picture element, a voltage sufficient to restore said displacement of said actuator element during said reset period.

19. The display-driving device according to claim 17, wherein said first driving circuit outputs an unselecting window pulse for decreasing a difference in average voltage applied during said unselection period, to said actuator element of each of said picture elements during said unselection period.

20. The display-driving device according to claim 15, wherein an absolute value of a difference between a maximum value of said voltage applied during said unselection period to said actuator element of each of said picture elements and a maximum value of said voltage applied by said OFF signal during said selection period is not more than 100% of an absolute value of a difference between a maximum value of said voltage applied by said ON signal during said selection period and a maximum value of said voltage applied by said OFF signal.

21. The display-driving device according to claim 15, wherein phase information is added to at least said ON signal so that a difference in average voltage applied during said unselection period is decreased for said actuator element of each of said picture elements.

22. The display-driving device according to claim 21, wherein said phase information is added to said selection pulse signal and said ON signal and/or said OFF signal respectively.

23. The display-driving device according to claim 21, wherein said phase information is also added to said reset signal in addition to said signals.

24. The display-driving device according to claim 21, wherein said ON signal and said OFF signal are allowed to have their respective pulse widths which are made to be smaller than an address time for said first driving circuit, and their respective phases are deviated from each other by a predetermined angle.

25. The display-driving device according to claim 15, wherein at least any one of said ON signal and said OFF signal has its pulse cycle which is 1/n of an address time, wherein n is an arbitrary real number from 1 to 5.

26. A display-driving method for driving a display comprising an optical waveguide plate for introducing light thereinto, and a driving section provided opposingly to one plate surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted;

said display-driving method comprising the steps of:
assuming a display period for one image is one field:
assuming one divided period obtained by dividing said one field into a plurality of divided ones is a subfield;
setting an effective display period comprising a selection period and an unselection period for each subfield, said effective display period being set to have a temporal length corresponding to a unit gradation level allotted to said subfield;
selecting said actuator elements at least in one row unit;
outputting displaying information to said selected row; and
making gradation control for each of said picture elements at least in accordance with a temporal modulation system.

27. The display-driving method according to claim 26, wherein:
said actuator element of said display comprises a shape-retaining layer, an operating section having at least a pair of electrodes formed on said shape-retaining layer, a vibrating section for supporting said operating section, and a fixed section for supporting said vibrating section in a vibrating manner; and
said display comprises a displacement-transmitting section for transmitting said displacement action of said actuator element to said optical waveguide plate, said displacement action being generated by voltage application to said pair of electrodes.

28. The display-driving method according to claim 27, wherein said shape-retaining layer is a piezoelectric/electrostrictive layer.

29. The display-driving method according to claim 27, wherein said shape-retaining layer is an anti-ferroelectric layer.

30. The display-driving method according to claim 26, wherein at least a reset period, in which display brightness is substantially zero, is provided between said effective display period of a certain subfield and said effective display period of the next subfield.

31. The display-driving method according to claim 26, wherein:
at least one dummy subfield is provided in said one field in addition to said plurality of subfields; and
said dummy subfield has an effective display period which is constructed by only said selection period.

32. The display-driving method according to claim 31, wherein said dummy subfield is selectively used so that a number of said subfields to be used is increased substantially in a stepwise manner in accordance with increase in said gradation level.

33. The display-driving method according to claim 26, wherein a reset period and an unselection period, in which display brightness is substantially zero, are provided between said effective display period of a certain subfield and said effective display period of the next subfield.

34. The display-driving method according to claim 26, wherein a preparatory period is provided immediately before said selection period, in order to stabilize operation of said actuator element.

35. The display-driving method according to claim 26, wherein a preparatory period is provided during said selection period, in order to stabilize operation of said actuator element.

36. The display-driving method according to claim 26, wherein:
timing control is performed so that all row selection is completed in each subfield; and
timing control is performed so that a data signal, which is prepared by allotting a display time corresponding to each gradation level to said effective display period of each subfield, is outputted during said selection period in each subfield, for each picture element concerning said selected row.

37. The display-driving method according to claim 36, wherein said gradation level of each of said picture elements is a gradation level obtained by applying, to a gradation level obtained on the basis of said image signal, a predetermined operation processing with a conversion variable corresponding to a magnitude of dispersion with respect to a standard brightness of said picture element.

38. The display-driving method according to claim 37, wherein said conversion variable is a variable which is used to converge said dispersion in brightness of each of said picture elements to a predetermined level, by applying said predetermined operation processing.

39. The display-driving method according to claim 36, wherein upon said row selection, at lest three voltage levels are allowed to be set, and upon said output of said displaying information, at least two voltage levels are allowed to be set.

40. The display-driving method according to claim 36, wherein:
said row selection is effected by outputting a selection pulse signal during said selection period, outputting an unselection signal during said unselection period, and outputting a reset pulse signal during a reset period; and
said output of displaying information is effected by outputting an ON signal during said selection period in said effective display period of said allotted subfield of said respective subfields, and outputting an OFF signal during said selection period of said effective display period of the other subfields.

41. The display-driving method according to claim 40, wherein:
a voltage, which is sufficient to make said bending displacement of said actuator element, is applied to said actuator element of said objective picture element during an output period of said ON signal; and
a voltage, which is sufficient to restore said displacement of said actuator element, is applied to said actuator element of said objective picture element during an output period of said reset pulse signal.

42. The display-driving method according to claim 41, wherein a selecting window pulse for applying, to said actuator element of said objective picture element, a voltage sufficient to allow said actuator element to make said bending displacement is outputted by means of combination with said ON signal during said selection period.

43. The display-driving method according to claim 42, wherein a resetting window pulse for applying, to said actuator element of said objective picture element, a voltage sufficient to restore said displacement of said actuator element is outputted during said reset period.

44. The display-driving method according to claim 42, wherein an unselecting window pulse for decreasing a difference in average voltage applied during said unselection period is outputted to said actuator element of each of said picture elements during said unselection period.

45. The display-driving method according to claim 40, wherein an absolute value of a difference between a maximum value of said voltage applied during said unselection period to said actuator element of each of said picture elements and a maximum value of said voltage applied by said OFF signal during said selection period is not more than 100% of an absolute value of a difference between a maximum value of said voltage applied by said ON signal during said selection period and a maximum value of said voltage applied by said OFF signal.

46. The display-driving method according to claim 40, wherein phase information is added to at least said ON signal so that a difference in average voltage applied during said unselection period is decreased for said actuator element of each of said picture elements.

47. The display-driving method according to claim 46, wherein said phase information is added to said selection pulse signal and said ON signal and/or said OFF signal respectively.

48. The display-driving method according to claim 46, wherein said phase information is also added to said reset signal in addition to said signals.

49. The display-driving method according to claim 46, wherein said ON signal and said OFF signal are allowed to have their respective pulse widths which are made to be smaller than an address time for said row selection, and their respective phases are deviated from each other by a predetermined angle.

50. The display-driving method according to claim 40, wherein at least any one of said ON signal and said OFF signal has its pulse cycle which is 1/n of said address time, wherein n is an arbitrary real number from 1 to 5.

51. A display-driving device for driving a display comprising an optical waveguide plate for introducing light thereinto, and a driving section provided opposingly to one plate surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted;

said display-driving device comprising a first driving circuit for selecting said actuator elements at least in one row unit, a second driving circuit for outputting displaying information to said selected row, and a signal control circuit for controlling said first and second driving circuits, wherein:

said first and second driving circuits are controlled to perform gradation control at least in accordance with a temporal modulation system by using said signal control circuit; and said first and second driving circuits are controlled to apply alternating polarity voltages of sufficient magnitude to each of said actuator elements such that said actuator elements exhibit hysteresis bending displacement whereby each of said actuator elements assumes two different displacement positions at a single predetermined voltage applied thereto.

52. The display-driving device according to claim 51, wherein:

each said actuator element of said display comprises a shape-retaining layer, an operating section having at least a pair of electrodes formed on said shape-retaining layer, a vibrating section for supporting said operating section, and a fixed section for supporting said vibrating section in a vibrating manner; and said display comprises a displacement-transmitting section for transmitting said displacement action of said actuator element to said optical waveguide plate, said displacement action being generated by voltage application to said pair of electrodes.

53. The display-driving device according to claim 52, wherein said shape-retaining layer is a piezoelectric/electrostrictive layer.

54. The display-driving device according to claim 52, wherein said shape-retaining layer is an anti-ferroelectric layer.

55. The display-driving device according to claim 51, wherein a display period for one image is assumed to be one field, and an effective display period comprising a selection period and an unselection period is set within said period.

56. A display-driving method for driving a display comprising an optical waveguide plate for introducing light thereinto, and a driving section provided opposingly to one plate surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted;

said display-driving method comprising the steps of:
selecting said actuator elements at least in one unit row;
outputting displaying information to said selected row;
making gradation control for each of said picture elements at least in accordance with a temporal modulation system; and
applying alternating polarity voltages of sufficient magnitude to each of said actuator elements such that said actuator elements exhibit hysteresis bending displacement whereby each of said actuator elements assumes two different displacement positions at a single predetermined voltage applied thereto.

57. The display-driving method according to claim 56, wherein:

each said actuator element of said display comprises a shape-retaining layer, an operating section having at least a pair of electrodes formed on said shape-retaining layer, a vibrating section for supporting said operating section, and a fixed section for supporting said vibrating section in a vibrating manner; and said display comprises a displacement-transmitting section for transmitting said displacement action of said actuator element to said optical waveguide plate, said displacement action being generated by voltage application to said pair of electrodes.

58. The display driving method according to claim 57, wherein said shape-retaining layer is a piezoelectric/electrostrictive layer.

59. The display-driving method according to claim 57, wherein said shape-retaining layer is an anti-ferroelectric layer.

60. The display-driving method according to claim 56, wherein a display period for one image is assumed to be one field, and an effective display period comprising a selection period and an unselection period is set during said period.

* * * * *